(12) United States Patent
Podgurny et al.

(10) Patent No.: US 8,583,462 B2
(45) Date of Patent: Nov. 12, 2013

(54) METHOD AND SYSTEM FOR ASSESSING PENALTIES ASSOCIATED WITH AN EMPLOYEE WITHOUT A JOB ASSIGNMENT

(75) Inventors: Leonard John Podgurny, Dollard des Ormeaux (CA); Alan Bruce Randall, St-Albert (CA); Matthew Oren Owens, Sandy, UT (US); Michael Anthony Moroz, Sherwood Park (CA)

(73) Assignee: Canadian National Railway Company, Montreal, QC (CA)

( * ) Notice: Subject to any disclaimer, the term of this patent is extended or adjusted under 35 U.S.C. 154(b) by 109 days.

(21) Appl. No.: 13/268,100

(22) Filed: Oct. 7, 2011

(65) Prior Publication Data

US 2012/0089432 A1    Apr. 12, 2012

Related U.S. Application Data

(63) Continuation-in-part of application No. 13/166,655, filed on Jun. 22, 2011.

(60) Provisional application No. 61/357,904, filed on Jun. 23, 2010.

(51) Int. Cl.
  *G06Q 40/00* (2012.01)
(52) U.S. Cl.
  USPC .......................................... 705/7.11; 705/7.42
(58) Field of Classification Search
  USPC ................................................. 705/7.11, 7.42
  See application file for complete search history.

(56) References Cited

U.S. PATENT DOCUMENTS

| | | | |
|---|---|---|---|
| 6,157,808 A | 12/2000 | Hollingsworth | |
| 6,266,659 B1 | 7/2001 | Nadkarni | |
| 6,662,105 B1 | 12/2003 | Tada et al. | |
| 7,043,443 B1 | 5/2006 | Firestone | |
| 7,451,449 B2 | 11/2008 | Thompson et al. | |
| 7,472,079 B2 | 12/2008 | Fellenstein et al. | |
| 7,925,568 B2 | 4/2011 | Cullen, III et al. | |
| 2001/0005855 A1 | 6/2001 | Shaw et al. | |
| 2001/0042000 A1 | 11/2001 | Defoor | |
| 2001/0047287 A1 | 11/2001 | Jacobs et al. | |
| 2002/0010614 A1 | 1/2002 | Arrowood | |
| 2003/0177052 A1 | 9/2003 | Smith et al. | |

(Continued)

OTHER PUBLICATIONS

Waldman, Michael, "Job Assignments, Signalling, and Efficiency", *The RAND Journal of Economics*, vol. 15, No. 2 (summer, 1984), pp. 255-267.

(Continued)

*Primary Examiner* — Thomas Dixon
*Assistant Examiner* — Benjamin S Fields
(74) *Attorney, Agent, or Firm* — Fish & Richardson P.C.

(57) ABSTRACT

A method for managing the application of penalties to employees of a company. The method comprises executing software encoded on a machine readable storage medium by a CPU to implement a job assignment monitoring function, the job assignment monitoring function monitoring events occurring in the course of a job assignment procedure during which a server arrangement communicates with a remote client over a data network to present an employee at the remote client with a job proposal, detecting among the monitored events a penalty triggering event and in response to the detecting, determining a penalty to be applied to the employee on the basis of the penalty triggering event. The method further comprises recording in an employee record stored in a database, data derived from the determining to register the penalty applied to the employee.

34 Claims, 42 Drawing Sheets

(56) References Cited

U.S. PATENT DOCUMENTS

| | | | |
|---|---|---|---|
| 2004/0267595 A1 | 12/2004 | Woodings et al. | |
| 2005/0159968 A1 | 7/2005 | Cozzolino | |
| 2006/0184405 A1* | 8/2006 | Scott et al. | 705/7 |
| 2006/0224477 A1 | 10/2006 | Garcia et al. | |
| 2008/0021923 A1 | 1/2008 | Sedky et al. | |
| 2009/0006160 A1 | 1/2009 | Boegner | |
| 2009/0125353 A1 | 5/2009 | Bullock et al. | |
| 2009/0132331 A1 | 5/2009 | Cartledge et al. | |
| 2009/0177518 A1 | 7/2009 | Adams et al. | |
| 2009/0327023 A1* | 12/2009 | Nanji | 705/9 |
| 2010/0174579 A1 | 7/2010 | Hughes | |
| 2011/0202382 A1* | 8/2011 | Santos et al. | 705/7.17 |
| 2011/0246994 A1 | 10/2011 | Kimbrel et al. | |
| 2012/0029962 A1 | 2/2012 | Podgurny et al. | |

OTHER PUBLICATIONS

Jackson, Peter et al., "IT Strategies for Increased Rail Employee Satisfaction", 2008 IEEE, Intelligent Transportation Systems, *IEEE Intelligent Systems*, 3 pages.

Chrestkha, Mikhail et al., "Crew Scheduling: Measuring Stability and Optimality for CN", CN, Master of Engineering Final Report, May 14, 2009, 84 pages.

"CN Rail Crew Bulletins and Bids Project Final Presentation", Operations Research and Information Engineering Master of Engineering Project, Cornell University, May 21, 2008, 81 pages.

Crew Scheduling: Measuring Stability and Optimality for CN, Mikhail Chrestkha et al., Cornell University, May 19, 2009 (presentation).

Office Action mailed on Jan. 27, 2012 in connection with U.S. Appl. No. 13/268,073, 12 pages.

Office Action; dated Dec. 7, 2012; U.S. Appl. No. 13/268,073; 18 pp.

Office Action mailed on May 3, 2012 in connection with U.S. Appl. No. 13/166,630; 19 pp.

Restriction Requirement issued Nov. 11, 2012 in U.S. Appl. No. 13/166,630 (3 pages).

Office Action issued Aug. 31, 2012 in U.S. Appl. No. 13/166,659 (29 pages).

Office Action issued on Feb. 15, 2013; U.S. Appl. No. 13/166,655; 21 pp.

Office Action issued on Apr. 25, 2013; U.S. Appl. No. 13/166,659; 25 pp.

* cited by examiner

FIG. 3

| Name | Employee ID ~304 | BIO Info ~306 | Qualification Info ~308 | Current Job and Location Info ~310 | Job Preference Info ~312 | Availability Status ~314 | Historical/ Archive Data ~316 |
|---|---|---|---|---|---|---|---|
| John Smith | 599A | | | | | | |
| Kenneth Jones "Ken" | 201Q | Birth Date: Address: Contact #: Email Address: Emergency Contact: | Education: B.Eng 2007 Seniority Level: Special Skills: Qualification Level: | "Home" Location: Current Location: Current Job: | Preferred Shifts: Preferred People: Preferred Buckets: Preferred Locations: | Availability Status: Vacation Days: Sick Days: Personal Days: | |
| Sue Murray | 437S | | | | | | |
| | | | | ... | | | |

Employee Profile Database ~22

302

Job Assignment Database — 900

| Job Code | Employee | Date Job Assignment Communicated | Date of Job | How was Job Assignment Communicated | Status of Confirmation |
|---|---|---|---|---|---|
| AZ2 | John Smith | 09/04/09 | 20/04/09 | Phone | Accepted |
| BQ4 | Kenneth Jones | 09/04/09 | 20/04/09 | Email<br>-reminder by email 12/04/09 | Acknowledgment Receipt 09/04/09 |
| 559 | Sue Murray | 09/04/09 | 20/04/09 | Web-site<br>-reminder by phone 12/04/09 | Not Yet Acknowledged |
| MM8 | Dave Roach | 09/04/09 | 20/04/09 | Web-site | Accepted |
| SMM | | | | | |
| ... | | | | | |
| SMM | | | | | |

904 — Job Code; 906 — Employee; 908 — Date Job Assignment Communicated; 910 — Date of Job; 912 — How was Job Assignment Communicated; 914 — Status of Confirmation $902_1$, $902_2$, $902_3$, $902_4$, ... $902_k$

FIG. 9

FIG. 12 www.employee-system.com
www.employee-system.com

File Edit View Favorites Tools Help

John Smith
Craft: Engineer

Employee Pin: 37423
Home Location: Edmonton
Current Location: Edmonton

1200

Home Address — 1202

| | |
|---|---|
| 1208 — Street and # | 65 Peel St # 305 |
| 1210 — City | Edmonton |
| 1212 — Province/State | Alberta |
| 1214 — Country | Canada |
| 1216 — Postal Code/ZIP | J2V 9V6 |

Phone Numbers — 1204

| | Number | Contact | Type | Home/Away/Bath |
|---|---|---|---|---|
| 1218 | | | | |
| 1204₁ | 514-546-7931 | John Smith | Telephone | Home |
| 1204₂ | 514-754-8631 | John Smith | Cell | Both |
| 1204₃ | 613-572-3317 | Daughter | Telephone | Away |

1220  1222  1224

Email Addresses — 1206

| | | |
|---|---|---|
| 1226 — Work email | jsmith@cn.com | |
| 1228 — Personal email | John.smith@gmail.com | |

[Update] — 1230   [Add Info] — 1232

[Emergency Contact Information] — 1240
[Contact Preferences] — 1242
[Qualifications & Restrictions] — 1244
[Seniority] — 1246

[Log Out] — 1130 www.employee-system.com
www.employee-system.com
File Edit View Favorites Tools Help

John Smith
Craft: Engineer

Employee Pin: 37423
Home Location: Edmonton
Current Location: Edmonton 1250
1252

Emergency Contact Information

| | | |
|---|---|---|
| Contact 1 | 1254 — Name | Smith |
| | 1256 — First Name | Jane |
| | 1258 — Relationship | Wife |
| | 1259 — Phone Number | 514-223-4411 |
| Contact 2 | 1254 — Name | Jagger |
| | 1256 — First Name | Mick |
| | 1258 — Relationship | Brother |
| | 1259 — Phone Number | 613-212-9977 |

1252₁
1252₂

Update — 1253   Add Info — 1257

FIG. 12A

1260 www.employee-system.com
▼ www.employee-system.com
File  Edit  View  Favorites  Tools  Help

John Smith
Craft: Engineer

Employee Pin: 37423
Home Location: Edmonton
Current Location: Edmonton

1261 — Call Configuration

Update — 1268

Default Phone Sequence — 1262

| Seq | Phone # | Type | IVR Test | Access Pin # | Comments | Home/Away/Both |
|---|---|---|---|---|---|---|
| 1 | | Phone | | | | |
| 2 | | Cell | | | | |
| 3 | | Phone | | | Daughter | Away |

1270, 1272, 1274, 1276, 1278, 1280, 1282
1262₁, 1262₂, 1262₃
1283, 1288

Alternative Phone Sequence — 1264

| Home/Away/Both | Time | Start Date/Time | End Date/Time | Phone # Sequence |
|---|---|---|---|---|
| | | | | |
| | | | | |

1264₁, 1264₂
1284, 1286, 1289

Away From Home — 1266

| Facility Code | Telephone # | Comments |
|---|---|---|
| | 514-262-7692 | Best Western |

1270 www.employee-system.com

File  Edit  View  Favorites  Tools  Help

John Smith  
Craft: Engineer

Employee Pin: 37423  
Home Location: Edmonton  
Current Location: Edmonton

| Qualifications 200 | Description 202 | Expiration Date 204 | # Trips to Qualify 206 | Trips Taken 208 | Type 210 | Remarks 212 |
|---|---|---|---|---|---|---|
| Qual Code | | | | | | |
| 220₁ A232 | EM8 Conductor | 2010/08/01 | 5 | Detail 3 | Territorial | |
| 220₂ A59X | Co Capreolmc Tier | 2009/02/01 | 10 | 10 | Territorial | |

209

Update 214    Add 216

↗ 220

| Restrictions 230 | Start Date 232 | End Date 234 | Lost Work 236 | Restricted Bidding 238 | Restricted Owning 242 | Last Changed by 244 |
|---|---|---|---|---|---|---|
| Type | | | | | | |
| 240₁ Medical | | | | | | |
| 240₂ Medical | | | | | | |

| Call Configuration | | | Start Date | End Date | Emp Update |
|---|---|---|---|---|---|
| 282 ⏎ For the next call I request a lead time of | 2 days | 291 | | | |
| 284 ⏎ For the next call I request a call time of | 1630 | | | | |
| 286 ⏎ Request no IVR call privacy between | 00:01– 06:00 | | | | |
| 288 ⏎ Request a one time wake up call | 05:00 | | | | |
| 290 ⏎ Authorized proxy IVR access code | 1234 | | | | |

280

292 — Start Date, 294 — End Date, 296 — Emp Update

FIG. 12E

FIG. 13A www.employee-system.com

File  Edit  View  Favorites  Tools  Help

John Smith
Craft: Engineer

Employee Pin: 37423
Home Location: Edmonton
Current Location: Edmonton

Category 1 — $1330_1$

Craft: Conductor
Time Duration: < 3 days
Start Location: Montreal

Define Criteria — 1338
- $1336_1$
- $1336_2$
- $1336_3$

Category 2 — $1330_2$

Define Criteria — 1338

Add Category — 1332

Delete Category — 1334 www.employee-system.com
www.employee-system.com

File Edit View Favorites Tools Help

John Smith
Craft: Engineer

Employee Pin: 37423
Home Location: Edmonton
Current Location: Edmonton

Select Craft [Any / Conductor / Engineer / Trainman] — $1344_1$
$1342_1$

Select Region [Any / Montreal / Toronto] — $1344_2$
$1342_2$

Select Craft [Any / Permanent / Temporary / < 3 Days] — $1344_3$
$1342_3$

Select Shift [Any / Day / Night / Mornign] — $1344_4$
$1342_4$

Select Job Type [Any / On Board / Yard / Field] — $1344_5$
$1342_5$

Submit — 1346

| Bulletin Name | Bulletin Type [Any ▶] | Bid Type [Any ▶] | Open Date Time | Close Date Time | Bid Time Remaining | Status [Any ▶] |
|---|---|---|---|---|---|---|
| Edmonton Change of Card | CoC | Both | | | 15 mins | Active |
| Edmonton Bulletin | CoC | Both | | | 4 hrs | Active |
| Montreal Ad-Hoc Bulletin | Ad-Hoc | Temporary | | | 2 days | Active |
| Toronto Bulletin | CoC | Both | | | | Closed |

Job Assignment Bidding

Bulletin Details
Preferred Buddies
Preferred Buckets

| Declarations | |
|---|---|
| Do you want to protect emergency Engineer Work? | ▶ |
| Do you want to protect emergency Engineer Work? | Road Engineer<br>Road Trainman<br>Yard Engineer<br>Yard Trainman<br>Local Engineer<br>Local Trainman |
| Do you want to work 6 shifts in Yard Service? | ▶ |
| Do you wish to work as an Engineer East of Thunder Bay? | ▶ |

John Smith
Craft: Engineer

Employee Pin: 37423
Home Location: Edmonton
Current Location: Edmonton

Seniority Move Search

- 1604 — Terminal — 1616 — Edmonton
- 1606 — Entitlement — 1616 — Permanent
- 1608 — Location — 1616 — All
- 1610 — Assignment Type — 1616 — All
- 1612 — Board Type — 1616 — All
- 1614 — Assignment Name — 1616 — All Submit ~1618

| | Board | Assignment Name | Craft | Seniority Roster | Current Owner | Eligibility |
|---|---|---|---|---|---|---|
| 1622₁ | Edmonton Assignment | 442 Assignment | Engineer | ENE9 | James Jackson | No |
| 1622₂ | Edmonton East Pool | Bidpack Schedule | Conductor | CWC0 | Zack Jasper | Yes |

1624  1626  1628  1630  1632  1634

Seniority Move Override ~1640

```
www.employee-system.com                                          [_][□][X]
[◄][►]▼ [www.employee-system.com          ▼][⟳][X][              ][🔍▼]
File  Edit  View  Favorites  Tools  Help
```

End of Shift Report

| 1. Work Duration & Equipment Details |
| 2. Lodging & Transportation Details |
| 3. Declarations & Certifications |

1790

Employee Name: _____  Employee #: _____

Duty Summary — 1710    1714

| 1716 | | Engineer | Conductor | Brakeman |
|---|---|---|---|---|
| | On-Duty Time: | [▼] | [▼] | [▼] |
| | Relieved Off-Duty Time: | [▼] | [▼] | [▼] |
| | Off-Duty Time: | [▼] | [▼] | [▼] |
| | Additional Personal Rest | ☐ hours | ☐ hours | ☐ hours |
| | Total Time On Duty | — | — | — |

[Add New]    1712

1720 — Mandatory Rest Summary    1724

| 1726 | | Engineer | Conductor | Brakeman |
|---|---|---|---|---|
| | Mandatory Rest | [▼] | [▼] | [▼] |
| | Mandatory Rest | — | — | — |

[Add New]    1722

1730 — Equipment Summary

| 1732 | Engine # | _____ |
| 1734 | Failure Type | [▼] |
| 1736 | Reported Date/Time | [▼] [▼] |

[Add New]     1704   1706   1708
             [Next] [Save] [Cancel]

FIG. 17A

1700B www.employee-system.com

File Edit View Favorites Tools Help

End of Shift Report

Employee Name: _____  Employee #: _____

1790
- 1. Work Duration & Equipment Details
- 2. Lodging & Transportation Details
- 3. Declarations & Certifications Lodging Summary —1740          1744

|  | Engineer | Conductor | Brakeman |
|---|---|---|---|
| Hotel/Motel Name: | Westin ▼ | Westin ▼ | Westin ▼ |
| Phone #: |  |  |  |
| Alternate Phone #: |  |  |  |
| Room #: |  |  |  |
| Wake-up Call: | 00 Minutes ahead | 00 Minutes ahead | 00 Minutes ahead |

1746, 1742

[Add New]

1750 — Transportation Summary          1754

|  | Engineer | Conductor | Brakeman |
|---|---|---|---|
| Type | Taxi ▼ | Taxi ▼ | Taxi ▼ |
| Paid? | Yes ▼ | Yes ▼ | Yes ▼ |
| Amount | $ ___ | $ ___ | $ ___ |

1756, 1752

[Add New]

1702 [Previous]  1704 [Next]  1706 [Save]  1708 [Cancel]

FIG. 17B

End of Shift Report

| Employee Name: | | Employee #: | |

Sidebar (1790):
1. Work Duration & Equipment Details
2. Lodging & Transportation Details
3. Declarations & Certifications Declarations —1760

| Declarations/Intent | Engineer | Conductor | Brakeman |
|---|---|---|---|
| A. Personal miles threshold reached. Book off now? | Yes ▼ | Yes ▼ | Yes ▼ |
| B. Time off threshold reached – Take time off? | Yes ▼ | Yes ▼ | Yes ▼ |
| Time-off duration | | | |
| Give time-off intent for next period? | Yes ▼ | Yes ▼ | Yes ▼ |
| C. Records indicate that absence is scheduled for Feb. 15/09 at 00:01. What do you want to do? | ● Take balance of PLD<br>○ Re-schedule<br>○ Extend Absence<br>○ Short Absence | ● Take balance of PLD<br>○ Re-schedule<br>○ Extend Absence<br>○ Short Absence | ● Take balance of PLD<br>○ Re-schedule<br>○ Extend Absence<br>○ Short Absence |

1764 (header bracket over Engineer/Conductor/Brakeman)
1766 (bracket on left of declarations rows)
1762 (pointing to radio buttons)

[Add New]

| Certification | Engineer | Conductor | Brakeman |
|---|---|---|---|
| Do you certify the information in this report to be correct? | ○ YES<br>○ NO | ○ YES<br>○ NO | ○ YES<br>○ NO |

1770 (label for certification row)
1782, 1784 (NO options)

1780— Report created by [_____] at [_____]

[Previous] [Save] [Cancel] [Submit]
1702    1706   1708     1705

FIG. 17C

| | 1804 | 1806 | 1808 | 1810 | 1812 | 1814 | 1816 |
|---|---|---|---|---|---|---|---|
| | Username | Password | Name | Permission Level | Job Title | Location (Residence) | Employees |
| 1802₁ | J. Good | **** | Jake Goodfellow | 1 | VP R&D | Edmonton | (list) |
| 1802₂ | J. Tremb | **** | Jane Tremblay | 3 | Tech Manager | Vancouver | (list) |
| 1802ₖ | J. McVic | **** | Joe McVicar | 2 | Director of Marketing | Toronto | (list) |

Manager Profile Database 1800

FIG. 18 www.employee-system.com www.employee-system.com

File Edit View Favorites Tools Help

Claims Report
Employee Name: Employee #: ~2310
Report Settings ~2320          2330~Display Settings          2340~Filter Settings
Train ID                        Display System                  Filter
Date/Time                       Report Values                   Filter Timesheet Claims
Train Ordered                   Display Claimed Values          Filter Non-Timesheet Claims
Timesheet                       Display Approved Values         Filter Standalone Claims 2352                                                  2354

| Claim | Start Date/Time | End Date/Time | Claimed Values | | | | Approved Values | | | | Status | Remarks | Appeal |
|---|---|---|---|---|---|---|---|---|---|---|---|---|---|
| | | | Distance | Units | #'s | $$ | Distance | Units | #'s | $$ | | | |
| Terminal Detention | — | — | 14.54 | | | 25.90 | 14.54 | | | 25.90 | Approved | OK | ☐ |
| LC | — | — | | | | 4.87 | | | | — | In Review | | ☐ |
| ST | — | — | 30.54 | | | 55.07 | 30.54 | | | 55.07 | Approved | OK | ☐ |
| Terminal Detention | — | — | 48.96 | | | 78.83 | | | | — | Declined | Not allowed See Ron G. | ☐ |
| Run Miles | — | — | 148.00 | | 6398 | | 148.00 | | | — | Approved | OK | ☐ |
| Train Length | — | — | | | | | | | | | In Review | | ☐ |
| Train Length Premium | — | — | | | | 18.00 | | | | 18.00 | Appealed | Remarks | ☐ |

2356                  2362              2372                          2382

[Add] [Print] [Send] [Appeal] [Submit]
2391  2392   2393    2394     2395

FIG. 23

Claims Addition

Employee Name: _____ Employee #: _____ ~2410

Claim Type [Standalone ▼] Start Date [____▼] End Date [____▼] ~2420
Time Sheet [N/A ▼] Start Time [____▼] End Time [____▼]

Job ~2430
Job Type [Contactor ▼]
Claimed Job Type [Engineer ▼]

Craft
System Craft Type
Claimed Craft Type

Time
System Time [__] h [__] min ~2444
Claimed Time [01] h [00] min ~2442

Remarks [_____]

[Add Claim] ~2444  [Cancel] ~2446
[Clear Values] ~2442

| Start Date/Time | End Date/Time | Timesheet | Craft System Craft Type | Claimed Craft Type | Claimed Job Type | Claimed Date/Time | Total Hours | Total Distance | Claimed Amount | Status |
|---|---|---|---|---|---|---|---|---|---|---|
| 2008-11-12 | 2008-11-12 | T123456 | Thru Freight | Yard Work | Yardwork | 2008-10-30 10:00-12:32 | 1.5h | 62 miles | $175.03 | ☐ To Submit |
| 2008-10-03 | 2008-10-06 | N/A - Bereavement | | | N/A | N/A | 3d | - | - | ☐ Approved |
| 2008-09-30 | 2008-09-30 | T654321 | | | Safety | 2009-09-30 13:00-14:00 | 1h | - | $57.00 | ☐ Declined |

[Delete Claim] ~2462  [Modify Claim] ~2464  [Submit Claim] ~2466

METHOD AND SYSTEM FOR ASSESSING PENALTIES ASSOCIATED WITH AN EMPLOYEE WITHOUT A JOB ASSIGNMENT

CROSS REFERENCE TO RELATED APPLICATIONS

This application is a continuation-in-part of U.S. patent application Ser. No. 13/166,655, filed on Jun. 22, 2011, which claims the benefit under 35 USC §119(e) of U.S. provisional patent application Ser. No. 61/357,904 filed on Jun. 23, 2010. The contents of the above-mentioned patent applications are incorporated herein by reference.

FIELD OF THE INVENTION

The present invention relates to a system and method for employee resource management, and specifically to a computer-implemented method and system for employee resource management that can be used by both employees and managers. In a specific example of implementation the invention allows performing employee resource management in a railway environment, in particular in an environment where train operations are being performed. However, the invention is not necessarily limited to a railway environment and it may have applications to other fields as well.

BACKGROUND OF THE INVENTION

Human resource management is a challenge for many companies. The larger the company is, the more challenging it can become to manage employee resources, including allocating jobs/shifts, managing vacation time, and managing communication with employees, among others. Managing employees, and specifically the allocation of job assignments, can become even more challenging when it is further required to take into consideration regulatory rules imposed by governments and conditions imposed by collective bargaining agreements.

Accordingly, there is a clear need in the industry to develop an improved system and method for employee resource management, in particular in the railway industry, such as to improve the efficiency of operations.

SUMMARY OF THE INVENTION

In accordance with a broad aspect, the present invention provides a method for managing the application of penalties to employees of a company. The method comprises executing software encoded on a machine readable storage medium by a CPU to implement a job assignment monitoring function, the job assignment monitoring function monitoring events occurring in the course of a job assignment procedure during which a server arrangement communicates with a remote client over a data network to present an employee at the remote client with a job proposal, detecting among the monitored events a penalty triggering event and in response to the detecting, determining a penalty to be applied to the employee on the basis of the penalty triggering event. The method further comprises recording in an employee record stored in a database, data derived from the determining to register the penalty applied to the employee.

In accordance with another broad aspect, the present invention provides a method for managing the application of penalties to employees of a company. The method comprises executing software encoded on a machine readable storage medium by a CPU to implement a job assignment monitoring function, the job assignment monitoring function monitoring events occurring in the course of a job assignment procedure during which a server arrangement communicates with a remote client over a data network and detecting among the monitored events a first event relating to a notification sent from the server arrangement to the employee via the remote client to inform the employee of a job proposal and a second event indicative of a failure of the employee to accept the job proposal, wherein the job proposal is a first job proposal. In response to the detecting, determining a penalty to be applied to the employee and a grace period during which the penalty can be avoided if the employee accepts a second job proposal distinct from the first job proposal. In the event the penalty is not avoided, the method comprises recording in an employee record stored in database data to make the penalty effective.

In accordance with a further broad aspect, the present invention provides a method for managing the application of penalties to employees of a company. The method comprising executing software encoded on a machine readable storage medium by a CPU to implement a job assignment monitoring function, the job assignment monitoring function monitoring events occurring in the course of a job assignment procedure during which a server arrangement communicates with a remote client over a data network and detect among the monitored events a first event indicative of notification to the employee that a job proposal previously made available to the employee is withdrawn from the employee. Wherein the job proposal is a first job proposal. And to detect among the monitored events a second event indicative of a failure of the employee to perform an action that could lead to a second job proposal being made available to the employee, distinct from the first job proposal, within a predetermined time interval from the first event. The method further comprises in response to detection of the second event, recording in an employee record stored in database data to indicate that the employee is subjected to a penalty.

In accordance with a still further broad aspect, the present invention provides a computer readable storage medium encoded with software for execution by a CPU for implementing a job assignment monitoring function, the job assignment monitoring function monitoring events occurring in the course of a job assignment procedure during which a server arrangement communicates with a remote client over a data network to present an employee at the remote client with a job proposal. The job assignment monitoring function detects among the monitored events a penalty triggering event and in response to the detection, determines a penalty to be applied to the employee on the basis of the penalty triggering event. The job assignment monitoring function further recording in an employee record stored in a database, data derived from the determining to register the penalty applied to the employee.

In accordance with a still further broad aspect, the present invention provides a computer readable storage medium encoded with software for execution by a CPU for implementing a job assignment monitoring function, the job assignment monitoring function monitoring events occurring in the course of a job assignment procedure during which a server arrangement communicates with a remote client over a data network. The job assignment monitoring function detects among the monitored events a first event indicative of notification to the employee that a job proposal previously made available to the employee is withdrawn from the employee, wherein the job proposal is a first job proposal and a second event indicative of a failure of the employee to accept the job, wherein the job is a first job. In response to the detection, determining a penalty to be applied to the employee, a grace period during which the penalty can be avoided if the employee accepts a second job proposal distinct from the first job proposal and in the event the penalty is not avoided, recording in an employee record stored in database data to make the penalty effective.

Other aspects and features of the present invention will become apparent to the persons skilled in the art upon review of the following description of embodiments of the invention in conjunction with the accompanying figures.

BRIEF DESCRIPTION OF THE DRAWINGS

A detailed description of the embodiments of the present invention is provided herein below, by way of example only, with reference to the accompanying drawings, in which:

FIG. 3 is a table listing possible categories of information stored the employee profile database shown in FIG. 1;

FIG. 9 is a table listing the possible categories of information stored in an assigned job database in accordance with the present invention;

FIGS. 13 to 13B are non-limiting examples of implementation of on-screen displays illustrating user employee preference user interfaces of the employee resource management system;

FIGS. 14 and 14A are non-limiting examples of implementation of on-screen displays illustrating absence request user interfaces of the employee resource management system;

FIGS. 15 to 15B are non-limiting examples of implementation of on-screen displays of job assignment bidding request user interfaces of the employee resource management system;

FIG. 16 is a non-limiting example of implementation of an on-screen display of a seniority move user interface of the employee resource management system;

FIGS. 17A to 17C show non-limiting examples of on-screen displays of an End-of-Shift reporting interface of the employee resource management system;

FIG. 18 shows a non-limiting example of the type of information stored in a manager profile database;

FIG. 23 is an on-screen display according to a non-limiting example of implementation of a claims report user interface of the employee resource management system;

FIG. 24 is an on-screen display according to a non-limiting example of implementation of a claim addition user interface of the employee resource management system;

FIG. 25 is an on-screen display according to a non-limiting example of implementation of a claim detail user interface of the employee resource management system;

Figure 1:
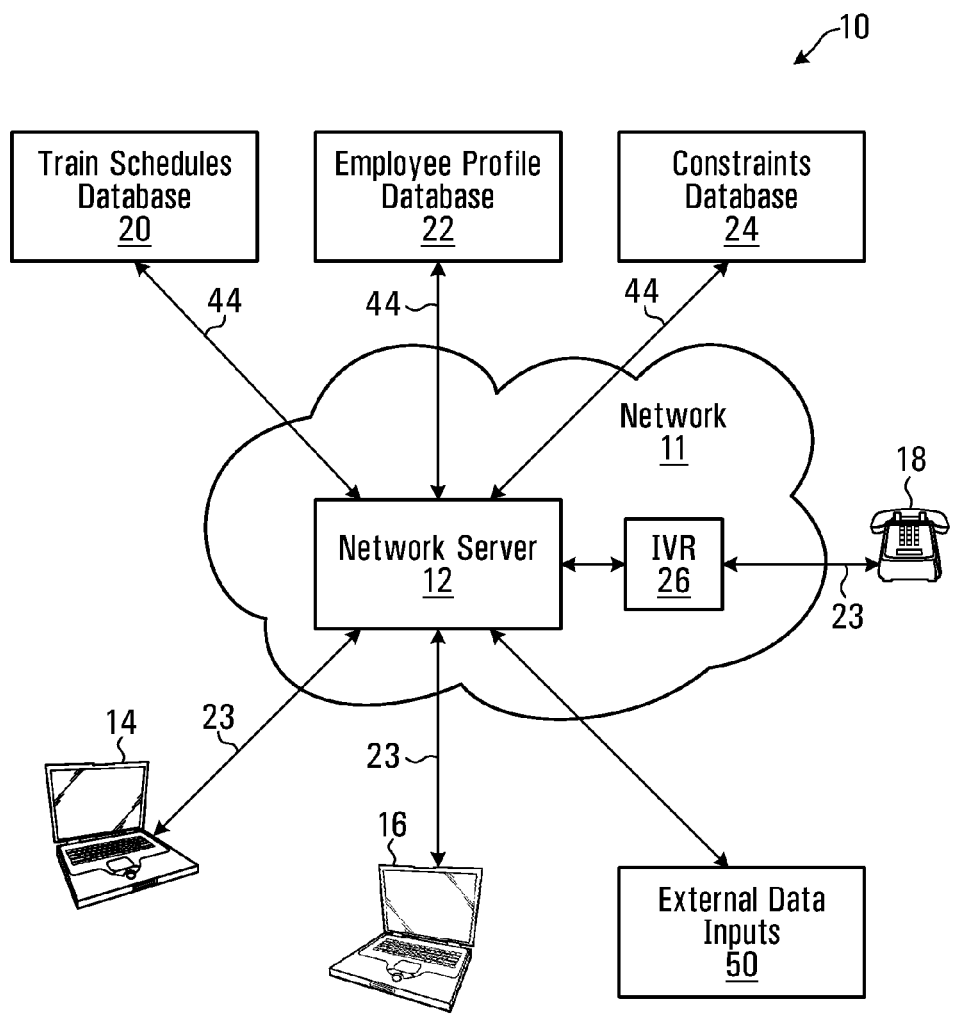
FIG. 1 is a high-level block diagram of a human resource management system in the context of railway operations, according to a non-limiting example of implementation of the invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION OF THE EMBODIMENTS

To facilitate the description, any reference numerals designating an element in one figure will designate the same element if used in any other figure. In describing the embodiments, specific terminology is resorted to for the sake of clarity but the invention is not intended to be limited to the specific terms so selected, and it is understood that each specific term comprises all equivalents.

Overview of Employee Management System

Shown in FIG. 1 is a block diagram of an employee management system 10 according to a non-limiting example of implementation of the present invention. As will be explained in more detail below, the employee management system 10 facilitates the assignment of jobs to employees, as well as other tasks and requirements that occur in an environment where employee resources need to be managed. The employee management system 10 is implemented on a network-based computer platform, but other types of implementation, such as an implementation using one or more stand-alone computers can be used without departing from the spirit of the invention.

For the purposes of the present application, the employee management system 10 will be described in the context of a railway company that uses the employee management system 10 to manage crews of people working on trains and/or in train yards, train stations, etc. However, it should be appreciated that the employee management system 10 according to the present invention can be used in the context of any industry where employee resources need to be managed. For example, other potential industries where the employee management system 10 of the present invention may be useful include other transportation industries (such as the airline industry and/or trucking industry), government-run industries (such as teachers, nurses, etc.), as well as manufacturing industries that require large work forces.

In operation, the employee management system 10 enables both employees and managers of one or more companies to access and interact with information managed by the employee management system 10. As shown, the employee management system 10 comprises a network server 12 that provides the core system functionality. Users of the system 10 are able to interact with information managed by the server 12 via a plurality of workstations 14, 16 over the network 11. The network 11 can be the Internet, an Intranet, or any other suitable network.

The network server 12 is capable of performing processing functions and has access to databases 20, 22 and 24 that store information needed to assign jobs to various employees and facilitate other tasks for managing employee resources. As shown in FIG. 1, the network server 12 has access to a train schedule database 20, an employee profile database 22 and a constraints database 24. Each of these databases will be described in more detail further on in the specification. It should be appreciated that the three databases discussed herein have been identified as being separate databases in order to better structure the information and facilitate the understanding of example that will be provided herein. In practice, the databases may, in fact, be amalgamated into a single database that contains all the required information.

Although not shown in FIG. 1, other databases may also be accessed by the network server 12 in order to facilitate the functional operations that will be described in more detail below. For example, the network server 12 may be able to access a database that contains a representation of a railway network. Such a database is described in more detail in connection with U.S Patent Publication 2010/0064242, the contents of which are incorporated herein by reference.

Referring back to the databases shown in FIG. 1, the databases 20, 22 and 24 are connected directly to the network server 12 via communication links 44. However, other arrangements are possible without departing from the spirit of the invention. For example, the databases 20, 22, 24 may be stored at any suitable location, such as on one or more servers or memory units within the network 11, or on one or more individual computers or memory units at a location outside the network 11. So long as the databases 20, 22 and 24 are accessible by the server 12 (as well as other network devices) such that data can be read from, and written to, the databases 20, 22 and 24, they can be located anywhere. While each of the databases 20, 22 and 24 are shown as single components, this is for illustration purposes only. In practice, each of the databases 20, 22 and 24 can be comprised of a plurality of databases that are distributed over many storage locations. More specifically, the databases 20, 22, 24 may be distributed in nature, such that portions of their content are stored in different data storage media that are possibly located in different network components of the network 11.

The employee management system 10 further comprises workstations 14, 16 and a telephone 18 allowing voice communications, with which users can interact with the system 10. Although only two workstations 14, 16 and one telephone 18 are shown, it should be appreciated that any number of workstations and telephones can be connected to the server 12 without departing from the spirit of the invention.

The workstations 14, 16 and the telephone 18, communicate with the server 12 over communication links 23. The communication links 23 may be wireline or wireless links without departing from the spirit of the invention. Wireless communication links 23 are advantageous in that they permit mobility for a user. Alternatively, the communication links 23 can be wireline and can be established only when these workstations are synchronized with the remainder of the system 10, such as when the workstations 14, 16 connect to the network 11. The workstations 14, 16 shown in FIG. 1 are shown as laptop computers, but it should be appreciated that any type of computing unit that is operative for connecting to the network 11 is possible. For example, the workstations 14, 16 may be desktop computers, laptop computers, tablet computers, web-enabled cell-phones, web-enabled smart-phones or PDAs, dedicated network accessing terminals, or any other suitable type of computing unit.

In accordance with the present invention, a user can also interact with the system 10 via the telephone 18. As will be described in more detail further on, the telephone 18 is operative for interacting with a human operator and/or an Interactive Voice Response (IVR) system 26 in order to receive and convey information with the network server 12. For example, a user may use the telephone 18 in order to call an IVR system 26 to obtain his/her next job assignment or to confirm acceptance of a newly assigned job. Although a land-based telephone 18 is shown in FIG. 1, it should be appreciated that any type of telephone unit could be used without departing from the spirit of the invention. For example, the telephone 18 could be a cell phone, a smart-phone or a VoIP phone, without departing from the spirit of the invention.

Figure 2:
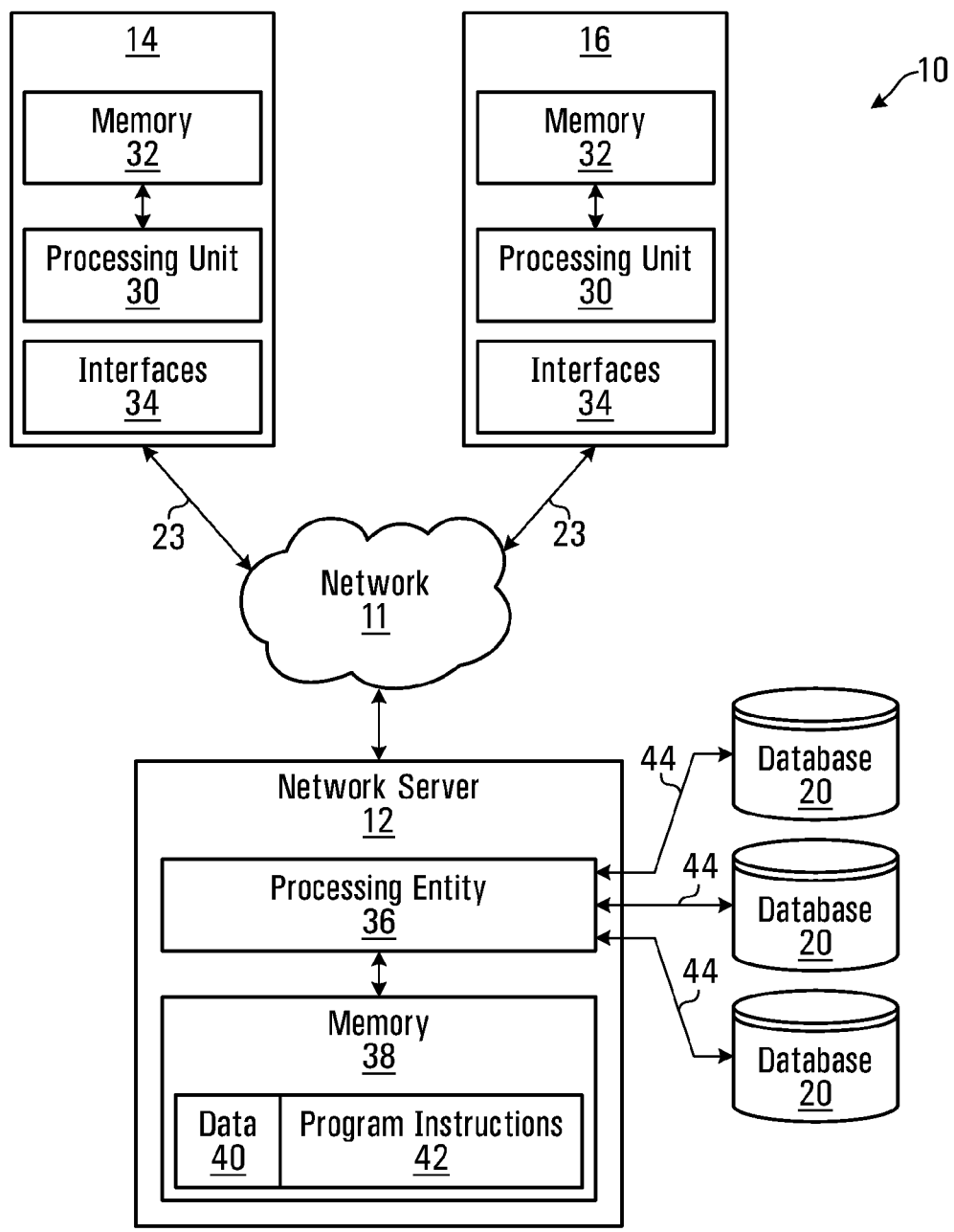
FIG. 2 is a more detailed block diagram of the human resource management system shown in FIG. 1, providing additional information on the data network arrangement and the various components of the system.

Shown in FIG. 2 is a non-limiting functional block diagram illustrating at least some of the functional components implemented at the network server 12 and at each of the workstations 14, 16.

As shown, the server 12 is a computing platform that includes a processing entity 36, such as a Central Processing Unit (CPU) that executes software and provides the core system functionality of assigning jobs to employees, and enabling the employees and managers to access and interact with information for facilitating tasks associated with the management of employee resources. The processing entity 36 communicates with a machine readable storage device, commonly referred to as "memory" 38 in which are stored program instructions 42 executed by the processing entity 36 and also data 40 on which processing is being performed. The server 12 communicates with the databases 20, 22 and 24 over communication links 44, which can be wireline or wireless links without departing from the spirit of the invention.

The server 12 uses the information from the databases 20, 22 and 24 in order to generate job assignments for one or more employees, and in order to manage other tasks involved in managing employee resources. For the purposes of the present invention, the information stored in the databases 20, 22 and 24 comprises both static data and dynamic data. For example, the static data includes data that remains the same over time, such as an employee's name and education (although this may be added to or modified over time).

In contrast, the dynamic data includes data that will change over time more quickly than in the case of the static data, such as the estimated time of arrival of a train or whether or not an employee is on vacation. The dynamic data may be updated at periodic intervals or in real-time based on information received from a user via the workstations 14, 16 or via other external data inputs 50 such as GPS receivers, track-based transponders, or via the intermediary of a railway network management system (not shown) that manages train operations. The network management system manages the rolling stock that travels over the network and would typically be able to generate data such as estimated time of arrival of a train, estimated time of departure of a train, the current train location with relation to a geographical reference, information on the constituent parts of a train, such as the train blocks a train carries, the trip plans of the train blocks, etc.

With respect to FIG. 2, each of the workstations 14, 16 is essentially a computing platform, comprising a processing unit 30 communicatively connected to a machine readable memory unit 32. The memory unit 32 stores data and program instructions (also referred in this specification as "software application(s)") for execution by the processing unit 30. The program instructions define the functionality of the workstation 14, 16. In accordance with the present invention, at least one of the software applications is operative for implementing a network browser (e.g., a web browser) with which a user can interact via a display and user input devices (as well as possibly one or more other output devices), in order to access and interact with network sites implemented by the server 12 over the network 11.

The workstations 14, 16 may also comprise a number of interfaces 34, such as an input/output interface and a network interface, for receiving and/or sending data to/from external devices or networks. For example, an input/output interface within the interfaces 34 may be able to interact with one or more user input devices (such as a touch-sensitive screen, a keyboard, a mouse, a pointing device, etc), and/or interact with one or more output devices such as a screen or speakers, among other possibilities. A network interface within the interfaces 34 allows the processing unit 30 to exchange signals with the network 11 via communication links 23. The network interface can be included within the workstation 14, 16, or could be a separate component, such as a separate modem, that is connected to the workstations 14, 16. Alternatively, the interfaces 34 could refer to so-called 'virtual interfaces' that are generated and managed at least in part by software running on the workstations 14, 16.

It should be appreciated that the functional block diagram shown in FIG. 2 may comprise other functional components depending on the specific implementation of the workstations 14, 16, and the server 12.

Train Schedule Database

Figure 4:
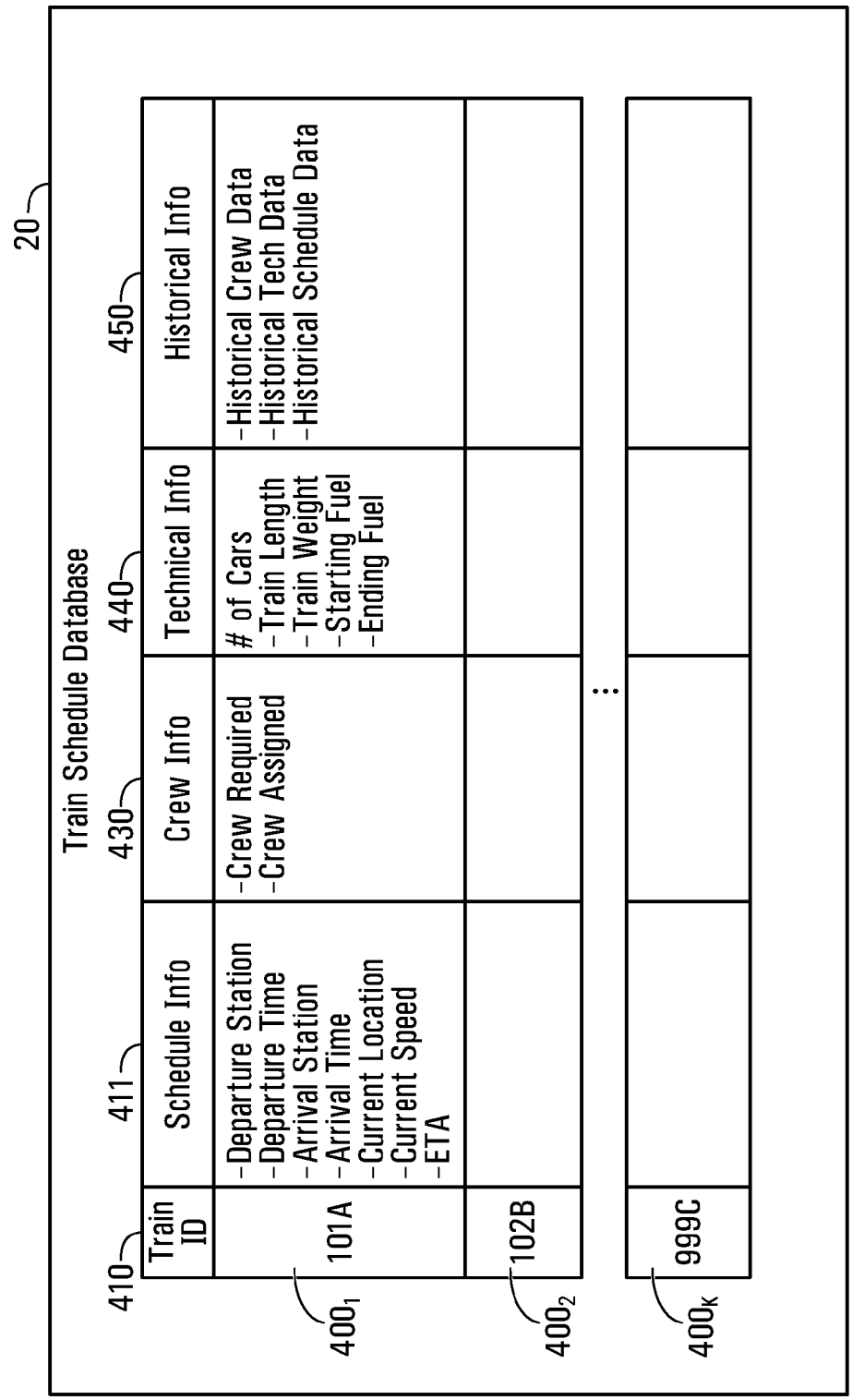
FIG. 4 is a table listing possible categories of information stored in the train schedule database shown in FIG. 1.

Shown in FIG. 4 is a non-limiting example of the type of information stored in the Train Schedule Database 20. As shown, the Train Schedule Database (or TSD) 20 comprises a plurality of records $400_{1-K}$, with each record being associated with a respective scheduled train. The train schedule database may be a stand alone database that is dedicated to the employee management system or it may be shared with other resources or functions of the railway network. As indicated earlier, a railway network usually has a railway management system for regulating and reporting on rolling stock movements. In such case, it may be more economical to share the train schedule database between the employee management and the network operations management functions. A specific possibility is to interconnect both functions such that the network server 12 receives the relevant train schedule data directly from the network management system. In this instance, the network management system would constitute the train database as it would be the source of the information.

Accordingly, the train schedules database 20, the employee profile database 22 and the constraints database 24, in addition to referring to the physical storage devices on which the data is held, are expressions used in this specification to describe generally the source of the data and not merely the physical structures in which the data is stored. For instance, if the source of the data is another network system, that network system would be considered the database for the particular information that is provided by the network system.

The TSD 20, and more specifically the plurality of records $400_{1-K}$ contained within this database, may represent the schedule for a given time period for all scheduled trains travelling in a region (or a portion thereof). A region can be a particular geographic area in, or through which, trains travel, such as a city, county, state, province or territory, among other possibilities.

Information displayed in the TSD 20 can be provided for a given time period, such as an hour, a day, a week, a month, or some portion thereof.

Each scheduled train listed in the TSD 20 may be associated with one or more records within the plurality of records $400_{1-K}$. For example, a scheduled train that travels between two stations may be associated with a single record 400 that includes data elements listing its departure station, departure time, arrival station and arrival time. In this case, a single record from the plurality of records $400_{1-K}$ may be sufficient to represent the schedule for this particular train in the TSD 20.

In many cases, a scheduled train will typically pass through a series of waypoints (such as railway stations, rail yards or other geographic waypoints) during its journey. The different waypoints through which the train passes can be determined based on knowledge of the railway network, as well as the train's point of origin, destination, route and schedule. In other words, by overlaying the train scheduling information onto the railway network, it is possible to determine the intermediate fixes or waypoints between the train's origin and destination. In order for this to be possible, information about the railway network is correlated with information about train scheduling.

Regardless of whether the waypoints are manually entered into the TSD 20, or whether the waypoints are determined based on information from a railway network source, the arrival and/or departure of a train to and from these waypoints may also be included as individual records within the plurality of records $400_{1-K}$. In such a case, each journey segment (i.e., between two points) may be represented in the TSD 20 by a corresponding record within the plurality of records $400_{1-K}$. In such a case, the schedule for this particular train would be comprised of multiple records, where each record corresponds to one particular journey segment.

Each record within the plurality of records $400_{1-K}$ includes a data element identifying the particular train to which the record applies. Using this data element (represented in FIG. 4 as Train ID 410) allows other data elements for that train to be extracted from the plurality of records $400_{1-K}$. The other data elements within each record can be categorized in different information sets, including a scheduling set 411, a crew information set 430, a technical information set 440 and an historical information set 450. Each individual data set and its elements will be described below.

In the non-limiting embodiment of FIG. 4, the scheduling information set 411 may include a departure station, a scheduled departure time, an arrival station and a scheduled arrival time. Since the name of each element explains its function, further description of these elements is unnecessary. These data elements are likely based on a preset schedule generated by the train company for each train travelling in a region.

The scheduling information set 411 may also include other data elements such as a train's current location, current speed, current altitude and an expected time of arrival (or ETA). Because this information is not known ahead of a scheduled train's departure, this information likely comes from the external data inputs 50, which may include inputs originating from the scheduled train itself or from some element of the associated infrastructure (e.g., track based transponders). As a result, these elements in the TSD 20 are likely dynamically updated during a train's journey and provide a 'snapshot' of where a scheduled train is and what it is doing, as will be described below.

The current location element typically indicates the current location of a scheduled train, which among other possibilities, may be geographic co-ordinates (i.e., longitude and latitude), or an identifier of the track segment along which the train is travelling. The location of a train may be known based on transponders affixed along the side of the track that pick up sensors on the train or individual cars and therefore can determine the identity of the train that is passing by the transponder and the time of passage. The location of these transponders is known based on information from a railway network database. In this manner, based on the known location of the transponders and the time at which a given train passed by that transponder, the current location of a scheduled train can be followed in real-time.

The current speed element typically indicates the speed of a scheduled train, which may be provided directly from the train via the external direct inputs 50. Alternatively, this element may be calculated indirectly based on differences between the last two instances of the current location data element, among other possibilities.

The ETA data element indicates when the scheduled train is expected to arrive at the arrival station. Unlike the scheduled arrival time, which may be set well before a scheduled train departs, the ETA element can be calculated while the scheduled train is en-route, thus showing a more current assessment or estimate of the time that the scheduled train will arrive at the arrival station. The ETA element is likely calculated based on other data elements in the information set that is received substantially in real-time, such as a train's current location and speed, among others.

It should be noted that the above list of data elements in the scheduled information set 411 is non-exhaustive since other elements not included in the above list would fall within the scope of the invention. For example, the set 411 could include elements showing the time duration and/or distance for each segment or the current latitude and longitude of the train.

It should also be noted that these data elements are optional and that a TSD 20 that does not include some of these elements is still included within the scope of the current invention.

It should be appreciated that the above description has simplified the railway operations, in order to facilitate understanding. In actuality, a train may have arrival/destination only in the sense that no rail cars are added to it or removed from it. In other words, it is the cars that have destinations and origins, and a train is merely a collection of cars that share a common origin/destinations. As such, it should be appreciated that the train scheduling database 20 could also include information on the composition of the train, such as the identification of the individual cars making up the train or individual train blocks, among others. The information making up the individual cars/blocks identifies the car by ID, and also by origin, destination, type of car and also type of goods it carries. For each train block, there could be a train block ID and origin and a destination.

In the non-limiting example shown in FIG. 4, the crew information set 430 includes data elements identifying the crew that is required for a train. The crew requirements may be identified by function (such as the number of engineers or brakemen needed). In addition, and as will be explained in more detail below, once a crew has been assigned to each of the jobs that is required, the crew information set 430 may also include a list of the employees assigned to perform each function.

As mentioned above, the crew requirements for each train may be categorized by general job function, such as engineer, brakeman and/or conductor. The job function may also identify specialized jobs that are performed in a rail yard (e.g., assembling trains prior to departure), particular skill sets, or certain qualifications that may be required to perform the job, such as a qualification to operate a train within a particular geographic or territorial area.

The crew information set 430 also lists the employees that have been assigned to each required job on a scheduled train. In this way, the set 430 can be used to indicate whether the required crew for each scheduled train has been found, and if so, the personnel assigned to each job function. Furthermore, the crew information set 430 in the TSD 20 may also be used to identify trains whose crew requirements have not yet been met so that employees may be assigned to fulfill these requirements.

It should also be appreciated that the crew information set 430 for a scheduled train can also be used to identify employees who are travelling on that train, but who are not assigned to perform any job responsibilities. These employees (termed "deadheads") may be travelling to, or returning from, another assignment via the scheduled train. Alternatively, the crew information set 430 may include one or more dedicated data elements to identify deadhead employees who are assigned to a particular scheduled train.

It should be understood that the corresponding crew requirements for a scheduled train that are listed in the crew information set 430 may be determined in part by other components of the TSD 20, such as elements within the scheduled information set 411 and/or the technical information set 440. For example, train crews are typically subject to certain restrictions on their working hours, such as mandated caps on the number of consecutive hours that a crew can work. If the scheduled information set 411 indicates that the duration of a particular scheduled train exceeds the mandated cap on crew working hours, then this train's original crew will need to be replaced with a new crew at some point before this cap is reached. As a result, the crew information set 430 for this particular scheduled train may identify two (or more) crews, as well as the crew switchover particulars, such as show the point where the members of a first train crew are replaced by members of a second crew.

It should also be noted that these data elements are optional and that a TSD 20 that does not include some of these elements is still included within the scope of the current description.

In the non-limiting embodiment shown, the technical information set 440 includes elements describing the general size and/or weight of the scheduled train, an estimated type and/or number of required locomotives and an estimate as to the fuel consumption for the scheduled train. The general size of each scheduled train may be expressed as a number of railcars and/or in terms of its gross weight. An estimate as to the number of locomotives expected to be required to provide motive power to the scheduled train may also be provided in the set 440, as is an estimate of the train's fuel consumption. For example, data elements indicating the estimated starting and estimated ending fuel quantities for each scheduled train (in tons or other units of measure) can be provided in the technical information set 440.

The inclusion of the technical information set 440 for a scheduled train may help (in part) to determine its corresponding crew requirements, which are provided in the crew information set 430. For example, if each locomotive in a train requires that an engineer and a brakeman be assigned to it, then a train with three locomotives will need three engineers and three brakemen.

Moreover, a scheduled train whose technical information set 440 indicates that it is using specialized equipment or is carrying a certain type of cargo may require crewmembers with corresponding qualifications and/or skill sets. For example, if a particular scheduled train is carrying hazardous materials (e.g., flammable or caustic chemicals), the crew members assigned to this train in the Crew information set 430 may be required to possess the requisite training or qualifications to handle potential emergencies with such a cargo.

It should be noted that the above list of elements in the technical information set 440 is non-exhaustive since other elements not included in the above list would fall within the scope of the invention. It should also be noted that these data elements are optional and that a TSD 20 that does not include some of these elements is still included within the scope of the current description.

The technical information set 440 for each scheduled train is likely provided from a variety of sources, such as external systems available via the external data inputs 50.

As described above, each record $400_{1-K}$ also includes data elements in a historical information set 450. For example, the information set 450 may include elements showing the on-time and cancellation history for a scheduled train, employees who have been assigned to the train in the past, as well as the train's average size and fuel consumption. The data displayed in the historical information set 450 are likely accumulated or calculated over a prior preset time period (e.g., the last week or month), which may be user-customizable.

The on-time and/or cancellation history within the historical information set 450 for a scheduled train indicate how often the train has been on-time or has been cancelled over a particular time period. The set 450 may also list of the employees who have previously worked on each scheduled train over the preset time period. This list can be reviewed to identify certain employees (or groups of employees) who have repeatedly operated a certain scheduled train in the past. Advantageously, the ability to find such repeat employees may allow identification of those employees who have gained experience operating a particular train and/or who could likely be reliably assigned to the same train in the future.

The historical information set 450 may also show the average size and/or fuel consumption for each scheduled train in the TSD 20 over the preset time period. This data may be used as inputs for the expected starting and ending fuel consumption elements found in the technical information set 440. As such, the technical information set 440 for a particular scheduled train may also be based in part on historical or archive data for prior instances of that train.

The information stored in the historical information set 450 can be used as a baseline in planning future instances of the same train, as well as to identify trends over time. The above list of elements for the set 450 is non-exhaustive since other elements not included in the above list would fall within the scope of the invention. It should also be noted that these data elements are optional and that a TSD 20 that does not include some of these elements is still included within the scope of the current description.

The historical information set 450 stores in the TSD 20 information (such as the technical data and crew information), which is not erased. In this fashion, it is possible to build a significant amount of operational information that can be searched and utilized in many different ways in order to identify patterns or trends on train operations or crew management.

Although the Train Schedule database 20 is shown as being a single database, this is for illustration purposes only. In practice, the database 20 can be comprised of a plurality of databases that are distributed over many storage locations, and that each database contains a separate part of the information described above. More specifically, the TSD 20 may be distributed in nature, such that portions of its content are stored in different data storage media, possibly located in different network components of the network 11. In addition, as indicated earlier, the train schedule database may be more generally described as a source of the information sought which may be a machine readable storage device that is accessed by the network server 12 and on which the information is stored or a separate network system which stores, maintains and generates the relevant information which is communicated to the network server 12 when required by the network server 12.

Employee Profile Database

Shown in FIG. 3 is a non-limiting example of types of data that could be stored in the Employee Profile Database 22. As shown, the Employee Profile Database 22 comprises a plurality of records $300_{1-K}$, with each record being associated with a respective employee.

Each of the records $300_{1-K}$ comprises profile information about a given employee, which in the example shown, includes information that is categorized as follows: the employee's name 302, a unique identifier associated with the employee 304, biographical information 306 associated with the employee, qualification information 308 associated with the employee, current job and location information 310 associated with the employee, the employee's job preferences 312, the employee's availability status 314 and historical/archive data 316 associated with the employee. A variety of different information can be included within each of these categories, and as such each of these categories will be explained in further detail below.

Each record $300_{1-K}$ includes information indicative of the employee's name 302, which can include the employee's full legal name (such as Kenneth Smith). Each record $300_{1-K}$ further includes a unique identifier 304 associated with the employee. This could be a unique numeric or alpha-numeric identifier that is assigned by the employee's company, and/or a government-issued piece of identification such as a Social Insurance Number, a Passport Number or a Driver's License Number. The unique identifier 304 may also include biometric data, such as a voiceprint, fingerprint or retinal print associated with the employee. Any type of information that is uniquely associated with a given employee could be used without departing from the spirit of the invention.

The biographical information 306 included within each record $300_{1-K}$ includes personal information about the employee. For example, the biographical information may include the employee's birth date, address, contact information (e.g. phone numbers, email addresses, etc) and emergency contact information. The biographical information may also include information associated with the employee's healthcare insurance, life insurance and banking information, among other possibilities. The banking information can be used for allowing the employer to make direct payments into the employee's bank account, RSP or 401K, for example.

The qualification information 308 includes any type of information indicative of seniority level, job qualifications, special skills, and/or the education of the employee. For example, the seniority level may indicate the number of years of employment the employee has worked and where the employee ranks in a seniority hierarchy. The job qualifications may be indicative of the type of job that the employee is qualified for, such as railyard worker, engineer, train conductor, etc. In addition, in the case where jobs are ranked into different levels or grades based on different responsibility levels and/or different pay levels, the employee's job ranking or level may also be included. The special skills may be indicative of any additional skill that the employee has acquired that may be taken into consideration when assigning jobs. For example, a special skill may be that the employee is licensed to drive a certain type of train, or that the employee is authorized to drive a train over a given territorial region. Alternatively, the special skills may identify any language or first aid skills possessed by the employee.

In the case where special skills are indicated, it is possible that those special skills (such as first aid skills or territorial qualifications) may expire over time, or require certain activities to be fulfilled during a given time period in order to be able to maintain those special skills. As such, in certain circumstances, the qualification information 308 may also include an indication of the limitations of those special skills (e.g., the date of expiry of the qualification), as well as the requirements needed to maintain those special skills (such as the number of hours of operation needed to maintain the qualification, medical certificate, etc). The qualification information 308 may further include an indication of the activities the employee has performed in order to maintain/renew the qualification or special skill, such as number of hours invested in renewal and what remains to be done to maintain the qualification. The information in the special skills may also take into account different countries and their respective requirements, as far as professional qualifications are concerned. Although this information is being described as being contained within the qualification information 308 in the employee database 22, it should be appreciated that this information may also be included within the constraints database 24 that will be described in more detail below.

The qualification information may further include medical certification information indicating that the employee has undergone a periodic medical fitness assessment and has been found fit to carry his or her duties. The medical certification information may be of binary nature, such as fit or unfit (the employee defaults to unfit automatically if his medical certificate expires) or may have different categories providing different level of privileges. For example, the employee may currently hold the highest medical certification that is required for certain critical job assignments. If the medical certification lapses, the employee automatically defaults to a lower level of medical certification that would make it illegal to perform the critical job assignments but still allow other job assignments of less critical nature. The qualification information would thus convey information about the current medical certification of the employee and any applicable expiry dates.

The qualification information 308 may also include information indicative of the employee's education. This education information may be indicative of whether the employee has completed high-school, a college training program or a university degree. In the case where a college program or university degree was completed, the education information may also indicate what college training program or university degree the employee completed. Any additional professional certification could also be included under the qualification information 308.

Included in each record $300_{1-K}$ is also current job and location information 310. The current job and location information includes an indication of the employee's current job assignment. This may include the job assignment's start time, end time, a description of the job and an identification of a train (if appropriate) on which the employee is working. As will be explained in more detail below, this information is updated within the employee profile database 22 when an employee accepts and is granted a new job assignment via the employee management system 10.

The current job and location information 310 may include information indicative of an employee's "home" location, which could be his or her residence village, town or city. The "home" location could also be provided based on a postal code associated with the employee's home residence. The "home" location information provides an indication of where an employee is based, which can be useful to know in the case of employees who travel a lot.

The location information 310 may also include information indicative of the current location of the employee. For example, this information may be provided in the form of the employee's most recent travel schedule indicating the dates and times an employee is supposed to be located at different destination locations. Alternatively, the current location information associated with an employee may be based on real-time GIS or GPS coordinates associated with the employee. In the case of a current GPS location, the GPS coordinates may be associated with an employee's communication device (which could be an employee's cell phone, smart phone, GPS-enabled PDA, GPS-enabled employee badge, etc). The current location information could also be based on signals received from track-based transponders. By knowing the time a train passed by a given transponder, the location of the employees on-board that train will also be known for that time. As such, based on information received in real-time, the employee profile database 22 can be updated automatically. In this manner, it is possible to know where an employee is located.

It should be appreciated that information within the employee profile database 22 can be correlated with information within the train schedule database 20. For example, in the case where a location signal is received from a track-based transponder, both information about train location within the train schedule database 20 is updated, as well as location information within the employee profile database 22 for all employees located on-board that train.

Each record $300_{1-K}$ further includes job preference information 312. The job preference information 312 may include a list of job characteristics that are preferred by an employee such as his or her preferred working days (weekdays over weekends, for example), preferred shifts (e.g., days over nights), preferred types of jobs (working on a train over working in the rail yard, for instance) and preferred locations (such as within 200 km of the employee's "home" location).

The job preference information 312 may also include a list of the employee's colleagues with whom the employee prefers to work. This may be included within a "buddies" or "friends" list, for example. Likewise, the job preference information 312 may also include a list of colleagues with whom the employee does not want to work, which could be included in an "un-friends" list.

As will be explained in detail below, the information contained within the Employee Profile Database 22 is used in order to assign jobs to one or more employees. The information that is contained within the job preference information 312 can be used in order to help assign jobs to an employee that will meet with employee satisfaction.

The Employee Profile Database 22 further includes availability status information 314 for each of the records $300_{1-K}$. The availability status information 314 provides an indication as to whether the employee is available to be assigned a job, or whether the employee is currently on another job, sick or on vacation. Obviously, in the case where an employee is sick, on vacation or working on another job, the employee will not be assigned a new job.

The availability status information 314 may also include statistical information collected or calculated based on when the employee has and has not been available over a given period of time, such as over the last 12 months. In other words, the availability status information 314 may provide information such as the number of sick days the employee has taken, the amount of vacation the employee has taken and the number of personal days that the employee has taken.

The availability status information 314 may also include information about how much an employee has worked over a given period of time, such as a week, a month and a year, among other possibilities. This information can also be used when assigning jobs to an employee. For example, if the availability status information 314 indicates that an employee has worked 40 hours within four days, then it may not be appropriate to assign any further jobs to that employee until the employee has had a few days rest.

Each record $300_{1-K}$ further includes historical/archive data 316. The historical/archive data 316 includes any information about past job assignments, past reprimands, past commendations or awards, etc. Any historical information that could have a bearing on future job assignments for the employee can be included within the historical/archive data 316. It is also possible that the historical/archive data 316 may include more thorough archived information than what is stored in the other information categories. For example, it is possible that the availability status information 314 stores information regarding an employee's sick days and vacation days over a period of a year. However, the historical/archive data 316 may store information regarding the employee's sick days and vacation days for the period covering the employee's entire employment with the company.

The information that is stored in the employee profile database 22 can include both static information and dynamic information. For example, an employee's birth date and emergency contact information that is included within the Biographical Information 306 will most likely be static information that remains unchanged for extended periods of time. In contrast, information such as the employee's current job assignment and current location, is dynamic information that will likely change over time.

The dynamic information that is included within the Employee Profile Database 22 can be updated periodically by a user, by one or more people in charge of updating the database (e.g., an employee's manager), or can be updated in real-time based on information received from external data inputs 50. For example, in the case of dynamic information (such as preferred people to work with and preferred work shifts), this information may be updated based on information received from one of the workstations 14, 16. This information can be updated through a website that can be accessed by an employee, for example. In the case of dynamic information such as the employee's current location, this information can be updated based on information received from a GPS or GIS device and can be updated through the network 11 without any human intervention.

In certain non-limiting embodiments, different information within the employee profile database 22 may be accessed by different people (or groups of people). For example, an employee may have access to only parts of the information (such as his/her biographical information and preferences), while the employee's manager may have access to other pars of the information (such as the statistics on absences and past job performance). Similarly, a financial services department may be limited to only having access to the financial information stored within the employee profile database 22. Furthermore, different levels of access may be provided to different users. For example, some users may be able to add, modify and delete information to which they have access, whereas other users may only be able to read and add to information to which they have access.

Although the employee profile database 22 is shown as being a single database, this is for illustration purposes only. In practice, the database 22 can be comprised of a plurality of databases that are distributed over many storage locations, and that each database contains a separate part of the information described above. More specifically, the database 22 may be distributed in nature, such that portions of its content are stored in different data storage media, possibly located in different network components of the network 11.

Constraints Database

Figure 5:
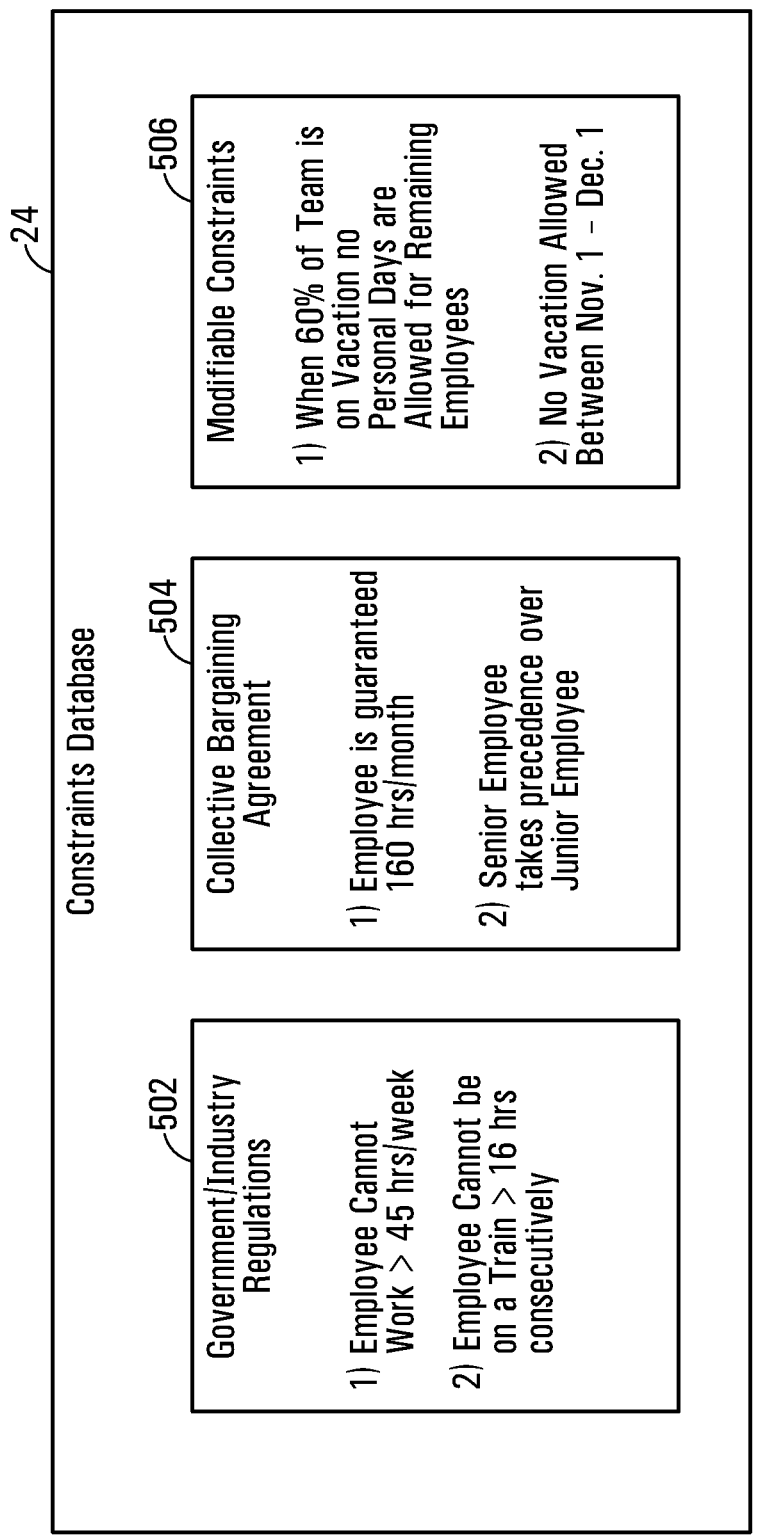
FIG. 5 is a table listing possible categories of information stored in the constraints database shown in FIG. 1.

Shown in FIG. 5 is a non-limiting example of the constraints database 24. The constraints database 24 is a database that provides conditions that should be satisfied when assigning jobs to one employee or a group of employees. As will be described in more detail below, these conditions may also be applied when handling other employee resource management tasks, such as managing employees' training schedules, vacation times and job progression, among other possibilities.

In the example shown, the constraints database 24 includes constraint content from three separate sources; namely government/industry regulations or constraints 502, collective bargaining agreement constraints 504 and modifiable constraints 506. The types of constraints that each of these sources dictates will be described in more detail below. It should be appreciated that constraints from other sources could also be included within the constraints database 24 without departing from the spirit of the invention.

As in other transportation industries, government and other transportation regulatory bodies may put constraints on working conditions for employees working in the railway industry. These constraints and regulations are for the employees' safety and well-being, as well as for the safety and well-being of the general public.

As such, government/industry regulations 502 are included within the constraints database 24. The government/industry regulations 502 may provide constraints that dictate:
the number of consecutive hours an employee can work without a break;
the maximum number of hours an employee can work during a given time period (such as a week or a month);
the qualifications/experience needed to operate certain types of equipment;
the qualifications/experience needed to perform a certain type of job; and/or
the qualifications/experience needed to work in a given territorial region. For example, some employees may only be qualified to work in Canada, while other employees are qualified to work in all of North America; in a case of a disease or illness, whether or not the medical condition is disqualifying in the sense that the employee loses his/her qualification for the duration of the condition. In addition, if a qualification is lost, the database may be configured to indicate what other duties the employee may be assigned to without creating a safety hazard. In this particular example, the database my be open to a physician to provide input as a result of a medical exam in a way to immediately update the qualification maintenance/downgrading. Note that in a possible alternative, the medical certification information on the employee that is included in the employee database could be included instead in the constraints database, in the sense that the medical requirements as far as employees are concerned constitute "constraints" that have to be met for the employee to qualify for a certain job or equipment.

It should be appreciated that these examples are given for the purposes of illustration only, and that other constraints could also be included without departing from the spirit of the invention.

The restrictions contained within the constraints database 24 may be for all employees, or may be specifically directed towards employees working in certain jobs. For example, different constraints may apply to train conductors than apply to engineers in the rail yard.

The constraints database 24 may also include an indication of the specific requirements needed to maintain certain qualifications. For example:
  in order to maintain a qualification for operating a given type of equipment (such as a train or a given type of cargo) it may be required that a minimum number of hours is performed on that equipment over a given time period;
  in order to maintain a qualification for travelling over a given track or territorial region, it may be required that a certain number of trips are taken on that track, or in that territorial region, over a given time period;
  in order to maintain a qualification for working during certain weather conditions, it may be required that a given number of overall hours are performed over a given time period; and/or
  medical certification level.

It should be appreciated that these constraints are provided for the sake of example only, and that other constraints are included within the present invention.

In many industries, workers and employees belong to unions, such that their working conditions are largely dictated by collective bargaining agreements that have been negotiated and agreed to between the unions and the company. As such, included within the constraints database 24 are constraints from collective bargaining agreements 504. The collective bargaining agreements 504 may provide constraints, such as:
  the minimum number of hours that an employee is guaranteed to work;
  the number of allowed vacation days, sick days, etc.;
  the amount of training that employees are entitled to;
  rules relating to seniority (such as when a senior employee is allowed to bump a junior employee from a job); and/or
  jobs that are reserved for senior employees;

It should be appreciated that these rules are provided for the sake of example only, and that other rules and constraints are included within the present invention.

In the case where the constraints require certain conditions to be met, such as certain qualifications, the constraints database 24 can be linked to the employee profile database 22 in order to determine the extent to which a qualification is met and actions an employee has taken in order to maintain the qualification. In other words, information within the constraints database 24 can be considered in combination with information in the employee profile database 22 in order to determine an employee that meets the requirements of a given constraint and in order to help an employee maintain his/her qualifications. This will be described in more detail further on in the specification.

As indicated above, the employee profile database 22 may contain up-to-date information on the extent to which constraints in the constraints database 24 are met, such as for certain qualifications. For example, the information in the employee profile database 22 may provide an indication of:
  the extent to which a qualification is currently met or not met, which can be a simple yes or no value (For example, is the employee qualified to drive a train above a certain weight?);
  when a qualification is set to expire or is subject to renewal, in order to provide advance notice to the employee, manager and/or employee management system 10, that something needs to be done to avoid the loss of the qualification; and/or
  a link to information that can establish execution of tasks counting toward maintenance of qualification, such as a time sheet showing the number of hours an employee traveled in the last week within a certain region.

These examples are provided for the purpose of illustration only, and other indications as to the extent to which constraints are met can be included without departing from the spirit of the invention.

In certain cases, the constraints database 24 may also include modifiable constraints 506. The modifiable constraints 506 are constraints that can be developed and changed by a manager or other person in a position that is able to manage employees. The modifiable constraints can be permanently set up by a manager or other person authorized to create constraints, or they can be temporary constraints that only apply for a given period of time.

There are many reasons that a manager or other authorized person may wish to create a modifiable constraint within the constraints 506. For example, when a group manager knows that the workload during a given period of the year is going to be heavier than usual, and that all employee resources will be needed, the group manager may create one or more modifiable constraints within the constraints 506 to prevent unwanted absences within his/her group of employees during that time period. As such, the group manager may include a constraint such as no employee is allowed to take vacation between Nov. 1 and Dec. 1.

In some cases, it is possible for the different constraints and rules contained within the constraints database 24 to be conflicting. For example, a constraint within the collective bargaining agreement constraints 504 may indicate that all union employees are entitled to 20 days of vacation a year, while the modifiable constraints database may indicate that no vacation is allowed to be taken within the last two (2) months of the year. If an employee still has 10 days of vacation left by the end of October, based on the collective bargaining agreement constraints 504, that employee is still entitled to 10 more days of vacation. However, the constraint contained within the modifiable constraints 506 would prevent the employee from taking this vacation. As such, in certain cases, different weighting or priority could be assigned to different constraints. For example, constraints or rules within the collective bargaining agreement constraints 504 may always take priority over modifiable constraints 506. Any sort of weighting or priority system could be put in place without departing from the spirit of the invention.

In accordance with a non-limiting example, the employee management system 10 may use a conflict resolution engine that identifies possible conflicts between employee "rights", safety regulations and modifiable constraints. If a manager wants to implement a constraint or modify an existing one, the engine will first determine if there is a conflict. The determination uses logic that verifies compliance with a certain number of points that can be the basis for a conflict. Those points identified in the engine are verified independently. For example, of points considered may include: (1) vacation period; (2) sickness days (3) how long has the employee worked during a period of time (last day for example), etc. The engine will receive a request from a manager to modify a constraint and will determine if the modification will violate any one rule.

For example, if a modifiable constraint within the modifiable constraints 506 is to avoid vacation during a period of time, the conflict resolution engine will determine for the entire population of employees or individually for each employee the impact of the modification. Depending on the results of the assessment, the engine may or may not allow the constraint. In instances where an employee has taken all the vacation days he/she is entitled to, the implementation of the modification may be authorized. In other instances, if the employee is still allowed to take vacation, negating this right may not be allowed by the engine, since it will violate the rules under the union agreement. This approach may produce a first sub-set of employees for which the new constrains apply and a second sub-set of employees to which the constraints do not apply.

Alternatively, the engine may offer solutions to the manager that can assist with the implementation of the desired constraint. One possibility is to indicate that the constraint may be modified on the condition that the employee is compensated in a monetary or non-monetary form (e.g., via extra vacation time or personal-leave days). In this case, the engine will return a message to the manager to indicate that the constraint can be modified for a certain employee (or group of employees), but the situation can be resolved by offering additional pay (e.g., overtime pay) or a number of extra vacation days to the employees.

In the same manner as described above with the databases 20 and 22, the modifiable constraints database 24 can include static and dynamic information. For example, the government/industry regulations 502 will most likely constitute static information that remains the same over time, whereas the modifiable constraints 506 will most likely contain dynamic information that can be added, deleted and adjusted by an authorized person. For example, a user may be able to modify the information contained within the modifiable constraints 506 via a website that can accessed by one of the workstations 14, 16 through the network 11. As will be explained in more detail below, based on input information received from the website, the network server 12 can cause information contained with the constraints database 24 to be updated/modified.

Although the constraints database 24 is shown as being a single database in FIGS. 1 and 2, this is for illustration purposes only. In practice, the constraints database 24 can be comprised of a plurality of databases that are distributed over many storage locations, with each database containing a separate part of the information described above. More specifically, the database 24 may be distributed in nature, such that portions of its content (such as each of the government/industry regulations 502, the collective bargaining agreement constraints 504 and the modifiable constraints 506) are stored in different data storage media, possibly located in different network components of the network 11.

In operation, the information contained in the constraints database 24 is used in combination with the employee profile database 22 and the train schedule database 20 in order to assign jobs to employees, among other possible uses.

Method of Assigning Jobs

Figure 6:
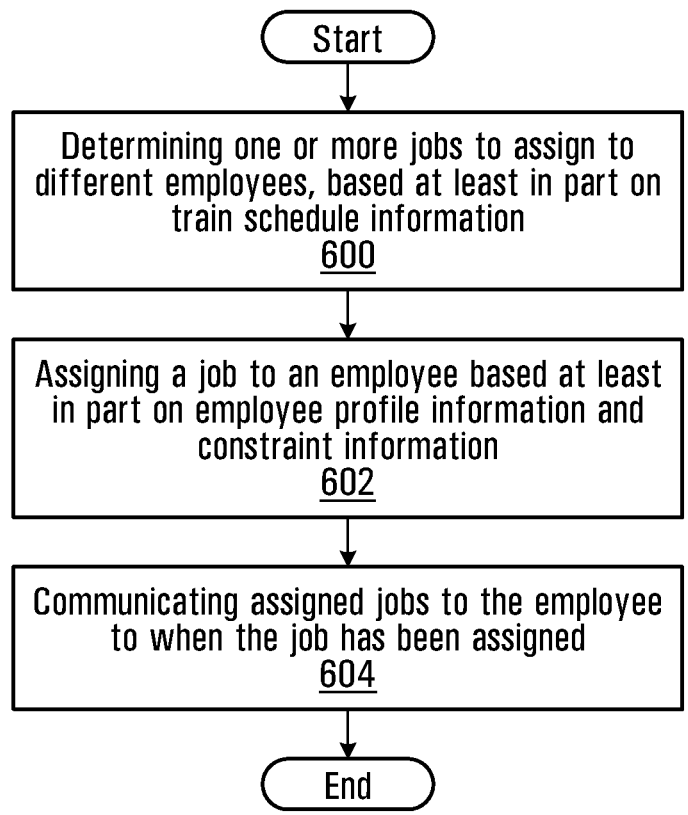
FIG. 6 shows a flow-diagram of a method of assigning jobs to employees, according to a non-limiting example of implementation.

Shown in FIG. 6 is a flow diagram of a method according to a non-limiting example of implementation implemented by the network server 12 to assign different jobs to different employees. The flow diagram is a series of steps which in practice are implemented by execution of program instructions stored in the machine readable storage of the network server 12. Note that some of those steps could also be performed locally by workstations 14, 16.

Step 600

Firstly, at step 600, the processing entity 36 determines one or more jobs that need to be assigned to the different employees. This can be done in a variety of different manners.

In accordance with a first non-limiting example, this determination can be done based at least in part on information contained within the train schedule database 20. For example, based on information regarding future train departures, the processing entity 36 of the network server 12 can determine what currently unfilled jobs need to be filled for those train departures. These may be jobs that are assigned for work on-board a train or in a train yard or train station, among other possibilities.

In accordance with a non-limiting embodiment, based on information surrounding the composition of the train (e.g., the number of locomotives, number of train cars and types of cargo) contained within the train schedule database 20, the processing entity 36 can derive the crew requirements. Alternatively, the crew requirements for the train can be directly listed within the train schedule database 20 such that this information is directly available when the train schedule record from the database 20 is accessed. In either case, the crew requirements may include information such as:

- the number of individuals needed for the crew;
- the specific job types needed for the crew (e.g., conductor, engineer, etc.);
- the qualifications required for the crew, which can be based on the type of equipment (e.g., train weight/length) and route (e.g., territorial considerations), etc.;
- the starting location for the crew (based on the train's departing location);
- the ending location for the crew (based on the train's destination location); and/or
- the length of time the crew will need to work, based on the duration of the journey.

More specifically, a software component that is executed by the processing entity 36 may derive the crew requirements on the basis of the train schedule data. In order to do so, the software component correlates pieces of information in the train schedule database 20 to job requirements. For example, the software component may include a data structure that includes a list of entries, each entry representing a particular train composition and related job requirements. In such a case, the software component extracts the train composition information from the train schedule data in the database 20 and searches the data structure to locate the corresponding entry which lists the job requirements for that particular train composition.

Alternatively, the software component executed by the processing entity 36 may follow logic rules to determine the job requirements. In such a case, the software component identifies the constituent elements of the train and builds the job requirement data accordingly, rather than trying to identify a particular train composition in a data structure. For example, assume that the train has two locomotives and that one of the logic rules dictates that at least one person is required per locomotive. The job requirement data will accordingly state that at least two individuals are necessary. In summary, the logic rules will examine the individual elements of the train to determine the job requirements for each element and then add them up to derive the global job requirement for the entire train.

The logic rules used to determine the job requirements may take into account elements such as the following:

1. Type or characteristics of the train: this element may determine the number of individuals needed and their specific qualifications such as the number of conductors, engineers, etc.;
2. Origin/destination of the train: this element may determine where the crew needs to be located for the train to depart, as well as the location where the crew will be dropped off; and/or
3. Territories over which the train travels: this element may determine the regional qualification requirements for the crew. For example if the train originates in Canada but its final destination is in the United States, the crew operating the train would need to have a qualification that is satisfactory to operate a train in both countries.

Note that the list above is merely exemplary and more or less factors may be involved in the job requirement determination without departing from the spirit of the invention.

The crew requirements may be derived solely on the basis of information contained within the train schedule database 20. Alternatively, information contained within other databases (such as the constraints database 24, the employee profile database 22 and a railway network database) could also be used in order to determine the crew requirements.

In order to obtain the information needed to determine the crew requirements, the processing entity 36 may periodically retrieve the scheduling information from the train schedule database 20 (such as once a day, once a week, etc). The retrieval of information from the train schedule database 20 (and possibly other databases) can be performed on the basis of program instructions 42 stored within the memory 38 of the network server 12. Each time the processing entity 36 accesses and retrieves information from the train schedule database 20, the processing entity 36 is able to determine jobs that need to be assigned in order to fill crew requirements. In this manner, the information necessary to determine the jobs that need to be assigned can be pulled from the train schedule database 20 by the processing entity 36 of the network server 12.

In an alternative embodiment, instead of being able to determine the list of jobs from information stored in the train schedule database 20 in an automated fashion, the jobs that need to be assigned can be provided manually by staff (or other resources) of the employer. For example, keeping with the example of the railway industry, it is possible that the railway company has a dedicated group of people (such as a scheduling group) that is responsible for generating the train schedules and determining the jobs that will need to be assigned in order to have these schedules executed properly.

The train schedules that are generated by this group can be used to update the train schedule database 20 and to establish jobs that will need to be filled in order to have the train schedule operate in the way that has been scheduled. In such a case, instead of requiring the processing entity 36 to obtain the information from the train schedule database 20, the group responsible for establishing the train schedules may simply provide the list of jobs that need to be assigned directly to the processing entity 36. In this manner, the processing entity 36 does not need to have functionality and programming logic in order to be able to derive the jobs from the information contained within the train schedule database 20, since the list of jobs is provided directly to the processing entity 36 from an external source.

Step 602

At step 602, once the processing entity 36 of the network server 12 has determined one or more jobs that need to be assigned in order to fill crew requirements, the processing entity 36 proceeds to assign those jobs to various employees. In accordance with the present invention, the processing entity 36 assigns the jobs to employees based at least in part on information contained within the employee profile database 22 and the constraints database 24. For example, the information within the employee profile database 22, such as the qualification information 308 and the job preference information 312, will allow the processing entity 36 to assign a job to an employee based on the employee's qualifications and preferences. This can result in the job being assigned to an employee who is well suited to that job and is also motivated to do it. In addition, the information within the constraints database 24, such as the government/industry regulation constraints 502 and the collective bargaining constraints 504, will allow the processing entity 36 to establish whether or not the assignment of a job to a given employee is allowable.

The information contained within the employee profile database 22, can be used by the processing entity 36 in a variety of ways in order to assign jobs to different employees. This information can be used not only to assign the appropriate employees to the appropriate jobs, but can also be used in order to improve employee satisfaction in the jobs that they are being assigned by taking into consideration their preferences.

For the sake of example, consider the case where a conductor job needs to be assigned. At step 602, the processing entity 36 may first determine based on the qualification information 308 within the employee profile database 22, a first list of employees who are able to fill a conductor job position. Then, the processing entity 36 may then be able to reduce the first list of employees to a second list comprising reasonably smaller number of employees that are suitable for the job based on other information, (e.g., where the employees in that list are located, where their "home" location is and whether or not they are available). This second list of employees may be further reduced based on the job preference information 310 for those employees. For example, if the conductor job that needs to be assigned is during a night shift, then the job may be assigned to an employee that has indicated that he/she prefers working night shifts.

As such, once the processing entity 36 has determined the jobs that need to be filled, the job assignment process performed at step 602 may identify suitable employees for each individual job based on the following logical steps:

generate a list of employees that have the appropriate qualifications for the job;

filter that list of employees based on the availability and location of the employees within that list, in other words identify the employees that are present at the location at which the job will be carried out and that are also available for duty; and further filter that list of employees based on employee preferences.

It should be appreciated that other logical steps may be included, and the order that the logical steps are performed may also vary.

A more detailed explanation of specific manners in which the processing entity 36 uses the information contained within the employee profile database 22 in order to assign jobs will be described in more detail further on in the specification.

Once a sub-group of employees has been extracted based on the above logical steps, constraints and requirements contained within the constraints database 24 may further reduce the subgroup of employees that are suitable for the task. The information contained within the constraints database 24 is used in order to ensure that the job assignments remain in compliance with government regulations and/or collective bargaining agreements. Staying with the example of the conductor job position, it is possible that certain employees that are qualified to fill this job may not be eligible for the job due to constraints contained within the constraints database 24 for a variety of reasons. For example, a potential conductor may not be eligible for a job if the employee has already worked too many hours within a given time period. Similarly, a potential conductor may not be eligible for a job if there is another employee who has higher seniority and is also eligible for the job.

A more detailed explanation of the manner in which the government/industry regulations 502, the collective bargaining constraints 504 and the modifiable constraints 506 are used by the employee management system 10 will be described in more detail throughout the specification.

The information contained within the employee profile database 22 may be taken into consideration by the processing entity 36 prior to the information contained within the constraints database 24. However, it should be appreciated that the processing entity 36 can consider the information in these two databases in the reverse order, or simultaneously, without departing from the spirit of the invention. In other words, the processing logic that is applied to the information within the employee profile database 22 and the constraints database 24 may be done in any manner possible in order to arrive at a set of job assignments. The manner in which the processing entity 36 takes into consideration the information contained in the employee profile database 22 and the constraints database 24 can vary greatly and will be apparent to a person skilled in the art.

It is possible that after processing the information in both the employee profile database 22 and the constraints database 24, more than one employee may be found to be a good match for a particular job. In such a case, the processing entity 36 may arbitrarily assign the job to one of those employees. The manner in which the processing entity 36 chooses between two or more equally qualified employees could be based on program instructions 42 contained within the memory 38 of the network server 12. The choice between two or more equally qualified employees may be completely random, or based on a certain logic implemented by program instructions that make the choice between employees equitable over time. An example of a possible logic rule is to take into account seniority when assigning jobs. Under such a logic rule, if more than two employees qualify for a job, the job will be assigned to the most senior employee.

Step 604

Once the network server 12 has assigned jobs to various employees, at step 604 the processing entity 36 then communicates the job assignments to the employees that have been assigned those jobs.

As described above, included within the employee profile database 22 is biographical information 306 that includes contact information for each record $300_{1-k}$ that is associated to a respective employee. As such, once the processing entity 36 has determined which employees have been assigned jobs, the entity 36 can then access the contact information for those employees in order to be able to communicate the job assignment to those employees. As indicated above, the contact information may include a phone number and/or an email address associated with each employee. Included within the biographical information 306 may also be an indication of a preferred manner to communicate with the employee.

For example, assume the biographical information 306 for a particular employee indicates that the employee's preferred manner of communication is via email. Therefore, to communicate the job assignment to this employee, the processing entity 36 can cause an email to be sent to the employee's email address with details of his or her next job assignment, such as the date, time and nature of the job.

Alternatively, the entity 36 can cause a phone call to be initiated to the employee that would advise the employee of the date, time and nature of the job. The phone call can be placed by a human operator or job dispatcher, or alternatively, the phone call can be automatically placed by the IVR system 26 based on receipt of instructions from the processing entity 36.

In yet a further alternative embodiment, the processing entity 36 may communicate the job assignment to an employee by posting the job assignment to a website that can be accessed by the employee. The website may be a public website that can be accessed simply by accessing the URL address or the website may be a private website, such as an Intranet that requires the employee to log-on using a username and password. In either case, once the website has been accessed, the user can navigate through one or more web pages in order to determine the job that has been assigned to him or her. In accordance with a non-limiting embodiment, when the job assignment has been posted to a website, the posting includes the date, time and nature of the job.

Once a job assignment has been communicated to an employee, the employee management system 10 generally requires confirmation from the employee that the job assignment has been acknowledged and accepted. Regardless of how the job assignment has been communicated to the employee (i.e. by email, phone or via a webpage) the employee may communicate his/her acknowledgement and acceptance of the job via any one of email, phone or webpage submission. For example, in the case where a job assignment was communicated to the employee via email, then the employee can acknowledge and accept the job assignment via a reply email. Likewise, when the employee is communicated his/her job assignment by telephone, the employee can acknowledge and accept the job assignment by confirming to the caller (whether human or IVR) that the job is accepted.

It should be appreciated that acknowledgement and acceptance of a job assignment by an employee may use a different method that that which was used initially to communicate the assignment to the employee. For example, in the case where a job assignment is communicated to an employee via email, then the employee can acknowledge and accept the job assignment by calling a hot-line and accepting the job by telephone. Alternatively, the employee could log on to the job assignment website and confirm his or her acceptance of the job assignment via a web interface.

The manner in which the processing entity 36 coordinates the communication with the employee, such that no matter how the system 10 communicates with the employee or how the employee chooses to communicate with the system, the appropriate information is conveyed and received properly.

Now that the overall method used by the processing entity 36 for assigning jobs to different employees has been explained with reference to FIG. 6, various specific examples of how the information within the databases can be used to assign jobs to employees will be described.

Assignment of Jobs Based on Geographic/Territorial Considerations

In accordance with a non-limiting example of the present invention, the processing entity 36 of the network server 12 may assign jobs to employees based at least in part on geographic and/or territorial qualifications. Geographic and/or territorial qualifications are qualifications that allow an employee to perform particular operations or job functions within a certain geographic or territorial area, such as acting as a train 'pilot' within a certain state or province.

The particular geographical or territorial requirements for a job position are derived as follows. The train schedule database contains information that defines the trip plan of a particular train, such as the origin, the destination and the route between the origin and the destination. On the basis of the trip plan it is possible to determine the geographical or territorial characteristics of the trip. For example, a trip that originates in Montreal and ends in Chicago implies that the train will travel in Canada and then in the US. Since the route crosses an inter-country border, two different train operation regulations will need to be considered, namely the Canadian regulations and the US regulations. The same general approach can be applied within the same country that has different provinces or states each having different regulations; if the train route spans different provinces or states, the different regulations imposed by those different provinces or states will need to be taken into account.

The logic for extracting the geographical and territorial requirements operates as follows. Once the train route is determined on the basis of the information stored in the train schedule database, a geographical and territorial rules engine examines the train route data and outputs the geographical and territorial requirements. The rules engine first maps the train route data against a geographic database to determine the geographic and territorial components that need to be considered. In the example above, the rules engine determines that two countries are being included in the trip. The particular regulatory requirements are determined by consulting a table or any other suitable data structure mapping regulations to respective countries. For instance, Canadian regulations may require for a particular train a conductor that has at least 50 hours of train operations performed during the last 12 months. The US counterpart regulations may require 75 hours. The rules engine, therefore outputs the two requirements or constraints that need to be met by the employee that would be assigned the conductor position.

Geographic or territorial qualifications may also be based on terrain conditions, such as whether an employee is qualified to pilot trains within a mountainous area. Qualifications may also be based on borders, such as whether an employee is qualified to work in one country (e.g., Canada), but not in another (e.g., the United States).

As briefly mentioned above particular jobs that can be assigned to employees may have a requirement for one or more geographic or territorial qualification(s). Such territorial qualifications may be implemented based on rules and regulations of an external authority (such as a state or federal licensing body) to ensure that such tasks are performed by those employees who have either been trained for and/or are experienced with the task. In such a case, the geographic or territorial qualification requirements may be included within the government regulatory constraints 502 of the constraints database 24.

Alternatively, the geographic or territorial qualifications may be implemented as part of a collective bargaining agreement between the employer and a union. In such a case, the geographic or territorial qualification requirements may be included within the collective bargaining agreement constraints 504 of the constraints database 24.

For example, it is possible that the collective bargaining agreement may specify that only those employees with a certain seniority level are allowed to pilot and/or perform other job functions on trains within a desirable geographic area.

Typically, employees obtain geographic or territorial qualifications through training, experience, or some combination thereof. For example, a train engineer may gain a territorial qualification to pilot a train within a particular area by working for 50 hours with another engineer who has experience piloting trains through this area.

Furthermore, maintaining a geographic or territorial qualification may require that certain activities be performed. In certain situations, an employee may need to pass a medical test every year in order to maintain the qualification. In other situations, an employee may need to perform a certain amount of work within a particular geographical area over a certain time period in order to maintain their geographic qualification for that particular area. For example, once a train engineer has gained a geographic qualification to pilot a train in a mountainous area, he or she may need to accumulate at least 50 hours of piloting time over a 12-month period within this area to maintain his/her qualification. Otherwise, the engineer's territorial qualification will lapse and he or she will need to spend time to regain that qualification.

Therefore, when the processing entity 36 is assigning jobs that require a given geographic or territorial qualification, the entity 36 may take into consideration whether or not the employee has the required geographic qualification, as well as whether that qualification has been properly maintained.

Figure 8:
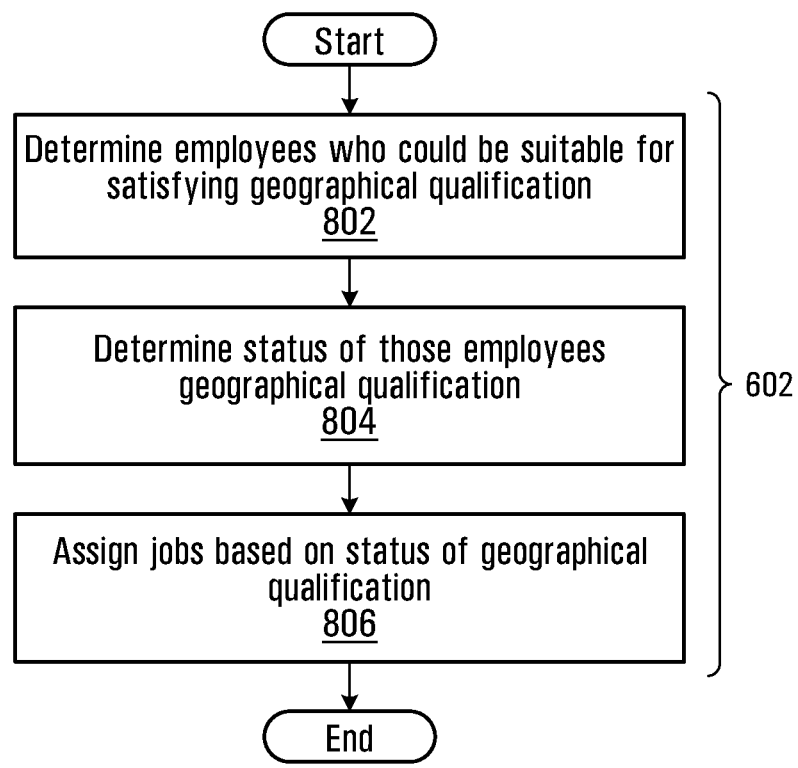
FIG. 8 shows a flow-diagram of a method of assigning jobs to employees on the basis of geographical qualifications, according to a non-limiting example of implementation of the invention.

Shown in FIG. 8 is a non-limiting flow-diagram of a method that could be used by the processing entity 36 in order to take into consideration the geographic or territorial qualifications of employees when assigning jobs. Each of these steps would be included within step 602 of FIG. 6, once the processing entity 36 has determined at step 600 that one or more jobs need to be assigned to the different employees.

Step 802

At step 802, the processing entity 36 determines employees who may be suitable for jobs requiring the necessary geographic or territorial qualification(s). When considering geographic or territorial qualifications for the purposes of assigning jobs to employees, the processing entity 36 first determines the applicable geographical and territorial qualification requirements as discussed earlier. Next, the processing entity 36 may initially consider the overall pool of employees who possess the determined geographic or territorial qualification(s), regardless of the status of their qualification (e.g., current or lapsed).

Considering the overall pool of such employees may allow the processing entity 36 to determine whether there are enough available employees with the requisite geographic qualifications to satisfy the number of available jobs where such qualifications are required. Otherwise, a human manager or scheduler may be alerted that the total number of potential employees with the required geographic qualification is less than the total number of jobs requiring this qualification.

The processing entity 36 can determine the employees with the required geographic or territorial qualifications by searching the employee profile database 22. In particular, the qualifications information 308 contained within the database 22 lists all qualifications associated with an employee, which likely includes his or her geographic or territorial qualifications. By searching the qualifications information 308, the processing entity 36 can identify all employees in the employee profile database 22 who have geographic or territorial qualification(s), which may then be subsequently filtered to determine those who possess the particular geographic qualification(s) needed.

The search conducted by the processing entity 36 of the qualifications information 308 within the employee profile database 22 can be done on a per-job basis, whereby a search of the qualifications information 308 is performed for each job requiring a geographic or territorial qualification. The entity 36 can also conduct a search of the qualifications information 308 within the database 22 for multiple jobs simultaneously. For example, the processing entity 36 may search the qualifications information 308 to identify employees with geographic or territorial qualifications in order to fill crews for all scheduled trains over the next 72 hours.

Step 804

At step 804, the processing entity 36 determines the status of the geographical or territorial qualifications for those employees identified in the previous step.

The status of an employee's geographic or territorial qualification can be determined in various ways, such as from information contained in the qualification information 308 of the employee profile database 22. For example, the qualification information 308 may include an up-to-date indication of the status of the employee's qualification, as well as an indication of the requirements to maintain the qualification and the activities that have been performed in order to maintain that qualification.

Alternatively, the status of an employee's geographic or territorial qualification can be determined based on a combination of information in the employee profile database 22 and the requirements outlined in the constraints database 26. For example, the employee profile database 22 may include an indication of the employee's qualifications, as well as his/her actions over a given time period (such as which territorial regions he/she has covered, how many hours were spent in those jobs, etc). The constraints database 24 may include an indication of the requirements needed to maintain the qualification, such that by considering the requirements in the constraints database 24 together with an employee's past activities in the employee profile database 22, the status of the employee's qualifications can be determined by the processing entity 36.

Step 806

At step 806, the processing entity 36 proceeds to assign jobs to employees based on the required geographic or territorial qualifications needed to perform a job, as well as possibly based on the status of an employee's qualification(s).

During this step, job assignment by the processing entity 36 may be performed based on logic contained within the program instructions 42 of the network server 12. For example, this logic may cause the processing entity 36 to assign jobs as follows:

A) Based on employees who have the territorial qualifications, regardless of the "status" of the qualification. In this case, a job may be assigned so long as the employee has the qualification, and meets all the constraints within the constraints database 24. Once it has been determined that the employee meets the territorial qualifications, other considerations such as availability, employee preferences, etc., may also be taken into consideration.

B) Based on employees who have the territorial qualification, taking into consideration the "status" of their qualification. For example, the processing entity 36 may assign jobs to employees in such a way as to ensure that employees maintain their territorial qualifications. This case will be discussed below.

C) Based on employees who had the territorial qualification, but whose qualifications have now lapsed. For example, the processing entity 36 may assign jobs to employees in such a way to allow employees whose qualifications have lapsed to renew their qualifications. This case will also be discussed below.

In certain cases, the logic followed by the processing entity 36 to assign jobs may be based on the consideration of a current "status" of an employee's geographic or territorial qualification. It should be appreciated that this information was determined by processing entity 36 at step 804, such that at step 806 the entity 36 can use this information to consider the status of an employee's geographic or territorial qualification when assigning jobs.

For example, assume that during step 804, the processing entity 36 labeled employees who were not in danger of losing their geographic or territorial qualification with one status ("Status A" employees), while those employees who are in danger of losing their qualification were labeled with another status (such as "Status B" employees). An employee may be considered to be in danger of losing his/her qualification if he or she needs to log a certain number of hours within a given time period, and the expiry of that time period is approaching. An employee's status could be stored by the entity 36 as a tag, flag, priority weighting or some other non-limiting indicia.

By labeling employees as having Status A or Status B, the processing entity 36 can take this status into consideration when assigning jobs at step 806. For example, the entity 36 may assign jobs in such a way that those employees who are in danger of losing their geographic qualification (i.e., the Status B employees) have priority for jobs that would help them fulfill requirements necessary to retain their qualifications.

When the logic followed by the processing entity 36 to assign jobs is based on employees whose geographic or territorial qualifications have lapsed, it should be appreciated that the entity 36 already has this information from step 804, where it determined the status of the geographic or territorial qualifications of employees. Using this information, the processing entity 36 can assign jobs in such a way that those employees whose geographic or territorial qualifications have lapsed can be assigned to jobs that will help the employee complete the tasks necessary to renew his or her qualification(s).

For example, if a condition for the renewal of a geographic or territorial qualification is that the employee who is renewing his or her qualification must work with someone whose qualification is currently in good standing, the processing entity 36 could attempt to assign jobs so that a Status B employee works on a job (or jobs) together with a Status A employee.

The above examples show how the processing entity 36 may assign jobs to employees based on whether an employee's qualification corresponded to a particular "status".

Based on the logic for assigning jobs, the processing entity 36 may be able to achieve certain objectives, such as:
1) Assigning jobs requiring a geographic or territorial qualification to those employees possessing such a qualification;
2) Maintaining the geographic qualification of employees who currently possess this qualification; and/or
3) Renewing the geographic qualification of employees whose qualification has lapsed.

It should be understood, however, that job assignment at step 806 may also include other objectives that are different and/or are not listed above.

One potential result from implementing the above method is that it may be possible for the processing entity 36 to achieve all three above objectives when assigning jobs to employees where geographic or territorial qualifications are required. Of course, it should be understood that other ways of assigning jobs to employees are indeed possible and that the geographic and territorial qualifications discussed above may constitute only one possible factor in the job assignment process performed by the processing entity 36 at step 602.

It is also worth noting that the information used by the processing entity 36 to perform steps 802, 804 and 806 may be stored in the TSD 20, the employee profile database 22 and/or the constraints database 24, or some combination thereof. In one embodiment, the crew information set 430 in the TSD 20 may indicate the particular geographic or territorial qualification(s) needed to pilot a scheduled train for all or part of its journey, the constraints database 24 may indicate the maintenance conditions for each qualification (e.g., number of hours of work experience within a particular time period), while the qualification information 308 within employee profile database 22 identifies the employees with the requisite geographic or territorial qualification and the relative standing of their qualification (e.g., current or lapsed). Of course, other embodiments are possible without departing from the spirit of the invention.

Employee Dispatching Based on Location

In accordance with a non-limiting example of the present invention, the processing entity 36 of the network server 12 may assign jobs to employees based at least in part on the location of the employee. Location information, such as an employee's current location, as well as their "home" location can be important in assigning jobs, particularly in the railroad transportation industry where jobs may begin and end at different geographical locations.

For example, in the case of assigning crews to work on trains, it is often necessary to dispatch train crews to remote locations and/or return crews from remote locations. In such cases, other methods of transportation are required in order to re-locate crew members. These other forms of transportation can include taxi rides, bus trips, even helicopter trips and/or other train rides. When such relocation is necessary, minimizing the amount of such travel for one or more employees would be advantageous for both the company (which likely saves money), as well as for the employee(s), since an employee's quality-of-life likely improves from not having to spend as much time away from his or her family.

Therefore, when it is necessary for the processing entity 36 to assign jobs that take place on a train, the entity 36 will take into consideration the location of that train (both at the start and end of its journey), as well as the location of the employees being assigned to work on that train.

The information regarding the location of the employees is contained within the employee profile database 22. This information can be found in the current job and location information 310, shown in FIG. 3. As mentioned above, the information 310 includes both the employee's "home" location and the employee's current location. The employee's "home" location can be considered static information given that it will most likely remain the same for long periods of time. In contrast, the employee's current location can be considered dynamic information given that while an employee is on a job, the employee's current location may change frequently. This is particularly true in the situation where the employee is working on a train that is constantly moving.

When considering location information for the purposes of assigning jobs to employees, the processing entity 36 may first take into consideration employees' current locations, which for the purposes of the present invention are updated in substantially real-time. For example, information regarding employees' current locations may be provided via GPS positioning of devices associated with the employees (such as smart-phones or dedicated GPS transceivers), a GIS device or any other mechanism that provides an indication of the employee's current location.

Based on the current location information associated with the employees in the employee profile database 22, the processing entity 36 can generate a list of employees who are (or likely will be) located in reasonably close vicinity to the train on which jobs need to be assigned. The list of employees may include employees who live close geographically to the starting location of a train, as well as employees who are about to finish other jobs that terminate in relatively close proximity to the starting location of a train. As such, based on the current location information, the processing entity 36 can quickly generate a list of employees who are actually located within the vicinity of the train. Given that the current location information in the current job and location information 310 is updated in substantially real-time, this information provides an accurate indication of employees that are within the vicinity of the train.

Obviously, this information will be considered in combination with whether or not the employees within the vicinity of the train are available to work (i.e., the employee is not on sick leave or is assigned to another job), as well as with information contained within the constraints database 24.

By assigning employees to jobs that are in close proximity to their current location, efficiency can be obtained both in terms of time and expense in dispatching a crew to the start of a job. More specifically, based on current location information about an employee, as well as movement information about an employee (which can be obtained based on GPS information and/or track-based transponder information), assignment of jobs can be done efficiently and with the least amount of disruption to an employee's schedule.

In addition, the processing entity 36 may consider the employee's "home" location information in order to determine how far the employee will need to be transported back to his/her home once a job has been completed. Alternatively, the entity 36 may consider information, such as the end location of the job and whether there is another train departing from that location that is returning to the employee's home location. In the case where there is such a return option, the processing entity 36 may be able to assign another job to the employee in the reverse direction, such that the employee is able to fulfill another job assignment while travelling back to his/her "home" location. As a result, additional transportation does not need to be organized in order to return the employee to his/her home location. In such cases, other considerations, such as constraints on the number of consecutive hours an employee can work, as well as how many hours in a month an employee can work, may also have to be considered.

As such, based at least in part on the employee's current location and "home" location, the processing entity 36 can assign jobs while also achieving the following objectives:
1) minimize the amount of travelling required to re-localize employees both before and after a job assignment; and/or
2) obtain a real-time understanding of the availability of employees based on their location.

In accordance with a non-limiting example of implementation, the processing entity 36 can minimize the amount of re-localization travel by taking into consideration both the distance that an employee would need to travel to get to the job location (which may be the departure station of the train), as well as the distance an employee would need to travel in order to return home after the job is finished (which could be a far distance depending on how far the train travels). Any suitable algorithm or processing logic could be implemented in order to arrive at a job assignment situation that minimizes the amount of re-localizing transportation. These algorithms would be apparent to a person skilled in the art, and as such will not be described in more detail herein.

In addition, by having a substantially real-time knowledge of the location of the employees, the processing entity 36 may be able to dynamically assign jobs to employees that take into consideration changing and evolving schedules, such as in the case where a train is delayed or is ahead of schedule, among other possibilities.

Figure 7:
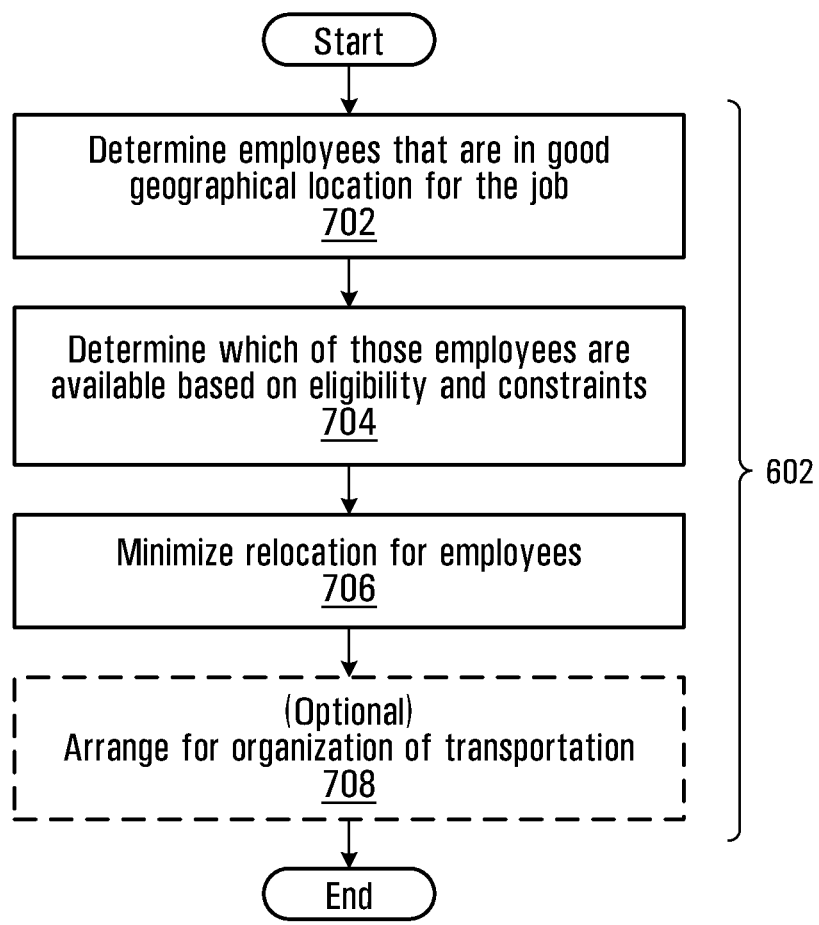
FIG. 7 shows flow-diagram of a method of assigning jobs to employees on the basis of geographical location, according to a non-limiting example of implementation of the invention.

Shown in FIG. 7 is a non-limiting flow-diagram of a method used by the processing entity 36 in order to take into consideration the location information of employees. Each of these steps would be included within step 602 of FIG. 6.

Step 702

Firstly, at step 702, the processing entity 36 determines which employees are in a 'good' (in other words, proximate) geographical location to be assigned to a given job. This may be done in the manner described above, by considering the current location information within the employee profile database 22. In general, employees would be considered to be within a good geographical location for a potential job assignment if their current location is within a given pre-determined proximity to the start and/or finish of the job.

Step 704

At step 704, the processing entity 36 would consider the list of employees that have been determined to be in a good geographical position for the job with information regarding the availability of those employees. The availability of the employees may be determined based on other information within the employee profile database 22, as well as information contained within the constraints database 24. In certain circumstances, an employee may be located in close geographic proximity to the beginning of a job, but may not be eligible to work that job based on various constraints identified in the constraints database 24, such as having worked the maximum number of consecutive hours as mandated by a regulatory body.

Although steps 702 and 704 are shown in sequential order, it should be appreciated that these steps could be performed simultaneously without departing from the spirit of the invention. In accordance with a first non-limiting example of implementation, only employees that have the appropriate qualifications for the jobs that need to be assigned would be considered at step 702 in the determination of employees that are in a good geographical location. Alternatively, once employees having a good geographical location have been determined, then this list is filtered in order to identify employees that have the appropriate qualifications for the jobs. In this example, this process would be done at step 704.

Step 706

At step 706, once the processing entity 36 has determined a list of employees that are eligible to work the jobs that need to be assigned, the processing entity 36 runs an algorithm in order to assign jobs to a crew that would minimize re-location that would need to take place. As described above, this minimization may be done by calculating for each employee the distance that must be traveled by the employee to reach the job site, the distance that must be traveled by the employee to return home from the job site and whether or not the employer is required to supply the employee with the transportation to and from the job site. For example, the employer may only be required to transport employees to or from a job site when the distance from their home location exceeds 50 km.

After step 706, the processing entity 36 will have a list of employees that can be assigned to different jobs on a train and that would minimize the amount and/or costs of re-location transportation.

Step 708

Step 708 is an optional step, wherein once the processing entity 36 has generated a crew of employees to work on a train that minimizes the amount of re-location transportation required, the entity 36 may then automatically organize and/or set up the transportation required to get the crew to/from the start/end locations of the job(s).

This may be done by contacting one or more transportation companies, such as taxi, bus or helicopter companies, in order to establish times and locations for pick up of employees. The processing entity 36 may initiate contact by causing an email to be sent to one or more of the transportation companies. Alternatively, the entity 36 can cause the IVR or a human operator to telephone one or more of the transportation companies.

For example, in the case where a bus company is used to re-locate employees, tickets for the bus journey can be pre-purchased for the employee. In the case where a taxi or helicopter is hired, the transportation service can be pre-paid such that payment does not need to be handled by the employees that will be shuttled to/from a job. Other communication channels can also be used to automatically submit a request for transportation. The request may contain information about the trip, such as the number of individuals to pick up, their names, origin and destination and the time for pick up. The request may also contain any identification requirements required for transport, such as each employee's drivers license and/or passport numbers.

Synchronization of the Communication System

As described above, once the processing entity 36 has determined which employees have been assigned jobs, the entity 36 then communicates those job assignments to the appropriate employees. The communication of job assignments can be done by:
- a phone message to the employee (this can be done via a human operator or the IVR system 26, among other possibilities);
- an email to an employee email address;
- a posting to a website that is accessible to employees.

The information necessary to contact the employee by phone or by email can be found in the biographical information 306 of the employee profile database 22, as described above.

Once a job assignment has been communicated to an employee, it is important that the employee management system 10 receives confirmation and acknowledgement from the employee that the job assignment has been received and accepted (or rejected, in certain circumstances).

In order to keep track of whether a job assignment has been accepted, the network server 12 keeps a record of the jobs that have been communicated to the employees and whether acknowledgement of the jobs have been received. Shown in FIG. 9 is a non-limiting example of a job assignment database 900 that is stored within the memory 38 of the network server 12 in order to keep track of jobs that have been assigned. The database 900 is updated whenever communication between the network server 12 and an employee takes place.

The database 900 includes a plurality of records $902_{1-k}$, that are each associated with a respective job that has been assigned. Each record includes a plurality of data elements. In the non-limiting example shown, the data elements are indicative of a job code 904, an employee name/identifier 906, the date the job was communicated to the employee 908, the date the job needs to be performed 910, how the job assignment was communicated to the employee 912 and status of the confirmation 914. It should be appreciated that additional or fewer data elements could be included within each record $902_{1-k}$ without departing from the spirit of the invention. Each of the data elements will now be described in more detail.

The job code 904 includes a data element indicative of the job that has been assigned to the employee. The job code 904 can be an alphanumeric code that identifies the type of job, or alternatively, the job code can be a text description of the job and what the job entails. The job code 904 can be any form of data element so long as it provides some indication of the job that has been assigned to the employee.

The employee name/identifier 906 can include a data element indicative of the employee's name (such as the employee name element 302 contained within the employee profile database 22), or alternatively, can include an employee ID number (such as the identification number element 304 contained within the employee profile database 22). So long as the employee name/identifier 906 includes information that is able to uniquely identify the employee to whom a job has been assigned, the employee name/identifier 906 can include any type of information.

The database 900 further includes a data element indicative of the date the job assignment has been communicated 908 and a data element indicative of the date the job assignment is to be performed 910. These data elements provide an indication as to when a job was communicated to the employee, and when the job is to be performed. In general, when a new job is assigned to an employee, the job assignment is communicated to the employee about one week to 10 days prior to the date on which the job is to be performed.

The database 900 also includes a data element that is indicative of how the job assignment was communicated to the employee 912. For example, the job assignment could have been communicated to the employee via telephone, email or via a web-site posting, among other possibilities.

Finally, the database 900 includes a data element that indicates the current status of confirmation 914. The confirmation status element 914 provides an indication of whether the employee has:

not yet acknowledged receipt. For example, this status could occur if the job assignment was communicated by phone and a phone message was left. This could also be the status if the job assignment was communicated by email but no read-confirmation of the email was received by the network server 12. This status could also occur if the job assignment was communicated by a website posting, but the employee has not logged onto the website to view his or her job assignment postings.

acknowledged receipt. For example, this status could occur if the job assignment was communicated by phone and the employee received the phone call but did not commit to accepting the job. This could also be the status if the job assignment was communicated by email, and read-receipt was received by the server 12, but no acknowledgement of acceptance of the assignment was received. This status could also occur if the job assignment was communicated by website posting, and it is known that the employee has logged onto the website to view the job assignment postings, but he or she has not yet accepted the job posting.

confirmed acceptance of the job. For example, this status could occur if the job assignment was communicated by phone and the employee gave verbal confirmation to the human operator or to the IVR system 26 that the he/she accepted the job assignment. This status could also occur if the job assignment was communicated by email, and the employee provided confirmation of acceptance by return email (or by phone call or submission of acceptance over a website). This status could further occur if the job assignment was communicated by website posting, and the employee provided confirmation of acceptance via the web-site (or by phone call or email).

declined the job. For example, this status could occur if the job assignment was communicated by phone and the employee verbally declined the job assignment to the human operator or to the IVR system 26. This status could also occur if the job assignment was communicated by email, and the employee provided a return email declining the job (or if the employee declined by phone call or website submission). This status could further occur if the job assignment was communicated by website posting, and the employee declined the job via the web-site (or by phone call or email).

Regardless of the manner in which the processing entity 36 and the employee communicate with each other (either by telephone, email, website posting or a combination thereof), any information communicated between the employee and the entity 36 is shared. As such, the information within the job assignment database 900 is updated whenever communication regarding a job assignment occurs between the processing entity 36 and the employee. In this manner, the processing entity 36 has an up-to-date record of what information has been exchanged between itself and the employee, and in some cases, how that exchange of information has taken place.

In addition, the information contained within the job assignment database 900 can be used by the processing entity 36 in order to determine how to interact with one or more employees in order to ensure that all jobs that have been assigned are accepted. A job may be accepted by the first employee to whom the job was assigned or by a subsequent employee in the case where the first employee declined the job assignment.

In the case where the processing entity 36 has received confirmation of acceptance of a job assignment from an employee (such as in the case of records $902_1$ and $902_4$ of FIG. 9), then further communication with the employee may not be required. However, in the case where the employee has not yet accepted or declined a job assignment (such as in the case of records $902_2$ and $902_3$ of FIG. 9), further communication between the employee management system 10 and the employee may be required. This further communication may be done in order to remind the employee that acknowledgement of the job assignment is required, or to try to reach the employee via a different communication medium.

The manner in which the processing entity 36 further communicates with an employee when no acknowledgement or acceptance of a job has been received may be done according to logic contained within the program instructions 42 stored in the memory 38 of the network server 12. For example, the logic that is stored in the memory 38 may cause the processing entity 36 to follow the following rules:

1) If no acknowledgement of receipt is received within a certain time period (e.g., number of days) after the date the job was communicated (such as 3 days after the job was communicated, for example), the processing entity 36 should communicate with the employee via a different communication medium. For example, in the case of record $902_3$ on Sep. 4, 2009, the job assignment was communicated to the employee via a web-site posting. Given that no acknowledgement of the job was received, the job assignment was re-communicated to the employee by telephone on Dec. 4, 2009.

2) If no acknowledgement of receipt is received within a certain time period (e.g., number of days) prior to the date the job needs to be performed, the processing entity 36 should withdraw the job assignment from the employee and re-assign the job to another employee. In the case where the job assignment is withdrawn from the employee, the employee is locked out and no longer able to accept the job assignment and a communication is sent to the employee advising the employee that the job assignment has been withdrawn. This communication can be done via phone, email or website posting. The lock out status is reflected by changing a data element in the job assignment database, such that if subsequently the employee tries to accept the job, he/she will not be able to do so. The data element may be a simple flag which changes status if a lock out condition arises. As such if the locked out employee attempts to accept the position the system will reject the acceptance on the basis of the flag status.

3) If acknowledgement of the job has been received, but no acceptance of the job has been received within a certain time period (e.g., number of days) following the acknowledgement of the job (such as 3 days after the acknowledgement of the job was received, for example), the processing entity 36 should send a reminder via the same communication medium. For example, in the case of record $902_2$ on Sep. 4, 2009, the job assignment was communicated to the employee via an email, and acknowledgement of receipt was received on the same day. Given that no acceptance of the job was received, a reminder that acceptance is required was sent to the employee by email on Dec. 4, 2009.

4) If no acceptance of the job is received within a certain time period (e.g., number of days) prior to the date the job needs to be performed, the processing entity 36 should withdraw the job assignment from the employee, lock the employee out as described earlier and re-assign the job to another employee. In the case where the job assignment is withdrawn from the employee, the employee is no longer able to accept the job assignment and a communication is sent to the employee advising the employee that the job assignment has been withdrawn. This communication can be done via phone, email or website posting.

Once the date the job assignment was to be performed has passed, it is possible that the memory 38 is cleared of the records associated with those jobs. For example, on 21 Apr. 9, all of records $902_1$-$902_4$ could be cleared from the assigned job database 900. These records could be cleared simply by erasing them from the memory 38, or alternatively, by transferring records $902_1$-$902_4$ from the memory 38 of the network server 12 to the historical/archive data 316 within the employee profile database 22.

Further examples of the manner in which the processing entity 36 interacts with various employees and managers using the assigned job database 900 will be described in more detail throughout the specification.

Employee Interface with the System

The manner in which the employee management system 10, and specifically the network server 12, interacts with the information contained within the databases 20, 22 and 24 in order to assign jobs to one or more employees has been described above.

Employees are able to interact with the employee management system 10 via the workstations 14, 16 and/or the telephone 18, in order to receive job assignments and access different other features offered by the system 10. For example, employees may be able to interact with the employee management system 10 in order to book jobs, verify job status, book vacations/sick days/training, submit "end of shift" reports and submit claims, among other possibilities. The manner in which employees are able to interact with the system 10 will now be described in more detail below.

In accordance with the present invention, employees are able to interact with the employee management system 10 via an employee management website that can be accessed over the network 11 via the workstations 14, 16. Any suitable web navigation system, such as Microsoft Internet Explorer, Mozilla Firefox and/or Google Chrome could be used in order to access the employee management website.

Figure 10:
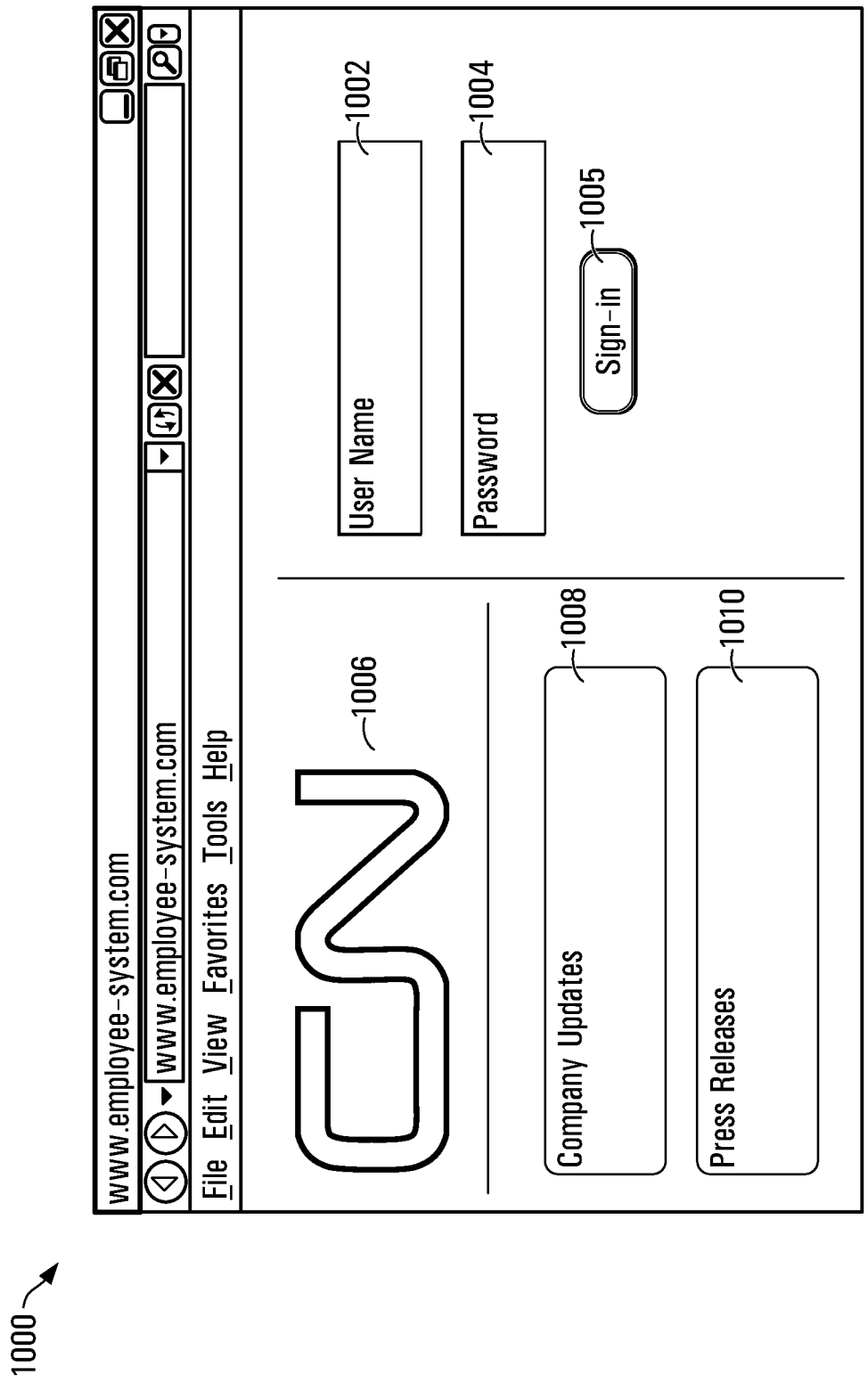
FIG. 10 is a non-limiting example of implementation of an on-screen display of a gateway user interface of the employee resource management system.

Shown in FIG. 10 is a non-limiting example of a portal web-page 1000 that can be accessed by a user (such as an employee) in order to allow the employee to interact with the employee management system 10. The web-page 1000 is a portal page that allows a user to log-on to the portions of the website that enable the employee to obtain information that is not available to the general public and that can be personalized for the specific user.

As shown, the portal web-page 1000 includes a username field 1002 and a password field 1004 for enabling the employee to enter information that will allow him or her to log-on to the secure portions of the website. Once the employee has entered his/her username and password into fields 1002 and 1004, he or she clicks on the "sign in" button 1005 in order to log-on to the website. Based on the information entered by the employee into the username field 1002 and the password field 1004, the processing entity 36 is able to verify the user's permission to access the website, and is able to retrieve information that is associated with that employee's unique user name and password.

In accordance with a non-limiting embodiment, the user's username and password may be stored in one of the records $300_{1-k}$ associated with the user in the employee profile database 22. In this manner, the processing entity 36 cross-references the information entered into the username and password fields 1002 and 1004 with the information stored in the employee profile database 22. This is done in order to (1) verify that the user is a "registered" user (i.e., a current employee); and (2) access other information associated with the employee.

For example, once the processing entity 36 has determined one of the records $300_{1-k}$ in the employee profile database 22 that is associated with the user, the processing entity 36 can then access all the information associated with that employee that is contained in the employee profile database 22.

The portal webpage 1000 can further include any other suitable information and/or content. In the non-limiting example shown, the portal webpage 1000 includes an identification 1006 of the company that is implementing the employee management system 10. The web-page 1000 further includes company updates 1008 and company press releases 1010 that may be of interest to employees. It should be appreciated that any content that may be of interest to users, and that is of a public nature, can be included on this portal webpage 1000 without departing from the spirit of the invention.

Figure 11:
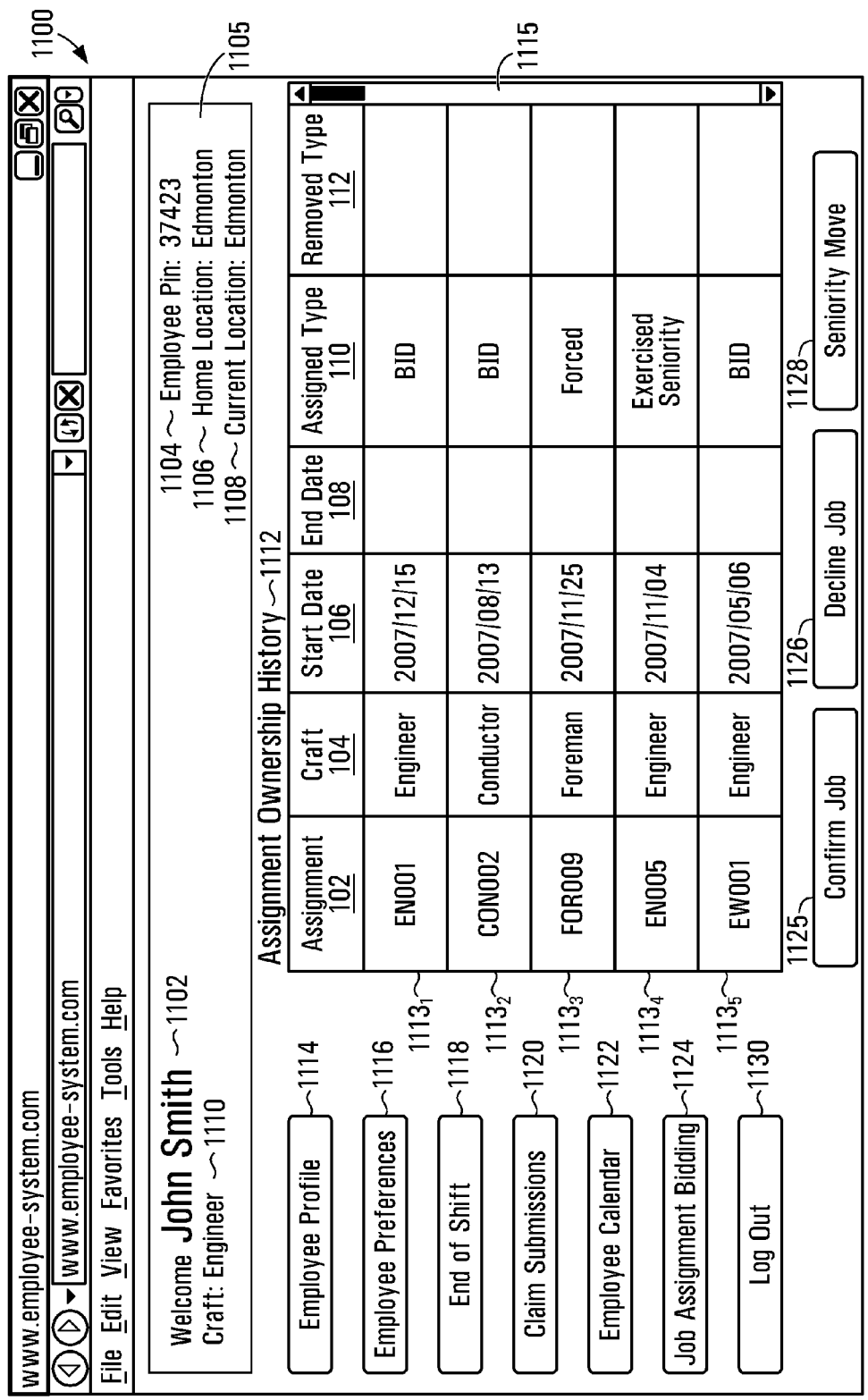
FIG. 11 is a non-limiting example of implementation an on-screen display of a personalized user interface of the employee resource management system.

In accordance with a non-limiting example of implementation, once an employee has logged-on to the employee management website via the portal webpage 1000, he or she is presented with a personalized webpage (or homepage) 1100, such as the one shown in FIG. 11. The personalized webpage 1100 acts as the hub from which an employee can view job assignments and access different services and functionalities offered by the employee management system 10.

In the non-limiting example shown, the personalized homepage 1100 provides a user interface that has header information 1105, that includes an identification 1102 of the employee, an employee's PIN 1104, an employee's home location 1106, an employee's current location 1108 and an employee's primary craft 1110. As will be described in an example below, it is possible for the employee to have more than one craft.

The identification 1102 identifies the employee who logged-on to the website, which in the example of FIG. 11 is an employee named John Smith. It should be appreciated that the identification 1102 can be in the form of a greeting to the employee, such as "Welcome John Smith", or may just include the name, "John Smith". In the example shown, the header information 1105 further provides an indication of an Employee PIN 1104, the employee's home location 1106, the employee's current location 1108 and the employee's primary craft 1110. Any other information associated with the employee can be included within the header information 1105 as well, without departing from the spirit of the invention.

In the non-limiting example shown in FIG. 11, the personalized homepage 1100 includes an assignment ownership history table 1112 for the indicated employee. The assignment ownership history table 1112 includes a plurality of records $1113_{1-k}$ that are each associated to a job assignment that has been assigned to the employee either in the past or in the near future. Associated with the Assignment ownership history table are a confirm job button 1124, a decline job button 1126 and a seniority move button 1128. The assignment ownership history table 1112 will be described in more detail below.

The personalized homepage 1100 further includes an employee profile button 1114, an employee preferences button 1116, an end-of-shift button 1118, a claim submission button 1120, an employee calendar button 1122 and a job assignment bidding button 1124. By clicking these buttons, the employee is able to link to additional pages that will be described in more detail below. Finally, the personalized homepage 1100 includes a "log-out" button 1130 that enables the employee to return to the portal page 1000.

Although not shown in FIG. 11, the personalized homepage 1100 could also include information such as an indication of the last time the employee logged-on, any messages that have been sent to the employee from the employee management system 10 or from the employee's supervisor, as well as an indication of the current date and time.

From a functional perspective, the user interface that is presented to the employee is made up of individual controls allowing the employee to receive information from the network and also communicate information to the network. The controls include information delivery controls that convey information such as text boxes, tables or more generally any field that displays data conveying information to the employee. The information delivery controls receive data from the server 12 or from any other source in the data network, that convey certain information. The control, or more precisely the software that implements the control functionality will process the data and cause it to be displayed on the screen. The controls also may include action controls (sometimes called control components) that require an input from the employee to trigger a certain event. A button is an action control, that when "clicked" triggers a certain function. An action control generates control data that is sent to the server 12 or to any other suitable destination in the network to trigger a certain function. The control data identifies the action sought and carries any additional information that is needed for the server 12 to implement the command. Also, there may be hybrid controls, that include both functionalities such as information display and action. A hyperlink is an example of a hybrid control which displays information to the employee and may be "clicked" to navigate to a different page or produce a certain action. Further, the action or hybrid controls can accept employee input by providing a field in which information can be typed for eventual transmission to the network server 12 or to any other suitable location in the data network.

Assignment Ownership History Table

As indicated above, the assignment ownership history table 1112 displays a plurality of records $1113_{1-k}$ to the employee that are each indicative of a job that has been assigned to him or her. The records $1113_{1-k}$ may be indicative of past jobs that the employee was assigned, and that have already been completed. One or more of the records $1113_{1-k}$ may be indicative of current job assignments being worked by the employee and some of the records $1113_{1-k}$ may also be indicative of future jobs that have been assigned to the employee, which the employee has yet to perform. In general, the job assignment records will be displayed in a list format and will be displayed chronologically, so that the most recent job assignments will be towards the top of the list. In this manner, an employee is able to quickly see any new jobs that have been assigned to himself or herself.

The assignment ownership history table 1112 includes a scroll bar 1115 on one side, such that the employee can scroll through the records $1113_{1-k}$ so as to be able to view more records than can be shown by default in the on-screen space allocated to the assignment ownership history table 1112.

In the non-limiting embodiment shown, each of the job assignment records $1113_{1-k}$ is displayed as a respective row of the table 1112. The table further comprises a plurality of columns that are each associated with a respective data field, such as assignment code 102 for identifying the job assignment, craft type 104, start date 106, end date 108, assigned type 110 and removed type 112. Included within each of the data field columns are data elements associated with that data field for each record. It should be appreciated that other data fields, such as turn, type, guarantee and incumbency block could also be included within this table. The types of data fields that are displayed for each of the records $1113_{1-k}$ can be pre-selected by the employer, or alternatively, it is possible that the employee can configure the assignment ownership history table 1112 to include the data fields that are of the most interest to him or her.

Although certain data fields are shown in FIG. 11, it should be understood that more or less different data fields could be displayed in association with each job assignment record $1113_{1-k}$. In addition, the title of each data field may be a control component that is operable by a user of the GUI in order to cause the records $1113_{1-k}$ to be re-ordered in accordance with the data elements contained in the data field column selected by the user.

The graphical user interface further comprises a control component such as a clickable or otherwise activatable screen portion, icon or graphical button, that can be activated in order to cause the graphical user interface to display additional data fields and/or data elements regarding a selected job assignment. Alternatively, the control component may be a hyperlink, such as a portion of text that is hyperlinked to another page of the graphical user interface.

In the case where a user would like more information about a job assignment record, such as job assignment record $1113_1$, the user would use a user operable input, such as a mouse curser or touch sensitive screen, in order to operate a control component that would cause the graphical user interface to display additional information about that job assignment record. For the sake of example, the control component could be the record itself, such that if a user double clicks (or otherwise provides some sort of user input) over a given record, the record will act as the control component to cause the graphical user interface to display additional information. Alternatively, a control component in the form of a graphical button that indicates "details" may be positioned next to each record, such that if a user clicks, touches or otherwise provides some sort of user input over the "details" button, this control component will cause the graphical user interface to display additional information about the selected record. In yet a further alternative, the text within each record may act as a hyperlink that causes the graphical user interface to display additional information when clicked.

For example, although only six different data elements associated to the data fields are displayed in association with each record in the assignment ownership history table 1112 shown in FIG. 11, by activating a control component of the graphical user interface, the user could cause an expanded record entry to be displayed that includes additional information, data fields and data elements associated with the selected job assignment record $1113_1$. For example, the expanded record entry may include additional data fields, such as those described above. The expanded record may also include additional information in the form of links to information such as job submission forms associated with the particular job assignment, as will be described in more detail below.

In the case of the assignment ownership history table 1112 shown in FIG. 11, the assignment code 102 is an alphanumeric code that uniquely identifies the job assignment that has been assigned to the employee. In addition to the assignment code 102, it is also possible that the assignment ownership history table 1112 includes (or provides a link to) a description of the job assignment that is associated with this code. This allows the employee to get a better idea of the job that has been assigned to him or her.

The craft type data element 104 indicates the type of skill required for the job that has been assigned to the employee. Although in the example of FIG. 11, John Smith's primary craft is indicated as being an Engineer (the item 1110 in the header information 1105), it may be possible that John Smith is able to perform other job functions. For example, John Smith may also be able to act as a Conductor for certain routes, and as a rail yard foreman in various situations. Given that John Smith is able to perform job assignments that fit multiple different crafts, the crafts type data element 104 indicates which craft or skill John Smith will likely use for any given assignment.

The start date 106 and end date 108 data elements define the time period of the job assignment. It is possible that a job assignment will be for only a few hours (such as an 8 hour shift, for example), or the job assignment may span a much longer period of time, such as a few days, a few weeks, or a few months. For example, in the case of a professional engineer position (e.g., a civil engineer overseeing replacement of a railway bridge), this position may span a few months until the assigned project has come to an end (i.e., when the railway bridge is replaced).

The assigned type data element 110 is indicative of the manner the job was assigned to the employee. For example, the employee may have put in a "bid" on a given job. If the employee is then assigned a job that he/she has bid on, the assigned type will be indicated as "bid". In other circumstances, a manager or supervisor may assign a job to an employee that the employee did not bid on, and that the employee was not necessarily aware of. In the case where a third party assigns a job to an employee without the employee's input, the assigned type 110 may be indicated as "forced".

In certain circumstances, an employee may be able to exercise his/her seniority in order to be assigned a job that he or she wants. For example, in certain circumstances, the employee may be able to view jobs that have been assigned to other, less senior employees. If a less senior employee has been assigned a job that the more senior employee wants to do, the more senior employee may be able to exercise his/her seniority in order to be able to take that job away from the less senior employee. In such a case, the assigned type will be indicated as "exercised seniority". Obviously, there are other ways for the employee to exercise seniority in order to get a more desirable job assignment that will not be described in more detail herein.

The removed type data element 112 provides an indication of how a job assignment was removed. In other words, it provides an administrative record of how the employee got forced off the job, such as being bumped by an employee with higher seniority.

In accordance with a non-limiting embodiment, it is possible that the new job assignments are highlighted or made visually distinctive in some manner, such as by having a bolder type-face, or by shading the new record $1113_{1-k}$, among other possibilities. In this manner, when an employee logs on to the website and accesses the personalized homepage 1100, he or she is able to instantly determine whether there are any new job assignments.

For the sake of example, assume that record $1113_1$ is a new job assignment posting for John Smith. Upon viewing this new job assignment, the employee has a number of options. Firstly, the employee can ignore the new job assignment for the time being and consider his/her options. In this case, the employee can leave the personalized homepage 1100 and then return to the personalized homepage 1100 when he/she has decided what to do with the job assignment.

In the case where the employee John Smith wants to accept the job assignment, he can highlight the job assignment record $1113_1$ within the assignment ownership history table 1112 and then click on an acceptance control component, which in the embodiment shown in FIG. 11 is the confirm job button 1124. This will send an indication to the employee management system 10 that the job has been confirmed by the employee. In such a case, the processing entity 36 may update the Job Assignment Database 900 to indicate that the user has accepted the job assignment.

Although not shown in FIG. 11, it is also possible for an indication to be provided within the assignment ownership history table 1112 that a job has been accepted by the employee. This indication can be in the form of a text data element, an icon, or color coding, among other possibilities.

It should be appreciated that the employee can chose to accept the job assignment posting in ways other than the confirm job button 1124, such as by phone or email, as described above.

Alternatively, in the case where the employee John Smith wants to decline the job assignment, he can highlight the job assignment record 1113₁ within the assignment ownership history table 1112 and then click the decline job button 1126. This will send an indication to the employee management system 10 that the job has been declined. As such, the processing entity 36 will update the Job Assignment database 900 to indicate that the user has rejected or declined the job assignment.

In addition, and although not shown in FIG. 11, it is possible for an indication to be provided within the assignment ownership history table 1112 that a job has been declined by the employee. This indication can be in the form of a text data element, an icon, or some sort of color coding, among other possibilities. Alternatively, once a job has been declined, its record may be removed altogether from the assignment ownership history table 1112.

In the case where the employee does not want to accept a job assignment posting, and wants to have the option to accept another job that has been assigned to a less senior employee instead, the employee may click on the seniority move button 1128. This will allow the employee to view other jobs that have been assigned to less senior employees, such that the employee can then pick and chose the job that he/she wants.

As such, the assignment ownership history table 1112 allows the employee to interact with the employee management system 10 in order to receive job assignments, and in order to accept, decline or chose another job assignment.

Employee Profile Interface

When an employee clicks on the employee profile button 1114, the employee is sent to an Employee Profile page 1200 as shown in FIG. 12. The Employee Profile page 1200 includes all the same header information as was found in the header information 1105 on the personalized webpage 1100 (namely the employee's name 1102, the employee's pin 1104, home location 1106, current location 1108 and craft 1110). Such header information will be included on most webpages that are accessed by the user, such that there is a continuous indication of the employee to which the information being displayed is associated. This header information will not be described over again with respect to each webpage.

In the non-limiting example of implementation shown, the Employee Profile webpage 1200 is operative for displaying the employee's contact information and for providing access more specific profile information associated with the employee. In general, the employee's contact information includes the employee's home address 1202, the employee's phone numbers 1204 and the employee's email addresses 1206. Although the employee's home address 1202, phone numbers 1204 and email addresses 1206 are displayed in table format, it should be appreciated that other manners of displaying this information, such as in simple paragraph form, are also included within the spirit of the invention.

The employee's home address 1202 includes an indication of the street name and number 1208, city 1210, province/state 1212, country 1214 and postal code/zip code 1216 of the address. The employee's phone numbers 1204 include a plurality of records 1204₁₋ₖ, with each record being associated with a phone number for reaching the employee. Each record 1204₁₋ₖ includes a phone number data element 1218, a contact data element 1220 indicative of the person associated with the number, a phone type data element 1222 indicative of whether the communication device is a POTS phone, cell phone or smart phone and a home/away/both data element 1224 indicative of whether the phone number is suitable for reaching the employee when he or she is at home, away or both. In the example shown, included in the list of phone numbers 1204 is the employee's home phone (record 1204₁), the employee's cell phone (record 1204₂) and the employee's daughter's home phone (record 1204₃).

The employee's email addresses 1206 include two email addresses; namely the employee's work email 1226 and the employee's personal email 1228. Obviously, any number of email addresses could be included without departing from the spirit of the invention.

Also included within the Employee Profile page 1200 is an update button 1230 and an add information button 1232. The update button 1230 allows the user to update information contained within the employee's home address 1202, phone numbers 1204 and email addresses 1206, and the add information button 1232 allows the user to add information (such as a second address, additional phone numbers or additional email addresses) to the Employee Profile page 1200.

In general, when the employee accesses the Employee Profile webpage 1200, the information regarding his or her home address 1202, phone numbers 1204 and email addresses 1206 is in a non-modifiable format. However, when the employee clicks the update button 1230, the information regarding his or her home address 1202, phone numbers 1204 and email addresses 1206 is put into a format that can be modified. For example, the information such as the employee's street number and street name, city, province, country and postal code, as well as the phone numbers and email addresses, may appear in editable text boxes, such that the user can use a cursor (or other pointing device) to select and edit the information in these text boxes. This allows the employee to update and modify his/her profile information.

When the employee clicks on the add information button 1232, the Employee Profile webpage 1200 provides the user with the ability to add to one (or to all) of the home addresses 1202, the phone numbers 1204 and the email addresses 1206. For example, when the user clicks the add information button 1232, a blank address table may appear so that the user can add a second address to the profile information. Likewise, blank phone number records in the records 1204₁₋ₖ and blank spaces for email addresses may appear.

Alternatively, upon clicking the add information button 1232, three additional buttons (not shown) may appear next to each of the home address 1202, the phone numbers 1204 and the email addresses 1206 sections. The three additional buttons could include an "add home address" button, an "add phone number" button and an "add email address" button. By clicking on the desired one of these buttons, a corresponding blank space would appear such that an employee can enter the desired new address, new phone number or new email address. It should be appreciated that in an alternative embodiment, instead of having the single add information button 1232, the employee profile homepage 1200 may include a separate add information button for each of the home address 1202, the phone numbers 1204 and the email addresses 1206 sections.

When the employee accesses the Employee Profile webpage 1200, the information regarding the home address 1202, phone numbers 1204 and email addresses 1206 is populated from information retrieved from the employee profile database 22 described earlier. As such, when the employee updates or modifies his/her contact information on the employee profile webpage 1200, this information is sent to the employee profile database 22 such that the information contained within the employee profile database 22 is updated and saved.

As described above, in addition to providing contact information for the employee, the Employee Profile webpage 1200 is further operative for providing access to more specific profile information associated with the employee. In order to the provide this access, the Employee Profile webpage 1200 includes an emergency contact information button 1240, a contact preferences button 1242, a qualifications and restrictions button 1244 and a seniority button 1246.

Figure 12D:
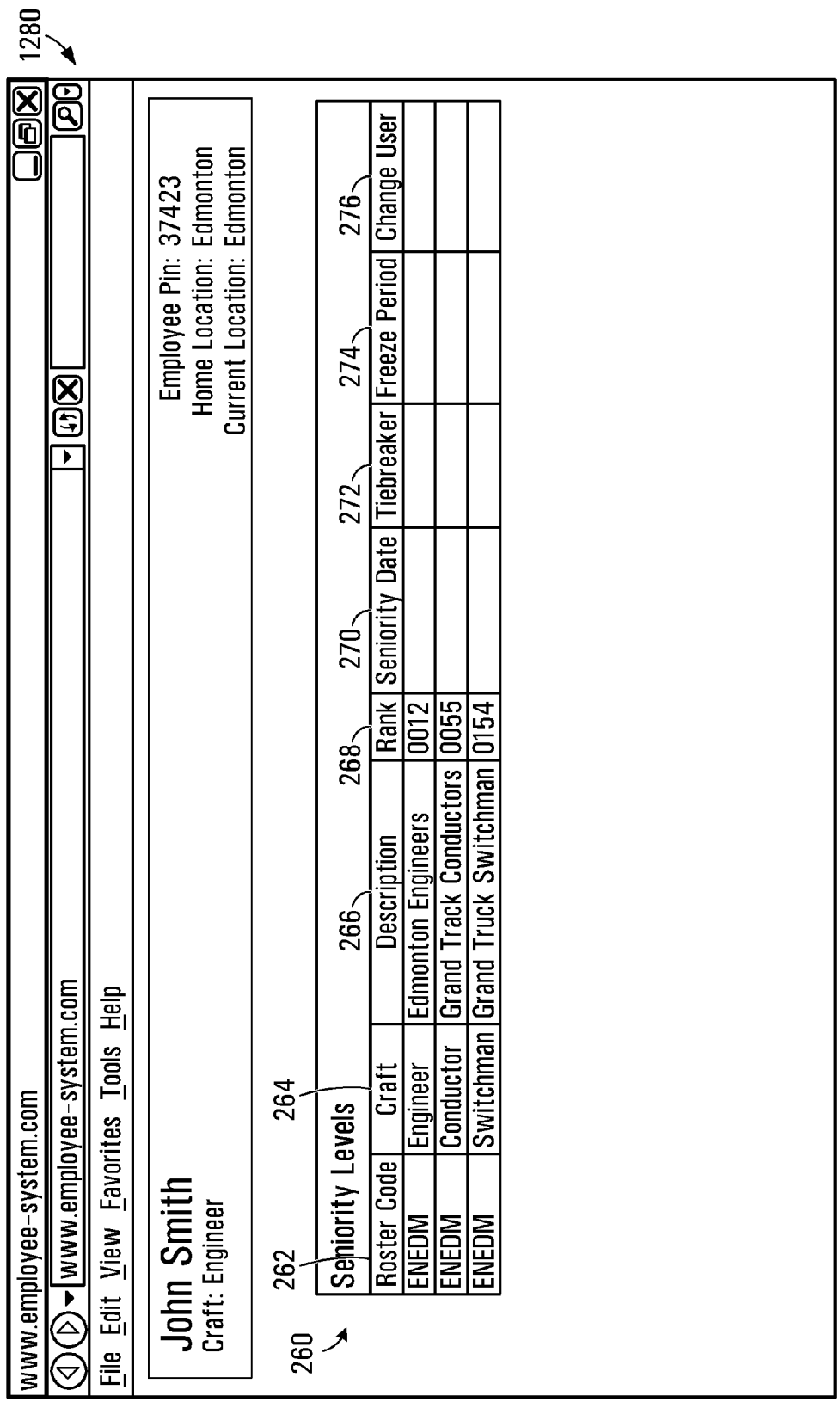
FIGS. 12 to 12E are non-limiting examples implementation of on-screen displays illustrating user employee profile user interfaces of the employee resource management system.

When a user clicks the emergency contact information button 1240, an emergency contact information webpage 1250, as shown in FIG. 12A, is presented to the employee. When the user clicks on the contact preferences button 1242, a contact preference webpage 1260, as shown in FIG. 12B, is presented to the employee. When the user clicks on the qualifications and restrictions button 1244, a qualifications and restrictions webpage 1270, as shown in FIG. 12C, is presented to the employee and when the user clicks on the seniority button 1246, a seniority webpage 1280, as shown in FIG. 12D, is presented to the employee. Each of these webpages will now be described in more detail below.

Shown in FIG. 12A is the emergency contact information webpage 1250 associated with the employee (who is identified by the header information provided at the top of the webpage). The webpage 1250 includes an emergency contact information table 1252 that in the embodiment shown, includes two records 1252$_1$ and 1252$_2$, which are each associated with a respective emergency contact. Each of the emergency contact records includes data elements indicative of the emergency contact's family name 1254, first name 1256, relationship to the contact 1258 and phone number 1259.

The emergency contact information webpage 1250 further includes an update button 1253 and an add information button 1257. The update button 1253 allows the information contained within the emergency contact information table 1252 to be put into a format that can be modified by the user. For example, the information may appear in editable text boxes, such that the user can use a cursor (or other pointing device) to select and edit the information in these text boxes and update and modify the emergency contact information.

When the user clicks on the add information button 1257, the emergency contact information webpage 1250 provides the user with the ability to add an additional emergency contact. For example, when the user clicks on the add information button 1257, a blank record will appear in the table 1252 (e.g., record 1252$_3$) that the user can complete in order to add a third emergency contact. Once the user has entered the information, he or she may click the add information button 1257 again in order to cause the entered information to be stored. Alternatively, a "confirm" button (not shown) may appear when the user clicks the add information button 1257, such that the employee can click the confirm button once the new contact information has been added for causing the entered information to be stored.

Shown in FIG. 12B is the contact preference webpage 1260 that is accessed when a user clicks on the contact preferences button 1242 on the employee profile page 1200. The contact preferences webpage 1260 provides an indication as to how the employee prefers to be contacted. There are many reasons why the employee's employer may want to contact the employee, such as for job assignment notification purposes. For example, when an employee has been assigned a job by the system 10, the employee needs to be contacted in order to be advised that a job has been assigned to him/her. This may be done by posting the job assignment to a website (such as to the assignment ownership history table 1112, as described above), by sending the employee an email, or by telephoning the employee.

In the case where a phone call needs to be made to contact the employee, the information in the contact preference webpage 1260 can be used in order to determine the manner in which the employee should be contacted. As shown, the contact preference webpage 1260 includes a default phone sequence list 1262 that includes a plurality of records 1262$_{1-3}$ that are each associated with one of the employee's contact phone numbers. Although only three records 1262$_{1-3}$ are shown, it should be appreciated that more or fewer records could be included. Each of the records 1262$_{1-3}$ includes the following elements:

- a phone number 1272 at which the employee can potentially be reached;
- a data element indicative of a sequence number 1270 that identifies the sequence in which that phone number should be used to contact the employee;
- a data element indicative of the type of communication device associated with the phone number 1274;
- an IVR test element 1276;
- an access pin number element 1278;
- a comments field 1280 (which could be used to indicate the owner of the communication device); and
- a home/away/both data element 1282 that indicates whether the employee can be reached by the phone number in element 1272 is at home, away or both.

Although most of these elements are self-explanatory, the IVR test element 1276 allows an employee to request that a test of his or her phone configuration be performed. In the case where this button is pressed, the IVR system 26 will call the phone numbers specified by the employee in the list 1262, such that the employee knows that he or she has configured his/her phone preferences correctly.

In the example shown in FIG. 12B, John Smith has configured his default phone sequence list such that a first attempt to reach him is done via his home phone, a second attempt is done via his cell phone and a third attempt is done via his daughter's home phone.

Although only the default phone sequence is shown in FIG. 12B, it should be appreciated that a listing identifying the email address sequence could also be displayed on the contact preference webpage 1260.

Included within the default phone sequence table 1262 is a call configuration button 1261. By clicking on the button 1261, the employee is provided with a call configuration table 280 that is shown in FIG. 12E. The call configuration table 280 may appear as a separate webpage, or may appear as a pop-up box that overlays the contact preference webpage 1260. The call configuration table 280 allows the employee to further specify certain preferences for how he/she interacts by phone with the employee management system 10.

More specifically, the call configuration table 280 provides preference queries 282, 284, 286, 288 and 290 that enable the employee to further specify and/or set up features of the system 10 that can be useful to the employee. For example, preference query 282 enables the employee to specify the amount of lead time before the start of a job that the employee would like to be contacted. The employee specifies this lead time by entering the amount of time within the data entry box in column 291 that is associated with preference query 282. In the example shown, the user has specified a lead time of two (2) days, such that the employee is contacted by the employee management system 10 two (2) days before the beginning of a job.

The preference query 284 allows the employee to specify the time of day that the employee would like to be contacted for the next call. The employee specifies this time of day by entering the time within the data entry field in column 291 that is associated with the preference query 284. In the example shown, the user has specified that he/she would prefer to be contacted at 4:30 pm (16:30 universal time) the next time the employee management system 10 needs to contact the employee.

The preference query 286 allows the employee to specify a time period during which the employee does not want to be contacted by the IVR system 26. The employee specifies this time period by entering a range within the data entry field in column 291 that is associated with the preference query 286. In the example shown, the user has specified that he/she would not like to be called by an IVR call between midnight and 6:00 am (00:01 and 06:00 universal time).

The preference query 288 allows the employee to specify a requested time for a wake-up call. This may be useful when the employee is away from home on a special job and needs to be up at a certain time. The employee specifies the time for the wake-up call by entering the time within the data entry field in column 291 that is associated with the preference query 288. In the example shown, the user has specified that he/she would like to receive a wake-up call at 5:00 am (05:00 universal time).

The preference query 290 allows the employee to enter an authorized proxy IVR access code, which allows the employee to validate him/herself with an appropriate identifier.

The call configuration table 280 further includes a column 292 for allowing a user to enter a start date next to each of the preference queries 282, 284, 286, 288 and 290, as well as a column 294 for allowing a user to enter an end date 294 for these same queries. By entering a start and end date next to each of the queries 282, 284, 286, 288 and 290, the employee is able to identify a time period during which the information entered in column 291 is applicable. For example, in the case of the wake-up call request 288, assuming that the employee would only like the 5:00 am wake up call on a particular day, the employee would enter the start date and end date associated with that query 288 to specify that day.

The call configuration table 280 further includes an employee update column 296 that indicates a date when the employee last updated each of the preference queries 282, 284, 286, 288 and 290. This information may be entered by the employee when the employee updates the information regarding a given query, or this could be updated automatically each time the employee changes any information within one of the queries.

In the embodiment shown in FIG. 12B, the contact preference webpage 1260 further includes an indication of an alternative phone sequence 1264. The purpose of the alternative phone sequence 1264 is to allow an employee to modify the default phone sequence 1262 for a period of time. For example, in the case where an employee is away from home, he or she may want to modify the default phone sequence 1262 in order that a different sequence of telephone numbers is used when attempting to reach him/her.

The alternative phone sequence 1264 includes records 1264$_{1\text{-}2}$ that are each associated with an alternative phone sequence. Although only two records 1264$_{1\text{-}2}$ are shown in FIG. 12B, it should be appreciated that more or fewer records could also be included in the sequence 1264 without departing from the spirit of the invention. Each record 1264$_{1,2}$ includes a home/away/both data element 1282 indicative of whether the employee is at home or away, a time element 1284, a start date/time data element 1286 and an end date/time data element 1288 during which the alternative phone sequence should be implemented. Finally, each record 1264$_{1,2}$ includes an indication of the alternative phone sequence 1289 to be used during the specified time period.

Keeping with the example described above, assume that John Smith is going to be away for a weekend visiting his daughter. In this case, he may set up the alternative phone sequence by entering the time period he will be away, which will indicate the time period (or weekend) that the alternative phone sequence should be effective, as well as the alternative phone sequence itself. This is illustrated in record 1264$_1$. Assuming that John is visiting his daughter between Feb. 1, 2010 and Feb. 3, 2010, the alternative phone sequence may specify that his cell phone should be used for the first attempt to reach him (rather than his home phone, as indicated in the record 1262$_1$) and that his daughter's home phone should be used for the second attempt to reach him (rather than his cell phone, as indicated in the record 1262$_2$).

The contact preference webpage 1260 may further include an away from home record 1266. The record 1266 may be suitable for indicating a phone number at which the employee can be reached while the employee is stationed away on a job. For example, assuming that the employee is being put up at a certain hotel venue while he/she is on a job assignment, the contact preference webpage 1260 may include a record 1266$_1$ that indicates a telephone number 1292 and a location 1294 (e.g., the particular hotel venue) where the employee can be reached while away. In the case where the employee management system 10 was responsible for assigning the job and organizing the accommodations while the employee is away, the system 10 may automatically populate the information in the away from home record 1266.

Also included on the contact preference webpage 1260 is an "Update" button 1268. This button allows the employee to modify the information contained within the default phone sequence records 1262$_{1\text{-}3}$ and the alternative phone sequence records 1264$_{1,2}$. More specifically, when the employee clicks on the update button 1268, the information in the records 1262$_{1\text{-}3}$ and 1264$_{1,2}$ is put into a format that can be modified. For example, the information may appear in editable text boxes, such that the user can use a cursor (or other pointing device) to select and edit the information in these text boxes. In this manner, the employee can update and modify the information in the contact preference webpage 1260.

Shown in FIG. 12C is a qualifications and restrictions page 1270 that can be accessed when an employee clicks on the qualifications and restrictions button 1244 on the Employee Profile homepage 1200 shown in FIG. 12. The webpage 1270 is used to display to the employee an identification of the employee's qualifications and restrictions at any given period in time.

In the non-limiting example shown, the qualifications and restrictions webpage 1270 includes a table of qualifications 220 that includes a list of records 220$_{1\text{-}2}$, wherein each record identifies a qualification associated with the employee. Each of the records 220$_{1\text{-}2}$ includes data elements indicative of the qualification code 200, a description 202 of the qualification, an expiry date 204 associated with the qualification, as well as a number of trips required to qualify 206 for the qualification element, a number of trips taken element 208, a type of qualification element 210 and a remarks field 212.

The qualification code 200 may be an alpha-numeric code that is used to uniquely identify a given type of qualification. The description 202 may provide a more readable explanation of the nature of the qualification, or it may not. For example, the description 202 in record $220_1$ indicates that the qualification has to do with being a conductor, whereas the description 202 in record $220_2$ does not really provide an intuitive explanation as to the nature of the qualification.

The expiration date element 204 provides an indication of the date on which the qualification (identified by the qualification code 200) is set to expire. It may be recalled that in certain circumstances, for an employee to maintain his/her territorial qualification, he or she may need to make a certain number of trips within that territorial region within a given period of time. As a result, the qualifications table 220 includes the data element 206 indicative of the number of trips needed to maintain the qualification and the data element 208 that indicative of the number of trips that have actually been taken. In most cases, the number of trips taken element 208 will need to match or exceed the number of trips to qualify element 206 prior to the expiration date 204 in order for the employee to maintain the qualification.

Included within the record $220_1$ is a "details" button 209, which is located under the trips taken data element 208. The button 209 can be selected by the employee (such as by clicking on the button) in order to display or review the details of the trips that have been taken. For example, the details may include an identification of the route of the trip, and the dates the trip was taken, among other possibilities.

Each of the records $220_{1,2}$ further includes an element indicative of the qualification type 210. Both of records $220_{1,2}$ that are illustrated in FIG. 12C are territorial qualifications, but it should be appreciated that they could be any type of qualification, such as an educational qualification, a health and safety qualification, or a seniority qualification, among other possibilities. Finally, each of the records $220_{1,2}$ includes a remarks 212 field that can be used by either the employee or his/her manager to make any comments or notes about the nature of the qualification, the expiry of the qualification or the employee's performance of the qualification.

Although not shown in FIG. 12C, each of the records $220_{1,2}$ in the qualifications table 220 could also include data elements that flag the record when expiration of the qualification is approaching. This indication may be done using an icon and/or by changing the color or shading of the record, among other possibilities. Data elements indicative of a reset trip and a grandfather characteristic (not shown) may be further included in the records $220_{1,2}$. The reset trip indicates the date, or trip, at which the time will be reset for achieving the requirements necessary to maintain the qualification. The grandfather characteristic may be indicative of whether the qualification was historically attributed to the employee.

Also included on the qualifications and restrictions webpage 1270 is an Update button 214 and an Add button 216. The update button 214 allows the user to modify the information contained within the qualifications table 220. More specifically, when the employee clicks on the update button 214, the information within the records $220_{1,2}$ is put into a format that can be modified by the user. For example, the information may appear in editable text boxes, such that the user can use a cursor (or other pointing device) to select and edit the information in these text boxes.

When the user clicks on the add button 216, the qualifications webpage 1270 provides the user with the ability to add an additional qualification to the qualifications table 220. For example, a blank record $220_3$ may appear so that the user can complete in order to add a third qualification. Once the employee has entered the information for the new qualification, he/she may click the add button 216 again to store the entered information. Alternatively, a "confirm" button (not shown) may appear when the user clicks the add button 216, such that the user can click the confirm button once the new qualification has been added for causing the entered information to be saved.

While qualifications may be added by the employee, it is also possible that the employee's manager, or a member of the HR department, may also be able to add a qualification to the employee's profile. In such a case, a special interface for allowing a manager or HR person to add a qualification to an employee's profile may be provided, as will be described in more detail below.

As mentioned above, the qualifications and restrictions page 1270 further includes a table of restrictions 240 that includes a list of records $240_{1-2}$, wherein each record identifies a restriction associated with the employee.

There are many reasons why an employee may be subject to restrictions. For example, restrictions may be due to medical reasons, poor performance and/or for security reasons. In the case of medical reasons, an employee may be restricted from coming to work for a period of time, or the employee may simply be restricted to the types of jobs he/she can perform. For example, if an employee has broken his or her leg, the employee may be restricted to doing work that doesn't involve any physical demands, such as heavy lifting or standing for extended periods of time. In the case of poor performance, the employee may be restricted to doing work classified as being below his/her qualification grade or level, until performance improves. In the case of restrictions due to security concerns, it is possible that only certain employees that have been granted certain security clearance are able to work within certain areas or perform certain jobs. All other employees would be restricted from doing those jobs.

In the non-limiting example shown, each of the records $240_{1-2}$ in the table of restrictions 240 includes a data element indicative of the type of restriction 230a start date for the restriction 232 and an end date for the restriction 234, as well as data elements indicative of lost work 236, restricted bidding 238 and restricted owning 242.

The type of restriction 230 could be medical, performance-related, or security-related, among other possibilities. Each of the records $240_{1-2}$ further includes the start date of the restriction 232 and the end date of the restriction 234. In many cases, the restriction will have a finite time period, such that both the start date and the end date are known when the restriction is added to the restriction table 240. For example, in the case of a medical restriction because the employee broke his or her leg, it is possible that the medical restriction will be for a three (3) month time period, after which the employee can resume his or her normal job functions.

The lost work element 236 may provide an indication of how much work was lost due to restriction(s) being placed on the employee. The restricted bidding 238 and restricted owning 242 data elements may be indicative of how the employee is restricted. For example, the employee may be restricted from bidding on any new jobs, which will be reflected in the restricted bidding 238 element, or the employee may be restricted from owning any new jobs, which will be reflected in the restricted owning element 242. These elements may further provide an indication of the type of jobs that the employee is restricted from bidding on and owning, as will be described in more detail further on in the description.

In the embodiment shown, each of the records $240_{1-2}$ further includes a data element 244 that indicates the person who last changed the record. In general, it is likely to be an employee's manager, or a member of the company's human resources department, that will add and manage the restrictions in the restriction table 240. As such, the data element 244 will allow the employee to view who last changed a given restriction. In this manner, if the employee has an issue with any of the information included within the restrictions table 240, the employee will know who to contact.

In the case of the restrictions table 240, typically, an employee will have the ability to add or modify the information contained therein. As will be described in more detail below, the restrictions that populate the restrictions table 240 may be retrieved from the employee profile database 22 or from the constraints database 24. When a manager, or member of HR, adds a restriction to the employee's restriction table 240, this restriction is also updated in the appropriate database.

Shown in FIG. 12D is a seniority information webpage 1280 that can be accessed when an employee clicks on the seniority button 1246 on the Employee Profile page 1200 shown in FIG. 12. The seniority information webpage 1280 is used for displaying to the employee an identification of the his or her seniority ranking at any given period in time.

In the non-limiting example shown, the seniority information page 1280 includes a seniority level table 260 that includes a list of records $260_{1-3}$, wherein each record identifies the employee's seniority level within a respective group associated with the employee. As shown, each of the records $260_{1-3}$ includes a data element indicative of a roster code 262, the employee's craft 264 within that group, a description 266 of the group, the employee's seniority rank 268, a seniority date 270, an indication of whether there is a tiebreaker 272, a freeze period 274 and an indication of the user who last changed the record 276.

The roster code 262 may be a numeric or alpha-numeric code that is used to uniquely identify a group of workers. The description 266 may provide a more readable indication of the identity of a group of workers. For example, for record $260_1$, the description 266 indicates that the group of workers is the "Edmonton Engineers", whereas for record $260_2$, the description 266 indicates that the group of workers is the "Grand Trunk Conductors".

The data element indicative of the craft 264 identifies the type of work the employee performs within the group of workers identified by the roster code 262. For example, in record $260_1$, that relates to the group "Edmonton Engineers", the employee is an Engineer, whereas in record $260_2$ that relates to the group "Grand Trunk Conductors", the employee is a conductor.

Within each of these groups of workers, the employee can have a different seniority level. The seniority rank 268 data element indicates the employee's rank within each respective group of workers. The seniority rank element 268 could be indicative of the number of employees who have seniority over the employee, or it could be an indication of the seniority level of the employee. In the case of record $260_1$, the employee has a rank of 0012, which could mean that there are 12 employees ahead of John Smith. Alternatively, and although not shown in the Figures, the seniority rank element 268 could be indicative of a seniority level for the employee, such as seniority level 3.

The seniority level table 260 further includes an indication of the seniority date 270. The seniority date 270 could be indicative of the date the employee was hired by the company. In this case, the seniority date 270 can be used by the system in order to establish the rank 268 of the employee in comparison to all the other employees that work for the company and/or the particular group.

Alternatively, the seniority date 270 could be indicative of the date that the employee achieved or was awarded the seniority level indicated in the seniority rank data element 268. For example, the seniority date 270 may be indicative of the date that the employee moved from level 3 seniority to level 2 seniority. This may be useful in the case where an employee automatically moves from one seniority level to another seniority level after a given period of time, such as every two (2) years of employment, for example. In this manner, an employee would know when he or she is up for a seniority promotion.

The tiebreaker data element 272 indicates criteria that may cause an employee to rank higher in seniority, when the usual criteria for determining seniority indicate that a tie-breaker is needed to resolve a situation where two (2) employees have the same seniority rank 268. For example, the tiebreaker data element 272 may provide an exact hour that the employee was hired, such that depending on the hour of the day when two (2) employees were hired, one would have seniority over another.

The freeze period data element 274 indicates a period of time that the employee is ineligible to increase his/her seniority status. For example, during certain periods of time, such as during a leave of absence, unpaid vacation, or perhaps during maternity/paternity leave, an employee may be temporarily prohibited from increasing his/her seniority. In other words, while an employee is on a "freeze period", other employees are able to pass the employee in the seniority ranking. The freeze period data element 274 may provide a start date for the freeze period, such that the freeze period is open-ended, or the element 274 may indicate a time range (i.e., both a start date and an end date) during which the freeze period is in effect.

In accordance with a non-limiting example, the information in the seniority level table 260 is not modifiable by an employee, meaning that the employee cannot add, delete or change information within the seniority level table 260. As such, the information that is displayed in the seniority level table 260 is simply provided in order to provide the employee with information. In general, the information that populates the seniority level table 260 is likely retrieved from information that is entered by a manager, or a member of the HR department, into a database such as the employee profile database 22 described above. The manner in which a manager (or employee of the HR department) would enter this information will be described in more detail below.

In light of the fact that it is not the employee who updates/changes the information within the seniority level table 260, the data element 276 indicates the last person to change a given one of the records $260_{1-3}$. Therefore, should an employee would like to discuss a change to the seniority level table 260, the employee knows who he or she should contact.

Although not shown in FIG. 12D, each of the records $260_{1-3}$ contained in the seniority level table 260 could include other data elements without departing from the spirit of the invention. For example, the seniority level table 260 could include data elements indicative of a change date, which would be the date a record was last updated or added. The seniority level table 260 could also include a remarks data element indicative of any relevant remarks, such as why a freeze period is applicable or why a tiebreaker has been indicated.

Employee Preferences (Buckets and Buddies)

Figure 13:
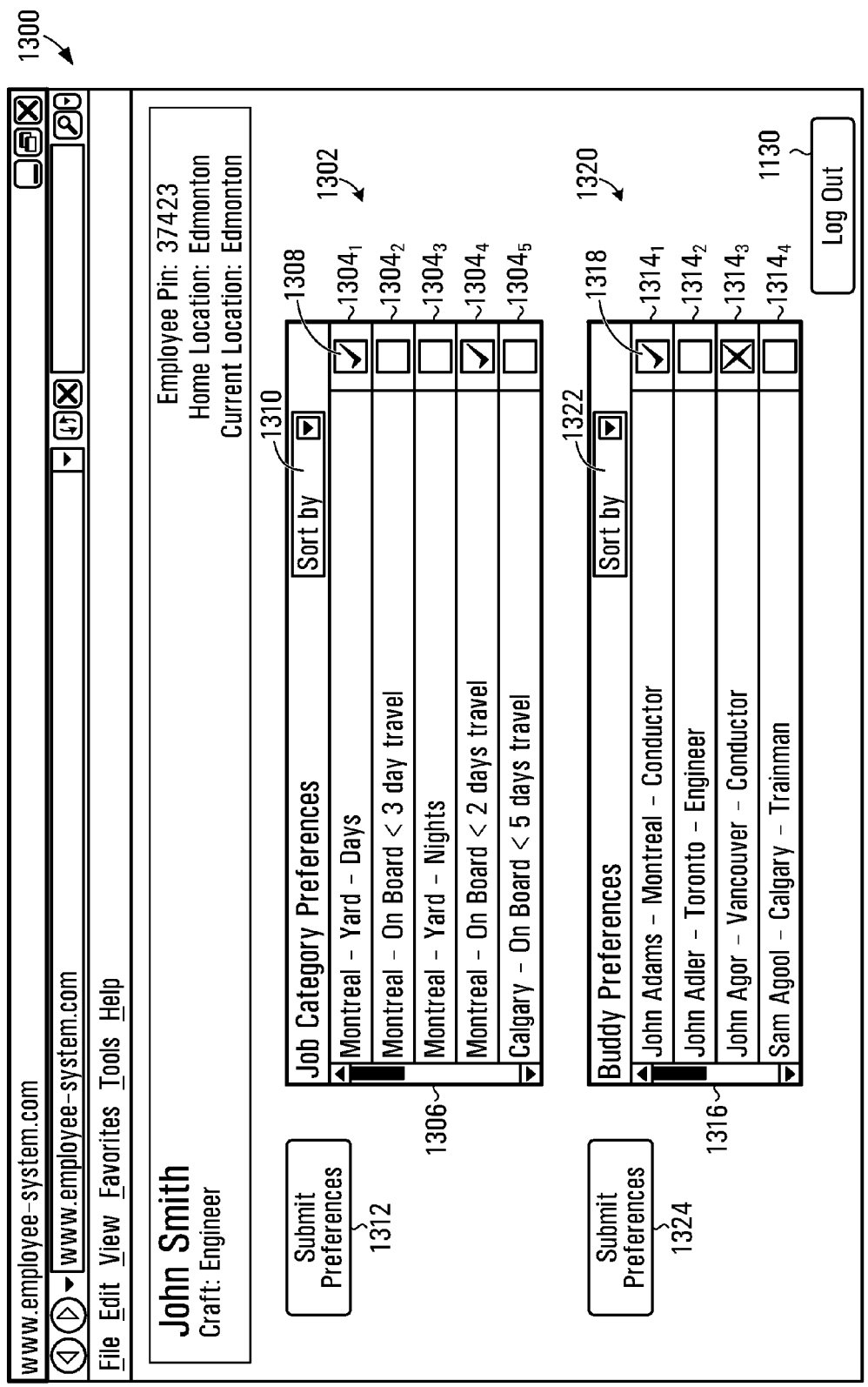

Referring back to FIG. 11, when an employee clicks on the employee preferences button 1116 on the personalized webpage 1100, the employee is sent to an employee preferences webpage 1300 as shown in FIG. 13. The employee preference page 1300 includes all the same header information as on the personalized webpage 1100, namely the employee's name 1102, the employee's pin 1104, home location 1106, current location 1108 and craft 1110.

The employee preferences webpage 1300 is operative for enabling the user to specify preferences that can be used in the job assignment process. These preferences can be used in order to:

provide the user with more personalized job choices on which the user can bid; and/or automatically assign (or force) a job to an employee that will fit within the employee's preferences.

In general, the employee's preferences relate to:

the types of jobs that the employee would prefer to do; and the people that the employee would prefer to work with (and/or not work with).

Traditionally, in order to have a chance at being assigned a given job, an employee would have to place a bid on (i.e., a request for) that job. This meant that in order to get a preferred job assignment, the employee would generally have to bid on multiple different jobs in order to be assigned a single job. In some cases, if all the jobs that an employee bid on were assigned to others, the employee would be randomly assigned a job that he/she did not bid on, which could lead to and result in employee dissatisfaction.

By enabling employees to select the types (or categories) of jobs that they would prefer to work, employees can bid on a preferred category of jobs, instead of a preferred single job. Bidding on a category of jobs provides the benefit of being less time consuming for the employee, since they can bid on a single category rather than multiple jobs. Furthermore, since multiple jobs will fall within that preferred job category, it is more likely that the employee will be assigned a job that falls within that category, which may lead to and result in greater employee satisfaction.

FIG. 13 shows a non limiting example of the employee preference webpage 1300 that enables an employee to select certain job categories (which can be referred to as job "buckets") and certain preferred colleagues (which can be referred to as "buddies"). The purpose of the job buckets is to group a plurality of jobs according to various criteria. As mentioned above, by grouping jobs according to various criteria, when an employee selects a given job bucket as being a preferred job bucket, he or she is eligible to be assigned any job that falls within that bucket.

The purpose of enabling an employee to select preferred buddies is to try to assign jobs that allow the employee to work with his/her preferred colleagues. Working with preferred colleagues can also greatly influence an employee's job satisfaction.

In the non-limiting example shown in FIG. 13, in order to allow an employee to select preferred job buckets, the webpage 1300 comprises a job category preference box 1302 that includes a list of possible job categories $1304_{1-k}$. In the examples shown, the job categories $1304_{1-k}$ specify a geographical area in which the job takes place, a type of job (such as a job in the yard or on board a train) and the time period or shift associated with the job. For example, a job bucket may include all jobs that are located in the Montréal area that are performed during a day shift and have a duration of less than three (3) days.

It should be appreciated that any type of job categorization could be used without departing from the spirit of the invention. For example, the job categories may also indicate the length of the job, such as jobs lasting a few months or a few days, and/or the type of craft required for the jobs within that category (e.g., conductor, engineer, etc).

The job category preference box 1302 is a control that includes a scroll bar 1306 for allowing the user to scroll through the list of categories such that the user can view all the job categories $1304_{1-k}$ listed therein. Included next to each of the job categories $1304_{1-k}$ is a selection sub-control 1308 (such as a check box) for allowing a user to select (or deselect) certain ones of the individual category entries $1304_1 k$ Although the selection sub-control 1308 shown in FIG. 13 is a check box, it should be appreciated that other manners of allowing a user to select a given category are included within the present invention. For example, a given one of the categories $1304_{1-k}$ may be selected when an employee highlights the category by clicking a mouse over the category name. Obviously, other manners of selecting one or more categories are possible without departing from the spirit of the invention.

It is possible for there to be tens, if not hundreds, of different job categories $1304_{1-k}$. As such, the job category preference box 1302 further includes a filter control 1310 (such as a drop-down list) for enabling a user to sort and/or filter the job categories $1304_{1-k}$ according to different criteria. For example, the different filtering and/or sorting criteria that are presented in filter control 1310 may include:

location (such as city, region, etc);

craft (such as engineer, conductor, etc);

shift time (such as day shift or night shift); duration (such as 1 day, 2 days, 1-3 days, less than 5 days, etc);

keywords or phrases (such as "conductor AND Toronto AND night").

These sorting/filtering criteria are provided for the sake of example only, and it should be appreciated that other sorting/filtering criteria (such as keyword searching) could also be used without departing from the spirit of the invention. Although a drop-down list is used to represent the filter control 1310 in FIG. 13, it should be appreciated that there are numerous ways known in the art for allowing a user to sort and/or filter a list, all of which are included within the spirit of the invention.

By sorting the list using the filter control 1310, the job categories $1304_{1-k}$ can be listed in an increasing or decreasing order according to the sorting criteria. For example, assume that the default display for the job category preferences box 1302 is that each of the job categories $1304_{1-k}$ listed therein are organized by the name their city in decreasing alphabetical order. Next, assume that an employee uses the filter control 1310 to filter the list according to those jobs in a particular area, such as Calgary.

By filtering the list, only the job categories $1304_{1-k}$ that fit within the selected filtering criteria (i.e., those in Calgary) are shown in the box 1302. Enabling a user to sort and/or filter the job categories $1304_{1-k}$ allows an employee to more easily and efficiently identify his or her preferred job categories $1304_{1-k}$ from the list.

Once an employee has selected his/her preferred job categories $1304_{1-k}$, the user then clicks on a submit preferences button 1312. In accordance with a non-limiting embodiment, the employee's preferred categories are stored in the employee profile database 22 in the Job Preferences Information section 312 when the submit preferences button 1312 is clicked. As will be described in more detail below, these job preferences will be accessed by the processing entity 36 during the job assignment process.

In case the employee wants to modify his or her job preferences at a later date, the user simply needs to access the employee preference page 1300, change the job preference selection (by selecting and/or deselecting certain ones of the selection controls 1308, for example) and then click the submit preferences button 1312 again. This will cause the employee's job preference information to be updated in the employee profile database 22.

The employee preference webpage 1300 further comprises a preferred buddy control box 1320 that includes a list of colleagues $1314_{1-k}$ (i.e., other employees) who work at the company. In the examples shown, the list of colleagues $1314_{1-k}$ includes the other colleagues' names, their location, as well as their primary craft. It should be appreciated that any other type of information associated with the colleagues could be included, such as the colleague's manager, his or her department/division and the number of years he or she has spent at the company.

The preferred buddy box 1320 includes a scroll bar 1316 for allowing the user to scroll through the list of colleagues $1314_{1-k}$. Included next to each of the colleagues $1314_{1-k}$ is a selection control 1318 for allowing a user to identify certain colleagues as "buddies" (colleagues that the user would prefer to work with) and "non-buddies" (colleagues that the user would prefer not to work with).

In the non-limiting example shown in FIG. 13, the selection control 1318 takes the form of a check box that can be left empty, contain a checkmark or contain an "X". By placing a checkmark in the control 1318 associated with a given colleague (such as in the case of colleague number $1314_1$) the user is designating that colleague as a buddy with whom he or she would like to work. By placing an "X" in a control 1318 associated with a given colleague (such as in the case of colleague number $1314_3$), however, the user is designating that colleague as a non-buddy with whom he or she does not want to work. Leaving the control 1318 associated with a given colleague empty (such as in the case of colleague number $1314_2$) indicates that the employee is neutral to (i.e., neither prefers not does not prefer) working with the colleague. The user may set a given instance of the control 1318 by right-clicking the mouse and then selecting between a "checkmark" and an "X" from a menu that appears.

Although a check box is used for the selection control 1318 is shown in FIG. 13, it should be appreciated that other means of allowing an employee to select buddies and non-buddies from the list of colleagues $1314_{1-k}$ are included within the present invention. For example, a given one of the colleagues $1314_{1-k}$ may be selected when an employee highlights a category by clicking a mouse over the category. Obviously, other manners of selecting one or more colleagues are possible without departing from the spirit of the invention.

In an alternative embodiment, it is possible to have two separate lists of colleagues for the buddies and non-buddies, such that one list is used to designate "buddies" and the other list is used to designate "non-buddies".

It is quite likely that the list of colleagues $1314_{1-k}$ will include hundreds, if not thousands, of different colleagues. As a result, the employee preference box 1320 includes a filter control 1322 (such as a drop-down list) for enabling an employee to sort and/or filter the list $1314_{1-k}$ according to different criteria. For example, the different filtering and/or sorting criteria that are presented in the filter control 1322 may include:

location (such as city, region, etc);
   craft (such as engineer, conductor, etc);
   division (which could be an alpha-numeric identifier, or a division name);
   by a keyword or phrase (such as a last name and first initial); and/or
   a given manager.

These sorting criteria are provided for the sake of example only, and it should be appreciated that other sorting criteria could also be used without departing from the spirit of the invention. The purpose of these sorting and filtering criteria is to allow an employee to quickly and easily be able to locate the colleagues that he/she would like to specify as buddies or non-buddies. Although a drop-down list is used for the filtering control 1322 shown in FIG. 13, it should be appreciated that there are numerous ways known in the art for allowing a user to sort and/or filter a list, all of which are included within the spirit of the invention.

Once an employee has identified his or her buddies and non-buddies from the list of colleagues $1314_{1-k}$, the user then clicks on the submit preferences button 1324. In accordance with a non-limiting embodiment, the employee's preferred buddies and non-buddies are stored in the employee profile database 22 in the Job Preferences Information section 312 when the submit preferences button 1324 is clicked. As will be described in more detail below, these buddies and non-buddies will be accessed by the processing entity 36 such that job assignments for the employee are selected, at least in part, on the basis of this information.

Although the employee preferences webpage 1300 shown in FIG. 13 comprises two separate submit buttons (i.e., the submit button 1312 for the preferred job categories and the submit button 1324 for the preferred buddies/non-buddies), it is possible for the webpage 1300 to include only one submit button. In this case, clicking the one button would store both the employee's preferred job categories and his or her buddies/non-buddies in the employee profile database 22.

In the embodiment shown in FIG. 13, the job category preferences box 1302 includes a list of job categories $1304_{1-k}$ that have been pre-defined for the user. These pre-defined job categories $1304_{1-k}$ can be pre-defined by the industry, or more likely, by the employer of the user. As such, in this embodiment, a user is restricted to selecting preferred categories of jobs from the list of job categories $1304_{1-k}$ that have been pre-defined.

In an alternative embodiment, instead of having to select preferred job categories from pre-defined job categories, an employee can define his/her own preferred job categories. As a result, the user can customize the preferred job categories such that there is a better chance that his or her preferred jobs will fall within the criteria specified in these user-defined categories.

Shown in FIG. 13A is a non-limiting example of an interface for allowing an employee to define his/her own preferred job categories. In the case where the preferred job categories are defined by the user, this interface could replace the job category preferences box 1302 shown in FIG. 13.

In the non-limiting example of implementation shown, in order to enable the employee to define his or her job preference categories, the interface comprises user-defined job category tables $1330_1$ and $1330_2$ which identify the criteria that have been specified by the employee for defining that job category. In order to define a given job category, the employee can specify a variety of different criteria. In the example of the user-defined job category table $1330_1$, the employee has specified three different criteria, namely the preferred craft $1336_1$, the preferred time duration $1336_2$ and the preferred start location $1336_3$. It should be appreciated that any other type of criteria, such as type of job and/or the time of day that the job takes place could have been included.

There are multiple different ways that an employee can specify the criteria in the user-defined job category tables $1330_1$ and $1330_2$. For example, the job category tables $1330_1$ and $1330_2$ may be editable text boxes, such that an employee can simply type in the desired criteria in these boxes. Although simple, this embodiment would likely require the employee to have prior knowledge of the various criteria, such as the names and/or codes for each job category.

Alternatively, and in the embodiment shown, each of the user-defined job category tables $1330_1$ and $1330_2$ includes a "define criteria" button 1338. By clicking this button, the user is taken to a Define Category Criteria webpage, such as page 1340 shown in FIG. 13B.

The Define Category Criteria webpage 1340 includes all the same header information as on the personalized webpage 1100, namely the employee's name 1102, the employee's PIN number 1104, home location 1106, current location 1108 and the craft 1110. Furthermore, the webpage 1340 further comprises a list for different criteria, namely a craft criteria $1342_1$, a region criteria $1342_2$, a job duration criteria $1342_3$, a shift type criteria $1342_4$, and a job type criteria $1342_5$.

Each criteria is associated with a selection control, which in this embodiment are represented by drop-down lists $1344_{1-5}$, each of which provide options for defining the preferences within each criteria. By selecting one of the options within a given drop-down list 1344, an employee is able to indicate his or her preference for the associated criteria 1342, where applicable. In the case where a user does not necessarily have a preference for a given criteria, the user may just leave the drop-down list option as "Any". For example, if the user does not really mind what duration the job will be, he or she may not select a given one of the options within drop-down list $1344_3$, and just leave this option set to "Any".

It should be appreciated that the criteria $1342_{1-5}$ and the options shown within the drop-down list $1344_{1-5}$ are provided for the sake of example only, and that other criteria and other options could be included without departing from the spirit of the invention. Furthermore, although the drop-down lists $1344_{1-5}$ represent the selection controls in FIG. 13B, it should also be appreciated that any other type of interface for permitting selection (such as a list with check boxes) could be used in accordance with the invention.

Once the employee has selected all of his or her preferences using the drop-down lists $1344_{1-5}$, the user will then click a "submit" button 1346, which will store the user's preferred job category information in the job preferences information section 312 of the employee profile database 22, as well as return the employee to the Employee Preferences Categories webpage shown in FIG. 13A.

More specifically, once the "submit" button 1346 has been clicked, the preferred options for each criteria that were selected by the employee appear within the associated user-defined preferred job category table, such as the table $1330_1$. In this manner, the selections that were made on the Define Category Criteria page 1340 populate the user-defined preferred job category table with the employee's preferred options for each criteria. This allows an employee to define (and manage) his or her preferred job categories or buckets.

The employee may create as many user-defined preferred job tables as he or she desires. In some circumstances, however, the employee management system 10 may limit the employee to defining a maximum number of preferred categories, for example five (5) categories. In the non-limiting example shown in FIG. 13A, there are two (2) user-defined preferred job category tables (i.e., the tables $1330_1$ and $1330_2$) that are automatically displayed to the user. In the case where an employee wants to add another user-defined preferred job category table, he or she would click an "add category" button 1332. By clicking this button, a new table 1330 will appear, such that the user can configure another user-defined preferred job category for himself or herself.

In the case where the employee wants to remove one of the user-defined preferred job category tables that he or she has set up previously, the user can click on a "delete category" button 1334. The button 1334 can work in a variety of different manners. For example, the user can highlight one of the user-defined preferred job category tables (e.g., the table $1330_1$ or $1330_2$) in the interface and then click the "delete category" button 1334, such that the highlighted table is deleted. Alternatively, clicking the "delete category" button 1334 may display a list of all the user-defined preferred job categories set up by the employee, with a selection control (e.g., check box) next to each category. The user will then select the category that he or she wants to delete, and then click the "delete category" button 1334 again to delete the selected job preference category. It should be appreciated that there are other manners that can be used to delete a given job preference category, all of which are included within the scope of the present invention.

In accordance with a first non-limiting example, the user preferences (both the job category preferences and the buddy preferences) can be set up by the user such that they are stored in the employee database 22 and remain the same until they are changed/updated by the employee. As such, the employee needs only to set up his/her preferences once, such that they are then used whenever a job assignment process takes place by the management system 10. However, in an alternative non-limiting example, the user preferences (both the job category preferences and the buddy preferences) are re-set after each job assignment, such that the user needs to re-submit his/her preferences after each job assignment. In this manner, the system causes the user to reconsider his/her preferences on a fairly regular basis. In the case where a user does not re-submit preferences, then the system will assign future jobs without any consideration for user preferences.

Job Bidding

As mentioned above, an employee can be assigned a job in at least one of three ways:
1. The employee can be assigned a job on which he/she has placed a bid;
2. The employee can be assigned a job that is forced on him/her; and/or
3. The employee can be assigned a job that he/she has selected based on a seniority move.

The manner in which an employee places a bid on a job will now be described in more detail with respect to the Job Assignment Bidding Page 1500 shown in FIG. 15. Referring back to FIG. 11, when an employee clicks on the "job assignment bidding" button 1124 on the personalized webpage 1100, the employee is sent to the Job Assignment Bidding Page 1500 as shown in FIG. 15. The Job Assignment Bidding Page 1500 does not include all the same header information as on the personalized webpage 1100, since the Job Assignment Bidding Page 1500 is not personalized for an individual employee and is instead available to a plurality of employees.

In the non-limiting embodiment shown, the Job Assignment Bidding Page 1500 includes a bulletin display table 1502, a bulletin details button 1504, a preferred buddies button 1506 and a preferred buckets button 1508. Each of these will be described in more detail below.

The bulletin display table 1502 lists a plurality of records $1514_{1-k}$ that are each associated with a group of jobs, which is referred to as a "bulletin". The bulletins that populate the bulletin display table 1502 can be generated and retrieved from information stored in the train schedules database 20 described above. The information, such as job availabilities, from the train schedules database 20 can be either directly displayed within the bulletin display table 1502, or alternatively, some processing can be performed on this information prior to displaying it in the bulletin display table 1502. For example, the job availability information from the train schedule database 20 may be processed by the processing entity 36 in accordance with various rules, in order to group the job assignments into the various bulletins that are associated with each record in the records $1514_{1-k}$ that are displayed in the bulletin display table 1502.

Furthermore, the job availabilities from the train schedules database 20 may be processed such that only bulletins (or jobs) that are located within the vicinity of the employee are displayed in the bulletin display table 1502. In this case, the job availabilities information from the train schedules database 20 may be processed against information contained in the employee profile database 22, so that information that is displayed in the bulletin display table 1502 contains information that will be more relevant to the given employee. For example, if the employee is based in Montréal, it may only make sense to display job availabilities that are located within (or originate from) 100 km of that employee.

In the non-limiting embodiment shown, each of the records $1514_{1-k}$ (i.e., bulletins) that appear in the bulletin display table 1502 is displayed in row format and include data elements that are displayed in data field columns, such as bulletin name 1520, bulletin type 1522, bid type 1524, open date/time 1526, close date/time 1528, bid time remaining 1530 and status 1532. As will be explained in more detail below, each bulletin relates to a plurality of jobs on which an employee can bid. The jobs within each bulletin may be grouped on the basis of jobs within a given geographical area, such as the "Edmonton bulletin" or the "Toronto bulletin", or may be jobs that are grouped on the basis of a given train or within a given time period, among other possibilities.

The bulletin name 1520 provides an identification of the group of jobs that are associated with the given record $1514_{1-k}$, and the bulletin type 1522 provides an administrative indication of the type of bulletin. In the non-limiting example shown, the bulletin types can be Change of Card (CoC), Ad-Hoc or standing bid.

An employee is able to sort/filter the records $1514_{1-k}$ in the bulletin display table 1502 by their bulletin type. The bulletin type column heading includes a sorting/filtering control 1516 (e.g., drop-down list) that allows the employee to sort and/or filter the records $1514_{1-k}$ according to their bulletin type. For example, by using the sorting/filtering control 1516 the employee could cause the records $1514_{1-k}$ having the Change of Card bulletin type to be displayed first, last, or to be the only records displayed in the table 1502.

The bid type 1524 provides an indication of whether the jobs within a bulletin are permanent jobs, temporary jobs or both (meaning that both permanent and temporary jobs are available). Like bulletin type 1522, the heading for the bid type column includes a sorting/filtering control 1518 (e.g., a drop-down list) that allows the employee to sort and/or filter the records $1514_{1-k}$ according to their bid type. For example, by using the sorting/filtering control 1518, the employee could cause the records $1514_{1-k}$ for jobs that are temporary to be displayed first, last, or to be the only records displayed in the table 1502.

The open date/time 1526 and the close date/time 1528 indicate the date and time at which the bulletin was put up for bidding and the date and time that the jobs within that bulletin will be closed for bidding. Each record $1514_{1-k}$ further includes the bid time remaining element 1530 that provides an indication of the amount of time that is left to place a bid on one or more jobs within the bulletin. This data element may be dynamic, meaning that it provides an active count-down of the amount of time left for placing a bid, which may be viewed by a user of the bulletin display table 1502.

Each of the records $1514_{1-k}$ further includes the status data element 1532 that is indicative of the status of a given bulletin. In the example shown, the status can be either "active", meaning that an employee can still bid on the jobs within the bulletin, or "closed", meaning that an employee can no longer bid on the jobs. It is possible that a bulletin having the "closed" status may still be presented within the bulletin display table 1502 for a given period of time, such as one week, for example.

An employee is able to sort/filter the records $1514_{1-k}$ in the bulletin display table 1502 by their status. The column heading for the status elements 1532 includes a sorting/filtering control 1536 (e.g., drop-down list) that allows the user to sort and/or filter the records $1514_{1-k}$ according to their status. For example, by using the sorting/filtering control 1536, the employee could cause only the records $1514_{1-k}$ having the "active" status to be displayed in the table 1502, or cause these records to be displayed prior to the records having the "closed" status.

In an alternative embodiment, the bulletin display table 1502 may display only those bulletins that are active (i.e., the records $1514_{1-k}$ where the status element 1532 is set to Active), in which case there is no need for the sorting/filtering control 1536 since only active bulletins will be displayed to a user.

The bulletin display table 1502 also includes a scroll-bar 1503 such that the user can review all of the different records $1514_{1-k}$ that are listed in the bulletin display table 1502. In this manner, the user can scroll through the entire list of records $1514_{1-k}$ and individually select the bulletins he or she desires to bid on.

As mentioned above, the Job Assignment Bidding page 1500 includes a bulletin details button 1504, that acts as a control component for obtaining more information about a given bulletin. This can be done by highlighting a selected one of the records $1514_{1-k}$ associated with a given bulletin and then clicking on the bulletin details button 1504. Alternatively, by clicking on a selected one of the records $1514_{1-k}$ itself, such that each record acts as a control component, may cause the graphical user interface to provide more information about a given bulletin. More specifically, the graphical user interface will display a new webpage or window that will provide expanded information about the selected bulletin. For example, the new webpage may provide an indication of the "Crafts" of jobs (such as Engineers, Conductors, Railmen, etc) that are offered within the selected bulletin, an indication of the Seniority Rosters, an award date and time, the timezone associated with the bulletin, the renewal period, bulletin status and any additional information that may be relevant to someone interested in placing a bid on one or more of the jobs within the given bulletin.

The preferred buddies button 1506 and the preferred buckets button 1508 can be used by the employee in order to filter the bulletins within the bulletin display table 1502. For example, in the case where the user clicks on the preferred buddies button 1506, the list of bulletins within the bulletin display table 1502 is filtered to display those bulletins that include one or more jobs on which the employee's "buddies" have already placed a bid, or have already been assigned. This functionality may allow an employee to more easily view and consider those bulletins that would provide him or her with a chance of working with his or her preferred colleagues.

Likewise, when the user clicks on the preferred buckets button 1508, the list of bulletins within the bulletin display table 1502 is filtered to display those bulletins that include one or more jobs that satisfy the criteria in one or more of the employee's preferred buckets. This functionality may allow an employee to more easily view and consider those bulletins that provide jobs that fit into his or her preferred buckets. As a result, the user is able to more quickly and efficiently place bids on jobs that may be of interest to him or her.

Once an employee has finished viewing the additional information within the new webpage, he/she can return back to the Job Assignment Bidding page 1500.

In addition to the expanded information that can be accessed from the "bulletin details" button 1504, the employee may also access the complete listing of jobs that are included within each bulletin. In accordance with a non-limiting example of implementation, this can be done by clicking on the bulletin name 1502 within each of the records 1514$_{1-k}$. More specifically, the bulletin name within each of the records 1514$_{1-k}$ can act as a hyperlink to a webpage that provides a list of jobs within that bulletin.

For the sake of example, assume that an employee would like to view all the jobs within the Edmonton Bulletin of the record 1514$_2$. In order to view the jobs, the employee would click on the bulletin name element 1520 (i.e., "Edmonton Bulletin") within the record 1514$_2$. By so doing, the user will be provided with an Assignment Details webpage 1540, which is shown in FIG. 15A.

Figure 15A:
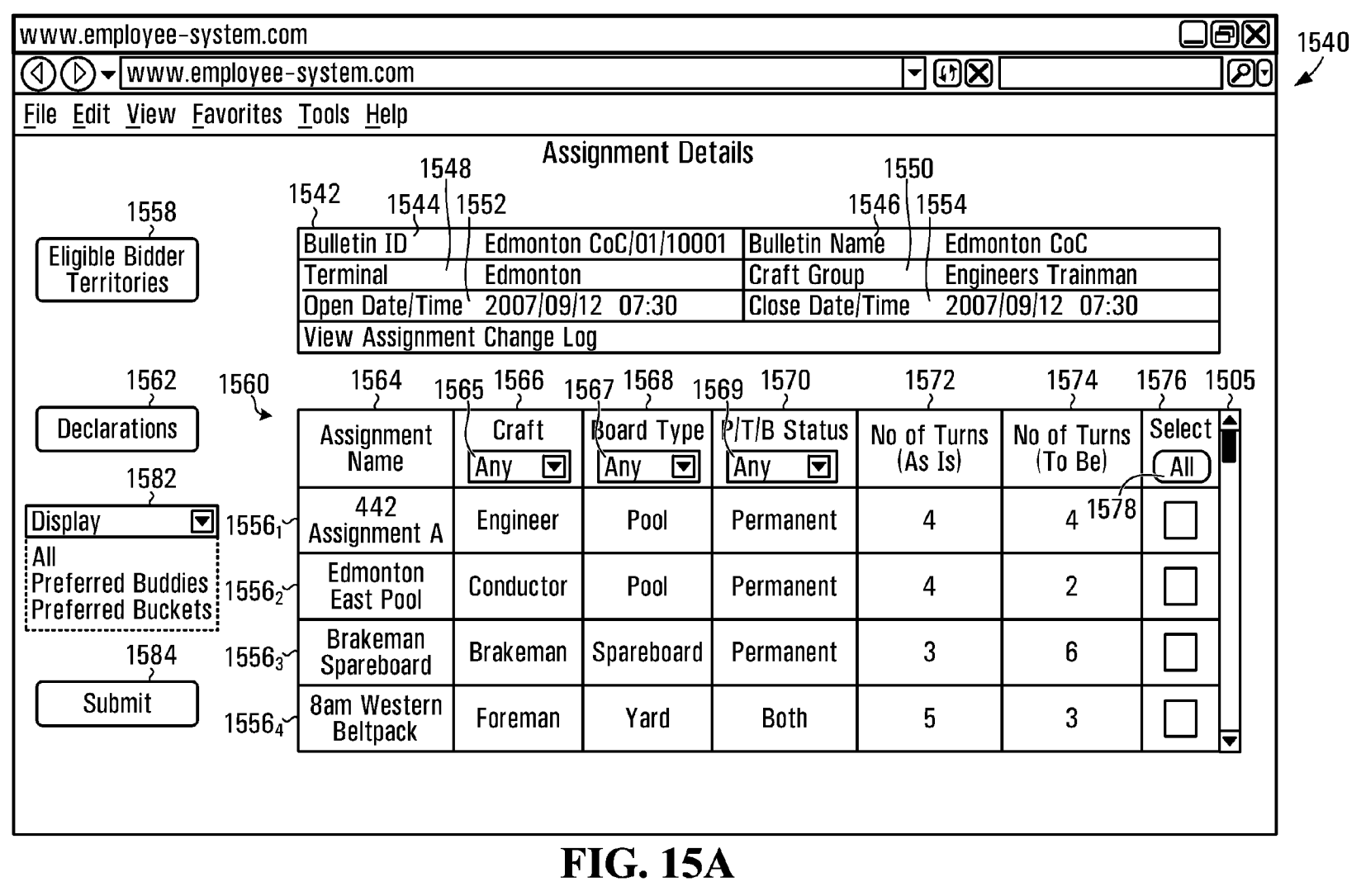

In the non-limiting example shown in FIG. 15A, the Assignment Details webpage 1540 includes a header portion 1542 that identifies the bulletin whose jobs are being viewed. The header portion 1542 provides an indication of the bulletin ID 1544, the bulletin name 1546, the terminal associated with the jobs 1548, the Craft Group 1550, the Open Date/Time 1552 and the Close Date/Time 1554. Much of the information in the header portion 1542 is identical to information shown for the associated record in the bulletin display table 1502 of FIG. 15.

The Assignment Details webpage 1540 also includes a job assignments table 1560 that lists the different jobs available under the "Edmonton Bulletin". The table 1560 includes a list of records 1556$_{1-k}$ that each relate to a given type of job in the bulletin. Each of the records 1556$_{1-k}$ includes an assignment name data element 1564, a craft data element 1566, a board type data element 1568, a P/T/B status data element 1570, a Number (No) of turns (as is) data element 1572 and a Number (No) of turns (to be) data element 1574. The job assignments table 1560 further includes a selection control 1576 for allowing an employee to select the given type of job associated with the record 1556$_{1-k}$.

The job assignment table 1560 includes a scroll-bar 1505 that allows the user to review all of the different records 1556$_{1-k}$ listed in the job assignment table 1560. In this manner, the employee can scroll through the entire list of records 1556$_{1-k}$ (or a sorted subset thereof, the filtering means by which such a subset is generated is described below) in order to find his or her desired jobs.

The assignment name data element 1564 provides an indication of the job's name, while the craft data element 1566 provides an indication of the type of craft required to perform the job. For example, the craft data element 1566 for record 1556$_2$ specifies that the craft required for this assignment is that of a conductor. As such, in order to be able to bid on the job associated with record 1556$_2$ the employee would need to be a conductor.

To allow an employee to sort/filter assignments by their craft type, the column heading for the craft data element 1566 includes a sorting/filtering control 1565 (e.g., drop-down list) that allows the user to sort and/or filter the records 1556$_{1-k}$ according to their craft. For example, by using the sorting/filtering control 1565 the user could cause only the records 1556$_{1-k}$ having the "conductor" craft to be displayed first, last or be the only records displayed in the table 1560. This may allow an employee to more quickly find and view the job records 1556$_{1-k}$ that he or she is interested in.

The board type data element 1568 provides an indication of the type of job, such as pool, spareboard, yard, etc. Like the craft type element, the board type column heading includes a sorting/filtering control 1567 (e.g., drop-down list) that allows an employee to sort and/or filter the records 1556$_{1-k}$ according to their board type. For example, the employee use the sorting/filtering control 1567 to cause only the records 1556$_{1-k}$ having the "pool" board type to be displayed in the table 1560, thereby allowing the user to more quickly find and view the job records 1556$_{1-k}$ that he or she is interested in.

The P/T/B status data element 1570 provides an indication of whether the jobs are permanent, temporary or both. This has been described above in relation to other tables, and as such will not be described in more detail herein. The P/T/B status data element 1570 also includes a sorting/filtering control 1569 (e.g., drop-down list) that allows an employee to sort and/or filter the records 1556$_{1-k}$ according to the permanent/temporary or both status, thereby allowing the user to more quickly find and view the job records 1556$_{1-k}$ that he/she is interested in. Since the control 1569 operates similarly to the previously described controls 1567 and 1565, no further description needs to be provided.

The No. of turns (as is) data element 1572 and the No. of turns (to be) data element 1574 respectively provide an indication of the number of job positions that are currently filled for a given job and the number of positions that will be filled for a given job. For example, in the case of record 1556$_3$ there are currently three (3) job positions for the job of "brakeman spareboard." However, there will be six (6) job positions available for this job, meaning there will be three additional people assigned to this job in the future than are currently assigned to the job.

Each of the records 1556$_{1-k}$ in the job assignment table 1560 further includes a selection control 1576 (e.g., check box) that allows an employee to select the job associated with a given record. For example, in the case where the control 1576 is represented by a checkbox, the user places a check mark in the check box associated with the one or more record(s) in order to select those job(s) that the employee would like to bid on. It should be appreciated that by placing a check mark in multiple different check boxes, the user is able to place a bid on multiple different jobs (or groups of jobs) at the same time.

Furthermore, the column heading of the selection controls 1576 includes an "All" button 1578 for enabling a user to activate all of the selection controls 1576 simultaneously. As such, a user can select all of the jobs listed within the job assignment table 1560 with one click, which may be convenient in some of the situations described below.

Once an employee has selected a job or jobs that he/she would like to bid on via one or more of the selection controls 1576 associated with the desired jobs, the user can then click on the "submit" button 1584. By clicking the "submit" button 1584, the employee provides an indication to the processing entity 36 of the jobs that he or she would like to be assigned.

The manner in which the processing entity 36 considers these job submissions will be described in more detail further on in the description.

The Assignment Details Page 1540 further includes an "eligible bidder territories" button 1558 that provides an indication of territories in which the given employee is eligible to bid and a declarations button 1562.

Clicking the "declarations" button 1562, the employee is presented with a "declarations" pop-up window or webpage that allows the user to make certain declarations.

FIG. 15B shows a non-limiting example of a declarations pop-up window 1580. As shown, the pop-up window 1580 provides the employee with the ability to answer a variety of questions regarding overtime and where the employee would like to work, among others. The purpose of the declarations pop-up window 1580 is to ask the employee about certain working conditions that he or she may be willing to accept. These declarations may be taken into consideration by the processing entity 36 when assigning a job to an employee.

The Assignment Details Page 1540 further includes a display control 1582 (e.g., a drop-down list) that allows a user to sort/filter the list of records $1556_{1-k}$ based on user preferences (i.e., buckets and buddies) that were described above. As shown, the display control 1582 allows a user to sort and/or filter the list of records $1556_{1-k}$ based on the preferred buddies (i.e. the employees that the user would and would not like to work with) and on the preferred buckets (i.e. the preferred categories of jobs that the user has previously defined or selected). Alternatively, the control 1582 could allow an employee to display the list of records $1556_{1-k}$ based on both the preferred buddies and the preferred buckets.

The display control 1582 can either be configured to sort or filter the list of records $1556_{1-k}$ based on the item selected by the user from the drop-down list 1582. By sorting the list, the records $1556_{1-k}$ can be listed in an increasing or decreasing order according to the sorting criteria. Any records $1556_{1-k}$ that do not meet the sorting criteria would be positioned below the relevant records $1556_{1-k}$ that did meet this criteria. For example, in the case where the list is sorted according to preferred buckets of jobs, each of the jobs that meet the sorting criteria are listed as the first records within the job assignment table 1560, and the records that do not meet the sorting criteria are positioned after these first records. Optionally, the records that did not meet the sorting criteria may not be displayed at all.

By filtering the list, only the records $1556_{1-k}$ associated with jobs that meet the filtering criteria are listed. For example, in the case where the list is filtered according to preferred buckets of jobs, only the records that meet the criteria specified in the preferred buckets are shown. By enabling a user to sort and/or filter the records $1514_{1-k}$ listed in the job assignment table 1560, an employee can more easily and efficiently identify the records $1556_{1-k}$ associated with the jobs that the user wants to bid on.

For the sake of example, assume that the display control 1582 is configured to have a filtering functionality. Further assume that the employee may only want to bid on jobs that meet the criteria identified in his or her preferred buckets or categories. As such, the user could select the Preferred Buckets item from the display control 1582 such that only the records $1556_{1-k}$ associated with the jobs that meet the criteria outlined in the employee's preferred buckets are listed in the table 1560.

Once this is done, the user can click on the "all" button 1577, such that all the jobs that meet the criteria outlined in the employee's preferred buckets are selected. In this manner, the employee is able to quickly and easily place a bid on all jobs that meet the criteria and characteristics within a preferred category of jobs, instead of having to individually identify jobs that meet his/her preferred criteria and select those jobs one-by-one.

It should be appreciated that in the case where the employee has a plurality of preferred job categories (such as in the case of the selected job categories in FIG. 13, and more specifically the user-defined preferred job categories illustrated in FIG. 13A), the display control 1582 may list each individual preferred job category that has been selected and/or defined by the employee, such that the list of records $1556_{1-k}$ can be filtered according to each individual one of the preferred categories.

In order to filter the list of records $1556_{1-k}$ according to the user's preferred categories of jobs, the processing entity 36 firstly identifies within the employee profile database 22 the employee's preferred job categories, specifically by consulting the job preferences information section 312 within this database. Once information regarding the employee's preferred categories has been retrieved, the processing entity 36 then compares the jobs listed within the job assignment table 1560 to the preferred category information, and based on this comparison, identifies the jobs within the job assignment table 1560 that meet the preferred category criteria. The processing entity 36 may then cause only those jobs that have been identified as being jobs that meet the preferred category criteria to appear in the list of records $1556_{1-k}$ within the job assignment table 1560.

When the user no longer wants to view only the jobs that match his or her preferred categories, he or she can select the "All" option in the display control 1582 to return to viewing the entirety of the records $1556_{1-k}$ in the job assignment table 1560.

An employee may also want to bid on jobs that his or her preferred colleagues (i.e., buddies) will also be assigned to. In such a case, the user would select the Preferred Buddies item from the display control 1582 such that only jobs with have positions that have already been assigned to one of the employee's preferred buddies appear in the records $1556_{1-k}$. The user could then click the "All" button 1577, such that all the jobs that would allow the employee to work with his/her preferred colleagues are selected.

It should be appreciated that the Assignment Details Page 1540 was described with respect to the "Edmonton Bulletin" of record $1514_2$. However, the Assignment Details Page 1540 would be substantially the same for any of the records $1514_{1-k}$, with only the details that populate the job assignments table 1560 being different.

In an alternative embodiment of both the Job Assignment Bidding page 1500 and the Assignment Details page 1540, it is possible that the bulletin display table 1502 and the job display table 1560 have already been filtered according to the employee's preferred job categories by the processing entity 36. In this case, the records $1514_{1-k}$ and $1556_{1-k}$ will show bulletins and jobs that meet the criteria outlined in the employee's preferred job categories. As such, the preferred buckets button 1508 and the display control 1582 for filtering and/or sorting the list of records $1514_{1-k}$ and $1556_{1-k}$ respectively according to the employees preferred buckets may not be shown, since the list of records would already have been pre-filtered.

In another alternative embodiment of both the Job Assignment Bidding page 1500 and the Assignment Details page 1540, the bulletin display table 1502 and the job display table 1560 have already been filtered by the processing entity 36 according to the employee's preferred buddies. In this case, the records $1514_{1-k}$ and $1556_{1-k}$ will show bulletins and jobs that are currently assigned to the employee's preferred colleagues. As such, the preferred buddies button 1506 and the display control 1582 for filtering and/or sorting the list of records 1514$_{1-k}$ and 1556$_{1-k}$ respectively according to the employee's preferred buddies may not be shown, since the list of records would already have been pre-filtered.

In certain circumstances, the Assignment Details Page 1540 may include a "view other bidders" button (not shown). In the case where an employee selects one of the records 1556$_{1-k}$ from the job assignments table 1560, the employee can then click on the "view other bidders" button in order to view a list of other employees who have already placed a bid on the job associated with that record. For example, the employee may be provided with a pop-up window that lists all of the other employees who have placed a bid on that job. This may provide the user with both an indication of his or her chances of being assigned the job, as well as an indication of the other people that he/she may be working with should he or she be assigned the job.

Once the employee has selected one or more jobs from the job assignments table 1560, and has clicked the "submit" button 1584, the processing unit 36 receives an indication of the jobs that the employee has placed a bid on. It should be appreciated that this may be done a plurality of times. For example, the user may access the Assignment Details webpage 1540 for a variety of different bulletins that are presented on the Job Assignment Bidding webpage 1500. In this manner, each time the user accesses an Assignment Details webpage 1540 that is populated with jobs from different bulletins, the user may submit bids for additional jobs. As a result, the processing entity 36 may receive multiple job bidding submissions over a period of time for each employee.

In an alternative embodiment, instead of the Assignment Details Page 1540 including a "submit" button 1584, the Assignment Details Page 1540 may include an "add to bidding card" button. In this case, each time the user selects one or more jobs from the records 1556$_{1-k}$, he or she can then click on the "add to bidding card", which stores a record of these jobs within a bidding card record (not shown). The bidding card record can be thought of as a "shopping cart" of selected jobs for the employee. In this respect, the user can access the Assignment Details Page 1540 for a variety of different bulletins, and each time a new Assignment Details Page 1540 is viewed, the user can store the selected jobs within the bidding card record.

Once an employee has selected all of his or her desired jobs from the different bulletins, such that a list of all the selected jobs is included within the bidding card record, the user can review the bidding card record (which most likely is accessible via a button on the Job Assignment Bidding webpage 1500) in order to remove any jobs that he/she has decided that he or she does not really want to bid on. Once the employee is satisfied with the list of jobs in his/her bidding card record, the employee can then click on a "submit" button associated with the bidding card record in order to submit a bid to the processing entity 36 for all of the jobs listed in his/her bidding card record. In this manner, the processing entity 36 receives the job bid submissions from a user at one time, although the user could start a new bidding card record in order to submit further bids.

Figure 15C:
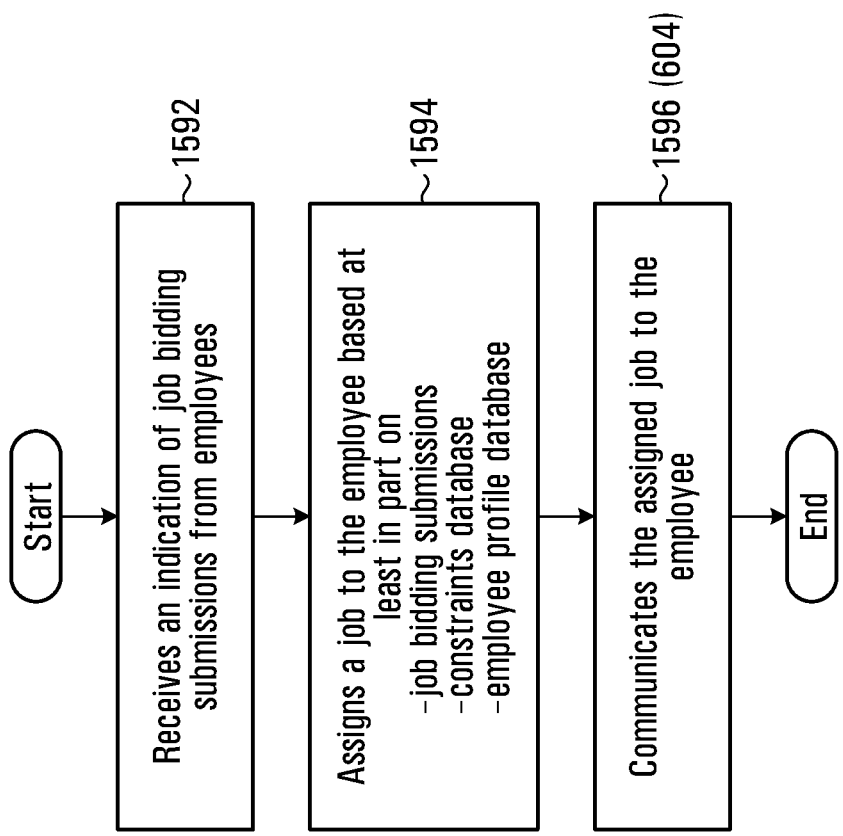
FIG. 15C shows a flow-diagram of a method according to a non-limiting example of implementation of assigning a job bid to employees.

The manner in which the processing entity 36 assigns a job to an employee on the basis of the job bidding submissions will now be described in more detail with respect to FIG. 15C. It should be appreciated that this process described with respect to FIG. 15C integrates with the process described above with respect to FIG. 6.

Step 1592

Firstly, at step 1592, the processing entity 36 receives an indication of job bidding submissions from one or more employees. The job bidding submissions provide the entity 36 with an indication of one or more jobs that each of the employees would like to be assigned. The job bidding submissions are provided to the processing entity 36 via a network connection that exists between computing entities being used by the one or more employees and the entity 36.

It should be appreciated that step 1592 may occur following step 600, which was described above with respect to FIG. 6. For example, step 600 may be performed in order to populate the job assignment table 1560 with jobs that are to be assigned to various employees. Then, following the determination of different jobs that are to be assigned to different employees (step 600), but prior to actually assigning jobs to at least some employees (step 602) the processing entity 36 will receive an indication of job bidding submissions from one or more employees.

Step 1594

At step 1594, following receipt of the job bidding submissions from an employee, the processing entity 36 assigns the jobs to employees based at least in part on:

Information within the job bidding submissions from employees;
information within the employee profile database 22; and
information within the constraints database 24.

It will be appreciated that step 1594 is essentially a more detailed version of step 602 shown in FIG. 6, wherein in addition to considering information within the employee profile database 22 and the constraints database 24, the processing entity 36 further considers the job bidding submissions from various employees.

For example, for a given employee, the processing entity 36 will consider the jobs that the employee has identified within the employee's job bidding submission on the basis of the information within the employee profile database 22, such as the qualification information 308. In this manner, the processing entity 36 can ensure that the employee is being assigned jobs that he or she is qualified for.

In addition, the processing entity 36 can consider the jobs that the employee has identified within his/her job bidding submission on the basis of the information within the constraints database 24, such as the government/industry regulation constraints 502 and the collective bargaining constraints 504. This will allow the entity 36 to establish whether or not the assignment of a job to a given employee is allowable.

Furthermore, the processing entity 36 will consider the jobs that the employee has identified within his/her job bidding submission on the basis of the jobs that other employees have placed bids on in their job bidding submissions. This will be done in order to try to find an optimized job assignment situation, wherein most (if not all) of the employees are assigned jobs that they have placed a bid on, and therefore are interested in doing.

There are a variety of different rules and algorithms that can be used by the processing entity 36 to optimize the job assignments on the basis of a plurality of job bidding submissions from a plurality of employees, and as such these will not be described in more detail herein. However, it should be appreciated that all rules and algorithms that could achieve this optimization are included within the scope of the present invention.

In certain circumstances, it may be possible that after considering the information within the employee job bidding submissions, the employee profile database 22 and the constraints database 24, not all employees will be assigned one of the jobs that they had selected in their job bidding submissions. For example, it is possible that a more junior employee will not be assigned any of the jobs that he/she had identified in his/her job bidding submissions due to seniority consideration, since all the jobs the junior employee bid on were assigned to (or taken by) more senior employees. In such a case, the processing entity 36 may arbitrarily assign a job to that junior employee that meets the employee's qualifications, territorial considerations and the constraints within the constraints database 24.

Step 1596

At step 1596, the processing entity 36 communicates the assigned jobs to the employees to whom those jobs have been assigned. This may be done in the same manner as was described above with respect to step 604 in FIG. 6.

In accordance with a non-limiting example of implementation, a job assignment may be communicated to an employee by providing a new record $1113_1$ in the assignment ownership history table 1112 on the employee home page 1100 shown in FIG. 11.

Seniority Move

Referring back to FIG. 11, when an employee is assigned a job that he or she does not necessarily want to accept, the employee can choose to decline the job assignment or exercise what is referred to as a seniority move.

In order to decline a job assignment, the employee would highlight (or otherwise select) the job within the assignment ownership history table 1112 that he/she would like to decline, and then click the decline job button 1126. Similarly, in order to exercise the seniority move option, the employee would highlight (or otherwise select) the job within the assignment ownership history table 1112, and then click the seniority move button 1128.

When an employee clicks the seniority move button 1128 on the personalized webpage 1100, he or she is sent to a Seniority Move webpage 1600, a non-limiting example of which is shown in FIG. 16. The webpage 1600 includes all the same header information as the personalized webpage 1100, namely the employee's name 1102, the employee's pin 1104, home location 1106, current location 1108 and craft 1110.

The Seniority Move page 1600 is provided to allow an employee to search for, and select, a different job assignment than the one that has been currently assigned to him/her. A user may choose to exercise this option when he or she has been assigned a job that he/she does not necessarily want to perform.

In the non-limiting example of implementation shown, the Seniority Move webpage 1600 includes a search section 1602 that provides a plurality of fields for defining search criteria, in order that a search can be performed for other (possibly more preferable) jobs on the basis of these criteria. The webpage 1600 also includes a search results section 1620, which displays the results of the search that is performed. Prior to the search being performed, the rows within the search results section 1620 may be empty. Alternatively, the search results section 1620 may not be present on the Seniority Move webpage 1600 until the search has been performed. In this case, only the search section 1602 is visible on the page 1600 prior to the search being performed.

In the non-limiting embodiment shown, the search section 1602 includes the following fields for defining search criteria: Terminal 1604, Entitlement 1606, Location 1608, Assignment Type 1610, Board Type 1612 and Assignment Name 1614. Each of these fields is associated with a control 1616 (e.g., drop-down list) that provides options such that a user can define the desired search criteria for each field.

It should be appreciated that in an alternative embodiment, there could be an empty text box next to each of the fields 1604 to 1614, such that a user can enter his or her definition for the search criteria. If the control 1616 is left set to the "all" option (or if a text box is left blank), then the search is not performed on the basis of search criteria associated with that field.

Once an employee has defined the search criteria that will form the basis of the search, he or she clicks the "submit" button 1618. This action causes the search criteria that have been defined by the user in the search section 1620 to be submitted to the processing entity 36.

Upon receipt of the search criteria, the entity 36 processes the job assignments within the train schedule database 20 on the basis of these search criteria so as to identify jobs assignments that meet the search criteria defined by the user. It should be noted that the job assignments that are identified by the entity 36 as meeting the employee's criteria may or may not already have been assigned to another employee. These job assignments are then displayed to the user within the search results section 1620 of the Seniority Move webpage 1600.

More specifically, each job assignment that is identified by the processing entity 36 as meeting the employee's search criteria is included as one of a set of records $1622_{1-k}$ within the search results section 1620. Each of the records $1622_{1-k}$ that represents a given job includes a data element indicative of a board type 1624, an assignment name 1626, a craft 1628, a seniority roster 1630, a current owner 1632 and an indication of the user's eligibility 1634.

The data element indicative of the board type 1624 and assignment name 1626 provide an identification of the job assignment. For example, the board type 1624 provides an indication of the board/bulletin to which the job assignment belongs, and the assignment name 1626 provides an indication of the type of job. The craft data element 1628 provides an indication of the type of craft required to perform the job. For example, in the case of the record $1622_1$, the craft data element 1628 specifies that the craft related to the job assignment requires an engineer.

The seniority roster data element 1630 provides identification of the seniority roster to which people who are eligible for that job must belong. This data element may also act as a hyperlink to obtaining information about the seniority roster. For example, by clicking on the seniority roster data element 1630 within a given record, the user may view a list of the people within that seniority roster and their seniority position within that roster.

The current owner data element 1632 provides the name of the employee who has currently been assigned the job (referred to herein as the job's "current owner"), where applicable. Once a user has viewed the name of the assignment's current owner, he or she may then click the associated seniority roster data element 1630 in order to view where the current owner ranks in the seniority roster. This may provide the employee with an indication of whether the current owner of the job has a greater or lesser seniority rank than the user.

Finally, the eligibility data element 1634 provides an indication of whether or not the user is eligible to take the job from the current owner of the job. The eligibility data element 1634 can indicate "yes" or "no", or provide any other sort of text or icon that conveys whether or not the user is eligible. For example, the data element 1634 could use traffic light icons to indicate eligibility, where a red light icon means that the user is ineligible to take the job from its current owner, a yellow light icon indicates that the user might be eligible to take the job from its current owner (e.g., under certain conditions or with permission), and a green light icon indicates that the user is eligible to take the job from its current owner.

In the case where the eligibility data element 1634 indicates that the employee is not eligible for the job (e.g., a "no" appears in the element 1634), the user may be able to click on the data element to obtain an indication of the reasons why he or she is not eligible. In accordance with a non-limiting example, a pop-up window or webpage may appear that indicates the reason or reasons for the non-eligibility when the "no" data element 1634 is clicked, such as there are restrictions on the user, that the user's seniority is not high enough or that the user has missing qualifications.

In an alternative embodiment, the processing entity 36 may omit any job that the user is not eligible for from the search results section 1620. In such a case, the search results section 1620 may not include the eligibility data element 1634.

The data elements shown in the search results section 1620 of FIG. 16 are shown for the sake of example. It should be appreciated that additional data elements, such as turn ID, Days off, Shift, etc. could also be included within the search results section 1620 without departing from the spirit of the invention.

In the non-limiting example shown, the search results section 1620 that lists the potential job assignments that can be taken by the employee includes a scroll-bar 1636 such that the user can look at all of the different records $1622_{1-k}$ that are listed in this section. This allows the user to scroll through the entire list of records $1622_{1-k}$ so that all of the jobs that are presented can be viewed.

Once the search results (namely the job records $1622_{1-k}$) have been listed in the search results section 1620, the employee is able to look through these records in order to decide if there is a job that he/she would prefer to do. When the user has identified a job that he or she would like to take, the employee selects the record 1622 associated with that job from the job records $1622_{1-k}$, which may be done by highlighting the record or placing a checkmark in a check box associated with the record (not shown), and then clicks the "seniority move override" button 1640. By clicking this button, the employee is exercising his or her seniority over another, more junior employee by effectively "stealing" a job from the more junior employee.

In a non-limiting example, once the "seniority move override" button 1640 has been clicked, the employee may be prompted to confirm his or her selection. For example, a pop-up box asking a question such as "Are you sure you want to take this job?" may appear. In this manner, the user may need to provide validation that he/she wants to accept the job so as to prevent any accidental job changes.

Once a user has confirmed that he/she would like to accept the new job, the processing entity 36 causes this new job assignment information to be updated in the train schedule database 20 and the employee profile database 22. More specifically, in the train schedule database 20, the owner of the job is changed from the previous owner to the new owner (i.e., the user who has just exercised his/her seniority move).

Likewise, the employee profile database 22 is update to take into consideration that the previous owner of the job no longer has a job assignment and that the new owner of the job (i.e., the user who has just exercised his/her seniority move) has now been assigned a new job.

Furthermore, this new job assignment will appear in the employee's assignment ownership history 1112. As previously described, when a new record associated with this new job appears in the assignment ownership history 1112, the "assigned type" data element 110 may indicate "exercised seniority", in order to indicate how the job assignment was granted to the employee. The user may then confirm acceptance of this job by clicking the "confirm job" button 1125 on this webpage.

The processing entity 36 also has to manage the loss of the job assignment by its previous owner. As such, upon receipt of the seniority move override, the entity 36 must identify the previous owner of the job assignment, and communicate to that employee that he or she no longer has that assignment.

This communication may be done in a variety of different manners. For example, this communication may be done by updating the previous owner's job assignment history table 1112 and/or by contacting the previous owner via telephone (human or the IVR system 26) or by email or text message, among other possibilities.

Prior to initiating communication with the previous owner, the processing entity 36 may determine a new job to be assigned to that employee. The new job may be determined based on that employee's job preferences, and what jobs are available, among other criteria using a process similar to that described with respect to FIG. 15C. During such communication with the previous owner, the employee may be advised that he or she has lost the previous assignment and that a new job that has been assigned as a result.

Alternatively, during communication with the previous owner, the previous owner may simply be advised that he or she has lost the previous assignment and a new job assignment must be obtained. A new job assignment can be obtained by placing a new bid on one or more jobs or by exercising a seniority move of his or her own, among other possibilities.

In the case where the previous job owner is informed that he or she has to obtain a new job assignment, the employee may be given a time period during which the new job assignment should be obtained. The employee management system 10 will keep a record of this time period in order to issue reminders to the employee that he/she needs to obtain a new job. In addition, it is possible that a record of this time period will be kept in order to apply any penalties to the employee in the case where he/she does not try to obtain a new job assignment.

The purpose of this approach is to provide incentive to employees to actively look for jobs while at the same time providing flexibility such that most jobs that they accept and perform are to their liking. An employee is allowed to decline job offers that may not suit his or her liking but the counterpart is that the employee should quickly find another job. Otherwise, the employee is exposed to penalties that can vary in terms of severity and type.

For example, in the case where the employee is given two weeks to obtain a new job assignment, if he/she does not (at least try to) obtain a new job assignment within that time period he/she may be docketed vacation time, in other words the time of inactivity would count against vacation time that is allocated to the employee. Another example of a penalty is certain contractual guarantees may be withheld from the employee during that time period.

Figure 27:
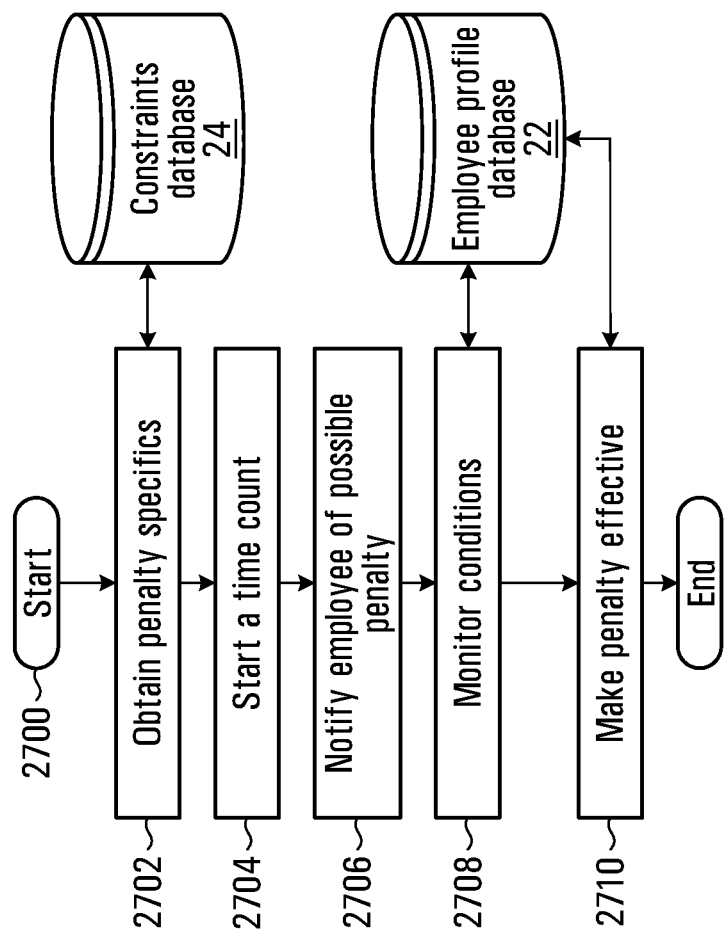
FIG. 27 is a flowchart of a non-limiting process for managing the application of penalties to employees for certain violations.

The management by the system of penalties associated with delays to seek or to confirm a new job assignment is discussed in greater detail in connection with the flowchart of FIG. 27.

The process is implemented by execution of a set of program instructions by the network server 12, in particular the processing entity 36. The set of program instructions that manage this function is a component of the larger block of program instructions 42.

The penalties management process starts at 2700. The occurrence of an event that can lead to a penalty triggers the process. If such an event is identified, the process is initiated. Examples of events that cause the penalties management process to run include:
1. the employee refuses a job offer—when the server 12 has received from the employee indication that the employee is not willing to accept the job offered to him or her;
2. the employee has been offered a job but the employee has not acknowledged receipt of the message;
3. the employee has been offered a job and an acknowledgement of receipt of the job offer has been received but no acceptance of the job has been received;
4. a job offer made to the employee has been withdrawn because the employee failed to acknowledge receipt of the original job offer or failed to accept the job offer;
5. the employee has failed to search for a new job following an assigned job being taken by a more senior employee.

Note that these are only examples and other events can also be used as a basis to invoke the penalties management process.

Step 2700 runs in the background and examines the various electronic interactions occurring between the network server 12 and the employees of the company. If an event occurs which triggers the penalties management process, the system initiates a specific instance of this process that applies to the particular event that may eventually lead to penalties. Accordingly, at any given time several instances of the penalties management process may be concurrently running.

Once the occurrence of an event that can lead to a penalty has been identified, the process step 2702 obtains specifics on the penalty. This function is performed by interaction with a database that contains data defining the specific rules to be enforced by the system. The database maps events that may lead to penalty specifics. By penalty specifics is meant the particulars of the penalty itself such as the type of penalty, duration of the penalty (if applicable) severity category and also conditions that are to occur before the penalty is actually applied. One such condition is time. In the example of an employee that has refused a job assignment a penalty is applied if the employee has not been able to secure an alternative job position within a certain grace period. Thus, the expiration of this grace period is a condition that needs to be fulfilled before the penalty is made effective.

In a specific example of implementation, the database mapping the events to penalty specifics is the constraints database. Penalties that an employee faces for certain actions are usually part of a collective bargaining agreement and those are encoded in the constraints database in a manner which is machine searchable such that events that occur in connection with an employee may be used to determine the penalties that may eventually apply.

In most cases, the penalty specifics include a grace period condition that must pass by before a penalty takes effect. At step 2704 the system thus starts a timer (software implemented) to keep track of time elapsed. The duration of the timer is determined by the penalty specifics. For instance if the employee is required to find another job within 2 days of having refused a previous job assignment, or having lost a previous job assignment, in order to avoid penalties then the timer is set at two days during which the system will keep track of the employee's job situation before applying any penalty.

At step 2706 the system will notify the employee about the possible penalty. The notification can have two different purposes. It can constitute a formal notice to the employee intended to comply with rules under collective bargaining agreements. It can also serve the purpose of a reminder intended to notify the employee of the situation and make clear the exposure of the employee to a penalty. The notice can include information such as:
1. the event that triggered the process, such as the refusal to accept a job assignment;
2. the applicable penalty or penalties that may apply to the situation;
3. the requirements that must be complied with to avoid the application of a penalty. In the example above the acceptance of a job within a certain time limit would constitute a penalty negating event.

The notification can be sent to the employee via several notification vehicles that the system can use to regularly communicate with the employee. For instance, the notification can be sent via a web posting to the personal web page of the employee, by e-mail or telephone notification using an IVR system, among others.

After the notification has been sent out to the employee, the system interacts with the employee profile database 22, in particular the record of the employee to track the employee situation and determine if the conditions that lead to a penalty imposition have been satisfied. This is shown at step 2708. In a specific example, if the employee availability status shows that the employee is now assigned to a new job and that assignment has occurred within the pre-penalty grace period then the process terminates and no penalty is applied. On the other hand, if at the expiration of this grace period the employee has still not been assigned a new job, as evidenced by his/her availability status showing that the employee is still available, then a penalty is applied.

Once the decision to apply a penalty is made by the system, the employee is notified by using the method indicated earlier, to inform the employee that a penalty is being applied to him. The notice provides specific information about the following:
1. the event that triggered the penalty;
2. the grace period that was offered but that was not met;
3. any notices or reminders about the possibility of a penalty that were sent to the employee;
4. the specifics of the penalty. The penalty can be a loss of privilege such as vacation time period to a more serious consequences such loss of compensation for a certain time period, loss or reduction in seniority or in general the application of any condition to the employee according the rules in the constraints database 24.
5. information about the process the employee is to follow if the employee desires to appeal the application of a penalty.

Finally, as illustrated at step 2710, the system makes the penalty effective by registering in the employment record of the employee in the employee profile database 22 data that reflects the penalty. For example:
1. Assuming the penalty is a loss of priority the employee had for taking vacation during certain period, such as during the Christmas holidays, the record of the employee will be modified such that the employee will be barred from taking vacation during that time.
2. Assuming the penalty is a reduction of vacation time, the available vacation time that is stated in the employee record will be reduced by the predetermined number of days, according to the specific penalty.
3. Assuming the penalty is a requirement for a monetary compensation, the employee record is modified to reduce the salary of the employee by a predetermined amount for the upcoming pay period. In this fashion, the salary of the employee is reduced automatically without the need of human operator intervention. The salary payment made to the employee is thus automatically adjusted by taking into account the data in the employee record.

4. Assuming the penalty is a reduction in seniority then the record of the employee is changed such that the reduction in seniority is reflected in the seniority status of the employee.

Finally, the various events that lead to the penalty imposition are noted in the employee record to complete the employment history of the employee.

Absence Request Management

Figure 14:
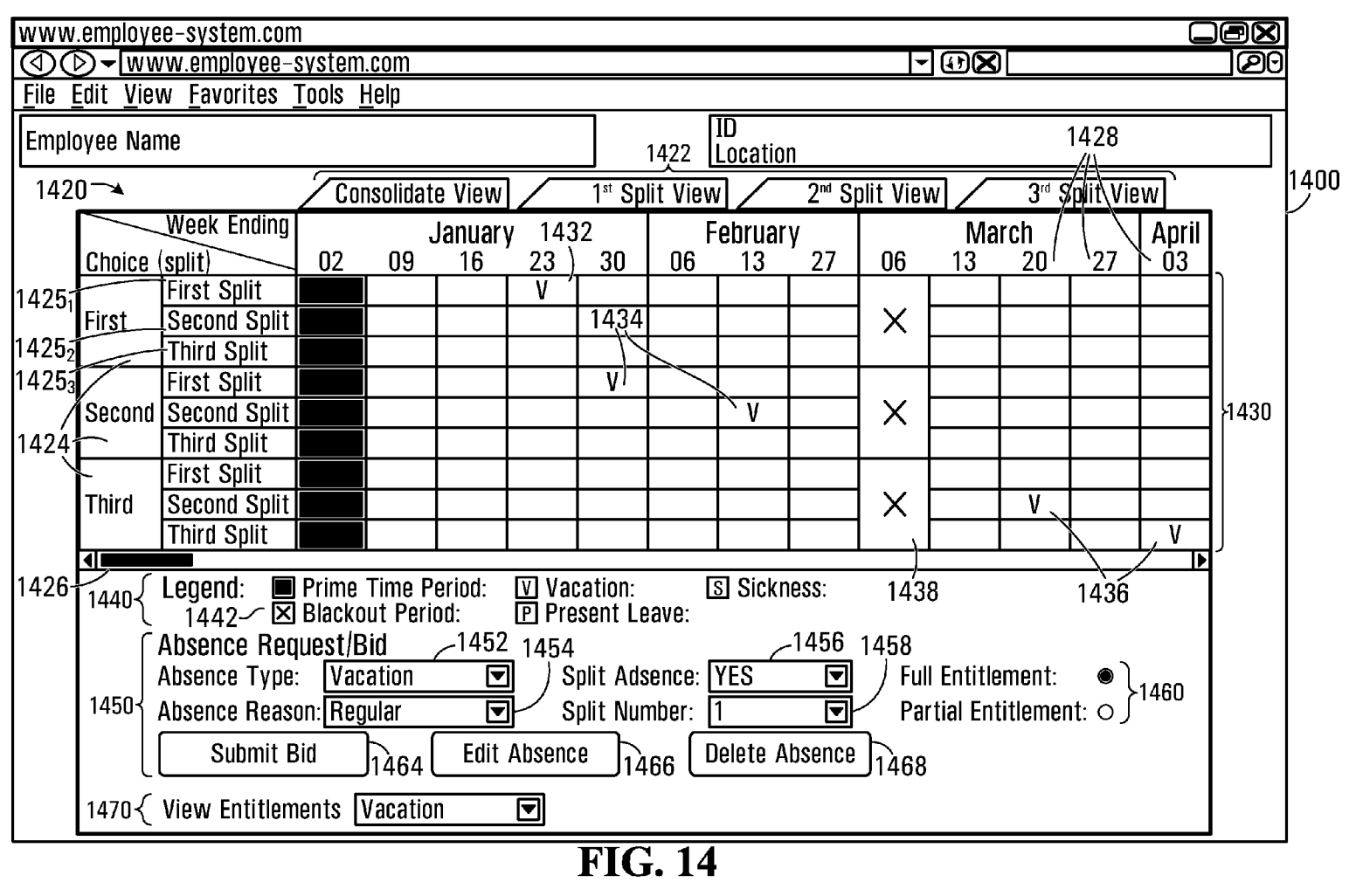

When an employee clicks the employee calendar button 1122 on the personalized web page 1100, he or she is sent to an Employee Calendar web page 1400 as shown in FIG. 14. The Employee Calendar web page 1400 includes all the same header information as on the personalized web page 1100, such as the employee's name 1102, the pin 1104, home location 1106, current location 1108 and craft 1110.

In the non-limiting example of implementation shown, the Employee Calendar webpage 1400 displays an interface that allows an employee to generate, view or otherwise manage his/her absences, as well as to see the employee's various absence entitlements. In particular, the webpage 1400 provides employees with a method of generating and managing one or more 'absence periods', each of which represents a time period where the employee is either absent from work or cannot perform his/her regular duties. Typically, absence periods may be classified into categories such as vacations, personal leave days or sick days, although other types of absences are possible. Absence periods may also represent time periods when an employee is at work but is unable to perform his or her regular job functions, such as when an employee is receiving training or is away on a business trip.

In the non-limiting example of implementation shown, the Employee Calendar webpage 1400 includes a calendar portion 1420, a legend area 1440, a set of absence bidding/editing controls 1450, as well as an entitlement access control 1470. As will be described in more detail below, the use of these controls allows an employee to view his/her absences, as well as to configure and submit a request for one or more absence periods. The employee can also use these controls to rank their preference for each absence period relative to other absence periods so that the employee's relative preference for each absence period can be considered by the processing entity 36 in a decision to approve an absence Request.

When an employee submits one or more absence requests to the processing entity 36 for consideration, the entity 36 may be able to automatically approve or reject the absence period(s), or alternatively, forward the request to a human manager for further consideration. The outcome of this process can be communicated immediately to the employee via the Employee Calendar web page 1400, or by using alternate methods, such as via a phone call or email, among other possibilities. In addition, when an absence period has been approved, the employee management system 10 is also able to update the employee's profile, which was an action described earlier in relation to the employee profile database 22.

The manner in which an employee uses the employee calendar web page 1400 in order to submit a request for an absence will now be described in more detail.

Firstly, the employee creates a 'proposed absence period' (i.e., an absence period that has not yet been considered by the system 10) using the components of the calendar portion 1420. More specifically, the employee selects a given time period from certain ones of cells 1430 within the calendar portion 1420. Each of the cells 1430 represents a given time period, which in the non-limiting embodiment shown represents one (1) week. It should be appreciated that the cells 1430 could represent a time period of any duration (such as a week, a month, etc.) without departing from the spirit of the invention.

As shown, the cells 1430 are arranged into columns 1428 and row portions 1424. The columns 1428 are used by the employee to establish the expected duration of a proposed absence period (for example, a single cell spanning one (1) column would be one (1) week and two (2) cells spanning two (2) columns would be two (2) weeks), while the row portions 1424 are used to allow an employee to identify a relative preference for different proposed absence periods (e.g., a first row portion can be associated with a first preference and the second row portion can be associated with a second preference, etc). It will be appreciated that alternative embodiments where the row portions 1424 represent discrete time periods and the columns 1428 represent discrete preference levels would also fall within the scope of the present invention.

The cells 1430 constitute individual controls allowing the employee to indicate his or her intent to be absent during the time period that is represented by a cell. Multiple designated cells indicate an absence that spans the time period that is represented collectively by the selected cells. The cells are individually selectable and can be selected by the employee using a pointing device such as a cursor, a stylus or a finger (in the case of a touch-sensitive screen), among other possibilities. In this way, the user can identify and select a given one or more of the cells 1430 by placing a cursor (or other pointing icon) over a cell and clicking on that cell, or by clicking and dragging the cursor in the case where multiple cells are to be selected.

By selecting certain ones of the cells 1430 in the calendar portion 1420, an employee is able to use a familiar calendar format in order to locate his or her desired absence period. In the non-limiting embodiment shown, the employee has selected cell 1432, which represents the week of January 23rd as his/her first choice for an absence period. The employee has also selected cells 1434, which represent the last week of January and the second week of February as his or her second choice for an absence period. The employee has further selected cells 1436, which represent the second to last week of March and the first week of April, as his or her third choice for an absence period. By placing the first choice in the first row portion 1424, the second choice in the second row portion 1424 and the third choice in the third row portion 1424, the employee's preference for each proposed absence period may be shown relative to one another. As a result, the employee's relative preference for the three (3) proposed absence periods can be taken into account when determining which of these absence periods (if any) will receive approval.

It will be appreciated that the number of row portions and/or columns contained within the calendar portion 1420 can be varied without departing from the spirit of the invention. For example, the total number of row portions 1424 may be increased or decreased to provide employees with more or less ways to rank proposed absence periods relative to each other. In addition, more or less columns in the columns 1428 can be presented, which may impact the time period that is displayed to the user via the calendar portion 1420.

Note that the calendar portion 1420 could be provided with navigation controls allowing to navigate through the calendar to access data ranges that are in the future and do not appear in the current display. The user interface may also be provided with controls to change the display of the calendar to a format that is more suitable to the user, in particular increase the date range that is currently viewable or decrease the date range. For instance, such controls will provide the user with the ability to adjust the display of the row portions 1424 and the columns 1428 within the calendar portion 1420. For example, a scroll bar 1426 can be provided to allow an employee to adjust the particular columns displayed in the calendar formed by the cells 1430.

Alternatively, a 'zoom' control (not shown) could be provided to adjust the length of the discrete time period represented by each column in the columns 1428. For example, each one of the cells 1430 represents a seven (7)-day week in the embodiment shown in FIG. 14. It is possible that an employee could use a zoom control (which may be represented by a magnifying glass icon) to 'zoom in', thus defining each cell in increasingly shorter time periods, such as daily or even hourly, for example, and so on. The employee could also use a similar control to 'zoom out', thus defining each column in increasingly longer time periods, such as days, weeks, months, and so on.

Yet another possibility to adjust the display of the cells 1430 may be controls that allow the employee to expand or collapse certain sequential columns from the columns 1428 or sequential row portions from the row portions 1424. For example, an employee could collapse columns representing certain months when he or she has no plans to be absent during this period. Alternatively, an employee could expand a column that represents a week, into seven (7) columns that represent the respective days of that week, such that he or she could select a time period of only two or three days from that week for a proposed absence period.

The calendar portion 1420 may also include the split view control 1422. The split view control 1422 is used by the employee to view absence periods in the cells 1430 that correspond to a particular split. A split indicates how many times the employee is allowed to "split-up" his/her vacation time. For example, if an employee is provided with two (2) weeks vacation and has the option of one (1) split, the employee has the option of splitting his or her vacation time into two separate periods of one (1) week each, with a split between the two.

Each of the row portions 1424 includes three rows 1425 that represent the first split, the second split and the third split within each of the preferences shown, such as rows 1425₁, 1425₂ and 1425₃. For example, shown in the second row portion 1424 (which relates to the second preference) and the third row portion (which relates to the third preference), the employee has chosen to break his/her vacation time via one split, such that there is a break of one week between the two weeks of vacation chosen. Given that there is not a second split, the third row 1425 of the second and third row portions 1424 are left blank.

The split view control 1422 includes a set of controls (such as clickable tabs, among others), each of which can be used to display a split and its associated absence periods in the cells 1430. For example, clicking the First Split tab in the control 1422 would display absence periods in the cells 1430 that are associated with the first split (namely the first row 1425 in each of the row portions 1424), clicking the Second Split tab would display the absence periods in the cells 1430 that are associated with the second split, and so on. Although the illustrated split view control 1422 contains tabs for three (3) splits (i.e., First Split, Second Split and Third Split), it will be appreciated that the present invention may provide access to a greater or lesser number of splits.

The split view control 1422 also provides access to a 'consolidated view' that shows absence periods for all splits in the cells 1430. In this view, all of rows 1425 in the row portions 1424 for each of the relative preferences are shown.

It should be appreciated that the cells 1430 may show both absence periods initiated by the employee (e.g., vacations, personal leave days, sick days), as well as absence periods that are initiated by the employer and which are consequently assigned to the employee (such as a training course). Other possibilities for employer-assigned absence periods may include internal training and development activities (e.g., training on a new computer system or application) union-related activities (e.g., a vote on the latest collective agreement) and/or business travel (e.g., meetings or conferences), among others.

It is possible for the cells 1430 to include a visual identification of the type of absence. For example, the background color of given ones of the cells 1430 that represent an absence period for a vacation could be in a first distinct color (e.g., brown), those of a personal leave day could be in a second distinct color (e.g., yellow), while those of a sick day could be in a third distinct color (e.g., orange).

The cells 1430 could also use text to indicate the type of absence recorded or allowed for an individual cell in the cells 1430. For example, in the non-limiting embodiment shown in FIG. 14, the letter 'V' is used to denote vacation periods, 'P' is used to indicate personal leave days, and 'S' is used to identify sick days. In addition, the particular case of the letter may indicate whether the absence period is still proposed or has been approved or rejected. For example, a lower-case letter (i.e., 'v') could indicate absence periods that are either proposed or are being considered while an upper-case letter (e.g., 'V') could denote absence periods that are either approved or rejected.

This coding process may help the employee to quickly visualize any upcoming absences and/or activities, as well as help the employee to avoid any potential conflicts when planning a proposed absence period before submitting it for consideration. The use of colors and/or text conventions may also indicate those absence periods that are employee-initiated and those absence periods that are employer-assigned. (Such conventions are typically illustrated in the legend area 1440, which is described below.) In this way, an employee can visually identify potential conflicts between planned absences and pre-existing absences already in the system 10.

Certain time periods may also be designated by the employer as so-called 'blackout' periods 1438 during which no voluntary absences (such as vacations) may be taken. In these cases, these time periods may be identified in the cells 1430 by marking the cells representing these blackout periods 1438 with distinct background colors (such as black) and/or textual cues, such as capital Xs. By identifying given ones of the cells 1430 this way, an employee can quickly identify when the blackout periods 1438 are and schedule his or her voluntary absences accordingly.

If an employee attempts to create a proposed absence period at the same time as an existing absence period or a blackout period, a prompt may appear to indicate the presence of a conflict. If the existing absence period was originally employee-initiated (e.g., for a personal leave day), the prompt may indicate that he or she has the option of editing the existing absence period. On the other hand, if the existing absence period was employer-assigned, the prompt may indicate that the existing absence period cannot be changed by the employee and refer him/her to a supervisor or manager for further discussion.

The cells 1430 on the Employee Calendar web page 1400 may also be used to communicate certain statistical data to the employee relating to the absence periods that have been proposed and/or approved for other employees at the employee's home location.

For example, in a non-limiting embodiment, the cells in a given column 1428 may display a background color that indicates in broad terms information about absence periods during a given time period for the employee's home location. For example, if the cells in a given column are green, it may indicate that not many absences have been granted for that time period, such that there is a high likelihood that a proposed absence period for that time period will be approved. However, if the cells in a given column are yellow or red, it may indicate that quite a few absences have already been granted for that time period, such that there is less likelihood that a proposed absence period during that time will be approved. In such a case, an employee may interpret the colors of the cells as a proxy for the likelihood of his or her proposed absence period being approved.

More specifically, an employee who is looking for a time period for his or her proposed absence period may look for those cells with green (or possibly yellow) backgrounds because these time periods have a greater likelihood of being approved than those with red backgrounds. In this way, the background color of the cells 1430 can both provide an employee with statistical information regarding time periods when absence periods have been proposed and/or approved, as well as guide them to selecting proposed absence periods that are more likely to be approved.

The statistical data related to the absence periods and/or approved absence periods may be accessed by the employee in various ways. As described above, the information may be provided via color coding. The information may also be provided via text or symbols appearing directly within the cells. In another embodiment, the employee may use a control (e.g., a clickable checkbox) to display statistical information associated with the proposed and/or approved absence periods in the cells 1430. In this case, the information appearing within the cells 1430 may indicate a color, text, number of approved absence periods or a percentage likelihood that an employee's newly proposed absence period will be accepted. Alternatively, this information may also appear in a 'pop-up' window or frame when the employee positions (or 'hovers') the cursor of their mouse or other pointing device over a particular cell in the cells 1430.

Once a proposed absence period has been selected by the employee from within the calendar portion 1420, he or she can use the set of absence bidding/editing controls 1450 to provide additional details for the absence period, such as the purpose of the absence. These controls can also be used to submit the one or more proposed absence periods that have been entered into the cells 1430 of the calendar portion 1420 for consideration, as well as to manage and delete existing absence periods from the Employee Calendar web page 1400.

The set of absence bidding/editing controls 1450 includes an absence type control 1452, an absence reason control 1454, a set of split controls 1456 and 1458, a set of entitlement options 1460, a Submit Bid button 1464, an Edit Absence button 1466 and a Delete Absence button 1468. Each of these buttons will be described in more detail below.

It is worth noting that the absence bidding/editing controls 1450 may only become available after an employee has selected a given one or more of the cells 1430. Alternatively, these controls may be permanently displayed on the employee calendar web page 1400.

The absence type 1452 control allows the employee to define the type of absence requested, such as vacation, personal leave day (PLD), sickness or training, among other possibilities. As shown, the control 1452 is in the form of a drop-down list that lists the different types of absences commonly available. In this instance, the drop-down list presents the user with a predetermined number of options to select from.

The absence reason control 1454 allows the employee to indicate the reason for the absence, such as vacation, compensation time, medical appointment, training or business travel, among others. In the embodiment shown, the control 1454 is also in the form of a drop-down list that lists different, common and pre-set absence reasons. So, the user simply selects the desired option among the listed options.

The controls 1452 and 1454 may also provide an option (e.g., "Other") to allow the employee to enter an absence type and/or reason that is not included in these controls by default. For example, an employee could use such a category to request bereavement time provided for a death in their family. Alternatively, it is possible that the controls 1452 and 1454 could be comprised of blank fields that allow the employee to enter the type and reason for the absence. In such instance, the user would enter some text to explain the reason for the absence.

In the non-limiting embodiment shown, where the controls 1452 and 1454 are drop-down lists, these lists may be populated based on the status of the absence period represented by the selected cell. For example, if the selected one of the cells 1430 does not currently represent an absence period, the set of absence bidding/editing controls 1450 may display all their default values. Alternatively, if the selected one of the cells 1430 represents an existing absence period, the set of absence bidding/editing controls 1450 may display the values already set for this absence period.

The set of split controls 1456 and 1458 are used to enable the employee to split his/her vacation time. Keeping with the example described above, assuming that the employee has two (2) weeks vacation, with one (1) split, the employee can either choose to take two weeks consecutively, or split the two weeks into two time periods (such as one week and one week). In the case where the employee does not wish to split his/her vacation time, the split absence control 1456 may be set to "no", in which case the information in the split number control 1458 may not be relevant. However, in the case where the employee does wish to split his/her vacation time, the split absence control 1456 may be set to "yes", and the information in the split number control 1458 may be set to "1", indicating that the time will be split once.

The Entitlement options 1460 allows the employee to determine whether the proposed absence period (if approved) should be deducted from available absence entitlements at either the full entitlement rate or at the partial entitlement rate, where applicable. In certain cases, an employer may allow certain types of absences to be deducted at a partial entitlement rate, instead of a full entitlement rate. When an employee uses the "partial entitlement", his/her absence entitlement is reduced by less than would be the case if the employee deducts the absence at a full entitlement rate.

In the example shown, the entitlement options 1460 are represented by toggle controls that can be selected by an employee in order to identify whether the absence is deducted at the full entitlement rate or at the partial entitlement rate.

Once the employee has used the controls described above to add details for his or her proposed absence period, and more specifically to identify the type of absence that he or she will be taking, he or she is able to submit the selected absence to the employee management system 10 for consideration by clicking the Submit Bid button 1464. When the employee clicks this button, the selected cell(s) within the calendar portion 1420 are updated with details for the proposed absence period, and the proposed absence period is submitted for consideration to the processing entity 36.

The Submit Bid button 1464 is typically used by an employee once he or she is satisfied with the one or more proposed absence period(s) in the cells 1430 and wishes to submit those one or more absence periods to the processing entity 36 for consideration. This button may be used with the selection of a single proposed absence period (such as only a first preference) or the selection of multiple proposed absence periods in the cells 1430 (such as a first, second and third choice of absence period). In the latter case, all proposed absence periods that were selected are submitted concurrently to the processing entity 36 for consideration.

The absence bidding/editing controls 1450 also includes the Edit Absence button 1466 and a Delete Absence button 1468. The Edit Absence button 1466 is used by the employee to modify an existing absence period, while the Delete Absence button 1468 is used by the employee to delete and remove a proposed absence period. Both of these controls will be discussed in more detail later within the context of managing existing absence periods (i.e., proposed absence periods that have been considered and approved).

The Employee Calendar Web page 1400 also includes an entitlement access control 1470 that can be used by the employee to view information related to his/her absence entitlements, such as vacations, personal leave days and sick days. This control will also be discussed in more detail below.

The manner in which the processing entity 36 considers the one or more submitted absence periods will now be described in more detail.

When the employee clicks the Submit Bid button 1464, the selected proposed absence periods (including the dates of the absence, the type and reason for the absence and the employee's preference for the absence period, among others) is submitted to the processing entity 36 for consideration. More particularly, the Submit Bid button 1464, which is a control, upon actuation causes execution of program instructions on the device at which the user interface is displayed to convey the information entered previously by the user in the various information gathering fields to the processing entity 36. Upon receipt of the one or more proposed absence periods, the entity 36 determines whether each absence period can and should be automatically approved, automatically rejected, or be forwarded to a human manager for further consideration. The logic that the processing entity 36 follows to make a decision on the basis of the information submitted by the user is determined by the particular program instructions which are being executed during the operation of the processing entity 36. Those program instructions reflect rules that determine the different possible outcomes of the processing.

Figure 14A:
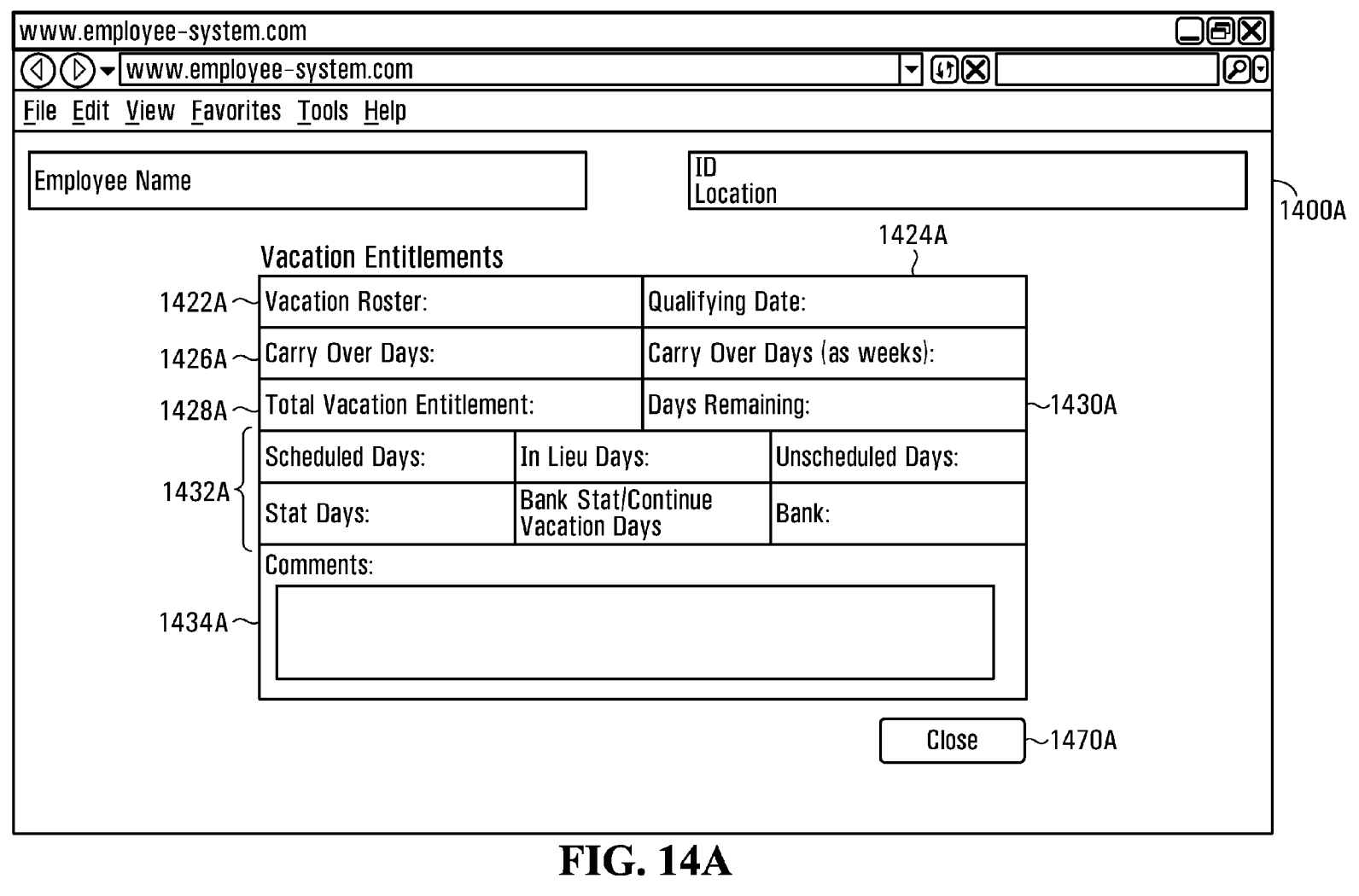
Figure 14B:
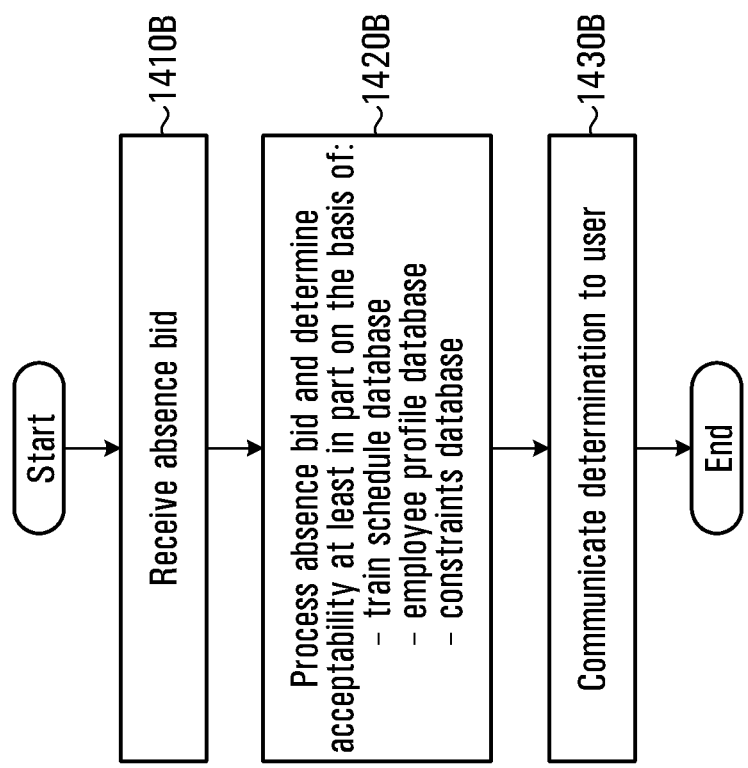
FIG. 14B shows a flow-diagram of a method according to a non-limiting example of implementation for processing employee absence bids.

FIG. 14B is a flowchart explaining the logic the processing entity 36 follows to make determinations Step 1410B

Firstly, at step 1410B, the processing entity 36 receives an 'absence bid' for the one or more proposed absence periods submitted for consideration by the employee. As indicated previously, the absence bid submission occurs when the employee actuates the Submit Bid button 1464 that causes the data to be sent to the processing entity 36. The data conveys to the processing entity 36 the necessary information that would be processed by the processing entity 36 to make a determination. The information may be structured and encoded in the data stream in any suitable manner without departing from the spirit of the invention.

In a specific example of implementation, an absence bid contains information for each proposed absence period submitted for consideration, such as:

the dates and duration of the absence;
the relative preference for the absence period (e.g., whether the proposed period was the employee's first, second or third choice);
the type of absence (e.g., vacation, personal leave day, sick day);
the reason for absence (e.g., medical appointment, business trip, training);
the split associated with the proposed absence period(s), in particular if a split is desired and in the affirmative the number of splits; and/or
the entitlement rate associated with the proposed absence period(s).

Handling multiple proposed absence periods as a single bid can be advantageous since the processing entity 36 may be able to execute the determination process for the bid as a whole in a more efficient manner than if each proposed absence period was submitted individually. As a result, employees can learn more quickly whether their proposed absence periods have been granted, which may enhance employee satisfaction.

Step 1420B

At step 1420B, the processing entity 36 processes the absence bid received at the previous step and determines the acceptability of the bid in order to decide whether the proposed absence periods in the bid should be approved, rejected or forwarded to a human manager for further consideration.

The determination of the acceptability of the absence bid is based at least in part on information contained within the train schedule database 20, the employee profile database 22 and the constraints database 24. More specifically, the processing entity 36 may consider information from these databases to make a determination on the acceptability of the absence request. For example, the entity 36 may take into account information as to staffing requirements during the proposed absence period, in particular jobs currently assigned to the employee and jobs or positions to which the employee may not have been assigned yet but to which the employee is expected to be assigned:

a list of all scheduled trains arriving, departing or passing through the employee's home location during his/her proposed absence period(s);
the crew requirements for each scheduled train arriving, departing or passing through the employee's home location during his/her proposed absence period(s);
the expected crew assignments for each scheduled train arriving, departing or passing through the employee's home location during his/her proposed absence period, including any current vacancies; and
any known or expected seasonal variations in scheduled train frequency or size that could cause variations in staffing levels, such as increased train frequency during holiday seasons.

The processing entity 36 processes the above information to determine if the absence of the employee during the proposed period will create a lower than acceptable staffing situation that may negatively impact the railway operations. The processing entity starts by assessing the staffing requirements to determine the personnel required during the proposed period of absence. The staffing requirements are represented by a data structure which lists the staff required by type of job or position for the period of time that is being considered. Subsequently, the processing entity reviews the so established staffing requirements to estimate the effect of the employee's absence during the proposed period. The estimation is represented in the memory 38 of the network server 12 by estimation data. The estimation data conveys the severity of the impact of the employee's proposed absence. In a simple example, the estimation data may be a binary indication, such as a yes or no, conveying, if "no" that no significant impact is expected and if "yes" that a significant impact is expected. Alternatively the estimation data can have more than two levels or degrees of impact.

For instance, consider the situation where the employee is a train conductor that makes a request for a two week absence. During that period 10 train departures are planned within the geographical vicinity of the employee. The staffing requirements assessments establish that at minimum 10 conductor job assignments will be needed. If, in the geographical region of interest, there are enough conductors, not including the employee, that can fulfill those job assignments then the 10 train departures can be made without the employee. However, if not enough train conductors are available, then the 10 train departures may not be possible. In this case, the estimation data computed by the processing entity 36 indicates that the railway operations will be significantly impacted by the absence of the employee.

In a similar manner, the processing entity 36 computes absence allowance data which indicates if the employee is entitled to take the absence. The absence allowance data is computed by processing information stored in the employee profile database 22. For example, the processing entity 36 may considers factors such as:
- the number of absences (e.g., vacation or personal leave days) to which the employee is entitled;
- the number of similar absences that the employee has already taken;
- seniority-related information for the employee (e.g., seniority level or pay grade);
- the employee's training or development entitlements;
- any geographic or territorial qualifications currently held by the employee;
- the requirements needed to maintain certification for the employee's geographic or territorial qualifications during the proposed period of absence; and/or
- an assessment of the likelihood of the employee maintaining certification for his or her geographic or territorial qualifications.

The processing entity 36 may also consider information within the employee profile database 22 associated with other employees who have submitted absence bids for the same proposed absence period(s). In this way, the entity 36 can compare the relative merits of each employee's bid for the proposed absence period(s) based on one or more criteria, such as the relative seniority of all employees.

The processing entity 36 also computes absence constraints data on the basis of information stored in the Constraints database 24 that may be needed to make a determination. The absence constraints data reflects certain constraints that reflect employee rights or policies which must be met irrespective of the impact of the absence on operations. For example, the entity 36 may implement logic that reflects the following rules:
- government-mandated absence rules and regulations that apply to all employees in an industry (e.g., a day off must be awarded after working 12 or more consecutive hours within a 72-hour period);
- union-mandated absence rules negotiated in a collective bargaining agreement that apply to all employees represented by a union (e.g., certain 'prime-time' vacation periods being reserved for those employees with a particular minimum seniority level);
- employer-mandated absence policies that are applied to all employees in the organization (e.g., no vacations may begin in the week before Dec. 25th); and/or
- local absence policies that are mandated by a manager and applied to all employees within a particular region or area (e.g., no more than three employees from a particular region may be on vacation at the same time).

This information may be necessary to help the processing entity 36 properly apply the various regulations, rules and policies regarding absences when determining whether to approve, reject or forward a proposed absence period in an absence bid.

As described above, the absence bid is processed at least in part on the basis of information from the train schedule database 20, the Employee Profile database 22 and the constraints database 24. In particular, the processing entity computes the estimation data, the absence allowance data and the constraints data on the basis of which a determination is made. It will be appreciated that other sources of information (such as external databases available through the external data inputs 50) could also be used.

In accordance with a non-limiting example, the processing entity 36 is able to determine the acceptability of the processed absence bid in order to determine if and/or which of the submitted absence period(s) in the absence bid should be automatically approved, automatically rejected or forwarded for further consideration to a human manager.

More specifically, the processing entity 36 evaluates the acceptability of the employee's proposed absence periods contained in the absence bid within the context of the information from the databases 20, 22 and 24. There are three possible outcomes to this evaluation:
- the processing entity 36 determines that one or more of the proposed absence periods are acceptable and automatically approves the acceptable absence period;
- the processing entity 36 determines that the proposed absence periods are unacceptable and automatically rejects the unacceptable absence periods; or
- the entity 36 determines that it cannot determine the acceptability of one or more proposed absence periods, or an acceptability level has not been reached, and so forwards the absence bid to a human manager for further consideration.

The evaluation that determines the acceptability of the absence bid (and thus the determination of one of the above three outcomes) depends on how "acceptability" is defined and/or implemented by the processing entity 36.

In a non-limiting embodiment, the processing entity 36 may determine that the proposed absence period is acceptable (and would therefore be automatically approved) so long as no conditions arise that would cause a conflict with one or more constraints identified in the databases 20, 22 and 24. Conditions where a conflict could occur may include, among other possibilities:
- the employee does not have sufficient absence entitlements for the time period being requested;
- the employee has requested an absence during a period that is otherwise constrained or blocked;
- the employee's relative seniority level is insufficient when compared to other employees who are bidding for the same absence period; and/or
- a limit to the number of employees who have already been awarded the same absence period has been reached.

An example of a case where a proposed absence period may be automatically approved would be where an employee is entitled to 20 vacation days per year, yet he or she has only taken two (2) days so far and is requesting a vacation of 10 days during a period of time that is not bound by any constraints.

As such, in accordance with this embodiment, so long as there is no conflict with any of the conditions and/or constraints that have been identified by the processing entity 36, the absence period may be automatically approved.

In contrast, an example of a case where the proposed absence may be automatically rejected would be if the employee is entitled to 20 vacation days per year, yet he/she has already taken 15 days, and is requesting a further vacation of 10 days. In such a case, the processing entity 36 would determine that the requested vacation period exceeds the employee's entitled vacation time, which is a condition where an automatic rejection would occur. As such, given that there is a conflict with a condition and/or constraint that has been identified by the entity 36, the absence period may be automatically rejected.

The processing entity 36 could also consider a proposed absence period in terms of a general level of acceptability, rather than whether or not the absence period has a conflict with a given condition and/or constraint. For example, the processing entity 36 generates a "score" for a proposed absence request that shows its general level of acceptability. The calculation of this score could be based on a variety of predetermined factors, such as the number of employees that would be absent at the same time conditions associated with the time period requested for the proposed absence period (estimation data), the seniority of employees bidding for the absence period and/or the employee's remaining absence entitlements (e.g., number of vacation days remaining), among others.

Once calculated, this acceptability score may then be compared against a pre-determined value (or value range) that determines the outcome of the proposed absence period. For example, an acceptability score above 85% may result in the absence period being automatically accepted, an acceptability score below 60% may result in the absence period being automatically rejected, and a score between 85% and 60% could result in the requested absence period being forwarded to a human manager for further consideration.

As an example, assume that four (4) engineers in a particular region or area have requested, and been approved to take their vacation at the same time. If a subsequent fifth engineer from the same group then requests vacation time during the same period, it is possible that this condition will cause the "score" generated for the newly proposed absence period to be reasonably low (say 70%), such that it falls below the threshold level needed to be automatically accepted. In this particular case, the estimation data would show that the train activity schedule may be disrupted if the fifth engineer is allowed the requested vacation time.

As a result, the fifth engineer's proposed absence request would be forwarded to the attention of a human manager for approval. This action (which may be accompanied by the acceptability score calculated by the processing entity 36) could indicate to the system 10, or to the manager, that approving the proposed absence request may negatively impact the organization as a whole. More specifically, it is possible that if too many engineers from the home location are granted vacation time during the same period, engineers may need to be brought in from outside of the location in order to avoid scheduled trains arriving at, passing through and/or leaving from this area being delayed or cancelled from a lack of engineers.

Although such a situation shows a fairly simple example of how an acceptability score could be derived and used, it illustrates how the processing entity 36 can use this step to indicate to a human manager that the absence of certain employees at the requested time (whether planned or coincidental) may negatively impact the general ability of the organization to run the railway network. As such, the later requests for vacation time during the given absence period may be identified as having a lower level of acceptability, such that they are forwarded for further consideration to a human manager. In this manner, the manager can make the ultimate determination as to whether a proposed absence period should be requested.

The method by which an acceptability score can be generated by the processing entity 36 for a proposed absence request may be done in a variety of different manners, which will be apparent to those skilled in the art. In addition, when generating an acceptability score, the entity 36 may prioritize certain conditions over others, which will take into consideration the relative importance of some conditions over others when calculating the score for a proposed absence period.

For example, the priority order used by the processing entity 36 to calculate the acceptability score for a vacation-related absence period may be stated as a set of rules, such as:
1. Ensure that crews for all scheduled trains remain fully staffed;
2. Ensure that seniority rules in the collective bargaining agreement are enforced when approving vacation absence requests; and
3. Ensure that highest employee preference is approved, wherever possible.

When the processing entity 36 is considering an absence bid comprising three (3) proposed absence periods, which may represent the employee's first, second and third choices for this vacation, the entity 36 may calculate the acceptability score for each of the proposed absence periods. If one of the three absence periods has an acceptability score that would place it in condition for automatic acceptance, and the other two absence periods have acceptability scores that require consideration from a manager or are in condition for automatic rejection, the processing entity may approve the period that is acceptable, and discard (or not grant) those that are not.

However, in the case where it is the employee's first choice of absence that has an acceptability score that would require it to be forwarded to a manager for approval, and his or her third choice of absence is the absence period would be automatically accepted, the processing entity 36 may provide the option to the employee of accepting the third choice of absence right away, or waiting until a manager has made a decision on the employee's first choice of absence. In this way, the entity 36 does not discard the employee's first choice of absence just because one of the other preferences has been automatically accepted.

Step 1430B

Once the processing entity 36 has determined the acceptability or acceptability level of the one or more absence bids, the results of the determination are communicated to the employee at step 1430B. During this step, the entity 36 may use one or more different ways to communicate the results of the absence bid to the employee, which may include updating the Employee Calendar web page 1400, updating the Employee profile, sending an email or text message to the employee via the external data inputs 50, and/or calling the employee via a human operator or via the IVR system 26. In certain circumstances, the acceptability of the absence bid may be communicated using multiple communication methods. For example, the results may be communicated to the employee by updating the Employee Calendar web page 1400 (and/or Employee profile) and by sending a text message to the employee's cellular phone.

There are three (3) different outcomes that can be communicated to the employee during this step, namely:
- that his or her proposed absence period(s) has been accepted;
- that his or her proposed absence period(s) has been declined; or
- that his or her proposed absence period(s) is being considered further and that the acceptance or rejection of the period will be communicated to the employee shortly.

These pieces of information can be communicated to the employee in a variety of different manners. As mentioned previously, the Employee Calendar web page 1400 may be updated during step 1430B to communicate the results to the employee of the determination that occurred at the previous step. Specifically, the calendar portion of the web page 1400 may be updated to indicate the current status of the absence periods shown in this area. In particular, the processing entity 36 may update the characteristics of certain given ones of the cells 1430 to indicate that the proposed absence period(s) represented by these cells were automatically accepted, were automatically rejected or have been forwarded for consideration by a human manager.

For example, the processing entity 36 could change the background color of those cells representing a proposed absence period from a first, default color (e.g., light grey) to a second color (e.g., purple) to indicate that the absence period has been automatically approved, or to a third color (e.g. orange) to indicate that the absence period has been automatically rejected. Similarly, a change from the first default color to a fourth color (e.g., blue) may indicate that the proposed absence period(s) has been forwarded to a manager for consideration.

Furthermore, if the cell in the grid 1430 contains text (such as in the cells 1432, 1434 and 1436), certain text characteristics, such as its font, size and color, may also be changed to communicate the results of step 1430 to the employee. Alternatively, text within the cells may indicate "Accepted", "Rejected" or "Under Consideration", such that it is the text itself that conveys the results of the acceptability determination rather than (or in addition to) the characteristics of the text.

Although such changes in the color of and/or text within a cell may communicate changes in the status of the absence period to the employee, it is possible that the employee may not immediately understand these changes. To clarify what these changes represent, the legend area 1440 on the Employee Calendar web page 1400 provides a brief explanation as to the meaning of cell characteristics (such as background color and/or text). For example, a sample cell 1442 in this area indicates that similar cells within the cells 1430 represent so-called 'prime-time' holiday periods.

Content within the legend area 1440 may also act as hyperlinks pointing to an online help system for the Employee Calendar web page 1400. For example, an employee may click the sample cell 1442 (or its corresponding text) to access an online help topic about prime-time holiday periods.

Once a proposed absence period has been approved, rejected, or has been forwarded for further consideration, the employee can use either the Edit Absence button 1466 or the Delete Absence button 1468 in the set of absence bidding/editing controls 1450 to modify or remove the absence, respectively. Since the use of both of these controls is self-evident, they will not be discussed in detail. It is worth noting, however, that use of the Edit Absence button 1466 may cause the processing entity 36 to reconsider the acceptability of an existing absence period that was previously approved.

For example, assume that the proposed vacation represented by the cell 1434 was considered and approved by the processing entity 36, but the employee now wishes to change the dates of this vacation. To do this, the employee selects the cell 1434 and then uses the Edit Absence button 1466 to adjust the start and end dates. However, the processing entity 36 may choose to consider the modified absence period as a new proposed absence period since it has been substantially changed. In such a case, the entity 36 would repeat the process illustrated in FIG. 14B using the edited absence period.

The operation of the Employee Calendar web page 1400 has so far been described within the context of employee absences that require prior approval, such as vacations or personal leave days. However, the web page 1400 can also be used for absences that do not require prior approval, such as in the case where an employee is sick.

In this case, the employee uses the functionality of the Employee Calendar web page 1400 to define an absence period for his or her expected sick day(s) in the same way as for other types of absences. Specifically, the employee first identifies the period representing the sick day(s) when he or she expects to be absent from work in the cells 1430, configures the set of absence bidding/editing controls 1450 to indicate that the absence is due to a sickness, and then submits the proposed absence period to the processing entity 36 for consideration using the Submit Bid button 1464.

When the processing entity 36 receives the absence bid for proposed absence period representing one or more sick day(s), it processes the period as described in FIG. 15. However, sickness-related proposed absence periods are considered by the entity 36 at steps 1420B and 1430B differently than for other types of absences, as is discussed below.

In particular, at step 1420B, the processing entity 36 may automatically approve the proposed absence period without further processing and/or determination of the acceptability of the bid. This outcome occurs because an absence due to sickness is recognized by the entity 36 as a special type of absence that requires no processing and as a condition that leads to automatic approval of the proposed absence period.

At step 1430B, the processing entity 36 communicates the outcome of the previous step (i.e., the absence of the employee) to a set of people who are somehow connected to the employee, rather than (or in addition to) the employee himself or herself. This set of people likely includes the employee's immediate supervisor and/or manager, his or her co-workers, as well as to a representative in the HR department, if necessary. The communication sent by the entity 36 during this step may also be sent to an employee who is "on-call" and will fill in for the absent employee. The processing entity 36 may also include information relating to the tasks originally assigned to the sick employee so that his or her replacement knows both whom they are replacing and what they are expected to do.

The Employee Calendar webpage 1400 also contains the View Entitlements control 1470, which is provided to allow an employee to see his or her particular absence entitlements. An employee can select the type of absence entitlement that he or she wishes to view, such as vacation entitlements, personal leave entitlements and/or sickness entitlements (among others) using this control, which may be in the form of a drop-down list.

When an employee selects a type of absence entitlement from the View Entitlements control 1470, a separate pop-up window or webpage showing the selected absence entitlements appears.

Shown in FIG. 14A is a Vacation entitlements webpage 1400A that provides information about the vacation entitlements available to an employee. This page may be comprised of data elements, including:

- a Vacation Roster element 1422A showing the vacation roster to which the employee is registered;
- a Qualifying Date element 1424A that shows the date from which his or her vacation entitlements have accrued;
- a carryover vacation days element 1426A, which show the amount of days and/or weeks that the employee may have 'carried over' from previous periods;
- a total vacation entitlements element 1428A and number of vacation days remaining element 1430A that respectively show the employee's total vacation entitlements and the number of vacation days remaining; and
- a number of fields (shown collectively as element 1432A) that may provide additional information to the employee about certain vacation entitlements; and
- a comments element 1434A that lists certain comments.

A Personal Leave Day (PLD) entitlements webpage, and a Sickness entitlements web page may also be accessed by an employee in order to view similar information in relation to their entitlements to personal leave days and sick days. Since these pages are substantially similar to the Vacation Entitlement webpage 1400A, they will not be discussed further.

In accordance with a non-limiting embodiment, the fields within the Vacation Entitlements webpage 1400A, the Personal Leave Day (PLD) entitlements webpage, and the Sickness entitlements webpage are not editable by the employee. The main purpose of these pages is to convey relevant information regarding absence entitlements for vacations, personal leave days and/or sick days to the employee for planning and evaluation purposes. As a result, there is no need for the employee to modify field values on these pages.

End of Shift Reporting

When an employee clicks the End of Shift button 1118 on the personalized web page 1100, he or she is sent to the first of a set of End of Shift (End of Shift) reporting web pages 1700A, 1700B and 1700C, respectively shown in FIGS. 17A, 17B and 17C. Each of these web pages represents a portion of an End of Shift report, which an employee can fill out when his or her shift (or set of assigned jobs) is complete. For many employers, it is required that the employee completes an End of Shift report at the end of his or her working shift. The purpose of filling out such a report can be, among others:

- for record-keeping purposes, such as to provide an employer with a record of what tasks or jobs have been completed, when a particular job or task was completed and the person(s) who completed it;
- to ensure that government or industry regulations are being complied with, by recording the task performed and/or length of time an employee has spent on a job; and/or
- to generate a list of activities for which an employee may be compensated.

In the non-limiting embodiment presented here, the various components of the End of Shift report are distributed amongst three (3) web pages, namely the web pages 1700A, 1700B and 1700C. In alternate embodiments, this report may be distributed among a greater or lesser number of web pages, and could feature different components of the End of Shift report than are illustrated here.

Each of the web pages 1700A, 1700B and 1700C share certain features, such as a header section that includes the same header information as found on the personalized web page 1100, such as the employee's name 1102, the pin 1104, home location 1106, current location 1108 and craft 1110.

FIG. 17A shows the webpage 1700A that appears when the employee initially accesses the End of Shift report after completing a job assignment(s). This webpage is comprised of a Duty Summary section 1710, a Mandatory Rest Summary section 1720, and an Equipment Summary section 1730, as well as a set of controls which include a Next button 1704, a Save button 1706 and a Cancel button 1708.

The Duty Summary section 1710 allows an employee to enter information relating to the duties they performed on the job. This section features cells 1712 that are organized as columns 1714 and rows 1716. Each column in the columns 1714 represents an employee who was assigned to the job and also indicates their role, such as conductor, brakeman and/or engineer.

While the columns (such as the columns 1714) in the web pages 1700A, 1700B and 1700C list multiple employees covered by the report represented by these web pages, it will be appreciated that only one of the listed employees needs to complete the information required for the End of Shift report. In this way, a single employee can review, complete and submit an End of Shift report for other employees with whom he or she was working. The time savings afforded by use of these web pages to review, update and submit the End of Shift report for multiple employees may improve job satisfaction, since each employee is not required to complete his or her own End of Shift report.

Each row in the rows 1716 represents one reporting element related to the duties carried out by the employee(s) assigned to the job. Elements in the Duty Summary section 1710 may include:

- time(s) when an employee was on-duty;
- time(s) when an employee was relieved of duty;
- time(s) when an employee was off-duty;
- the amount of additional personal rest taken by an employee; and
- a calculation of an employee's total time on duty.

The Mandatory Rest section 1720 provides information as to when the employee (and/or their co-workers) took mandatory rest breaks, which may be required under certain government regulations and/or collective bargaining agreements. This section includes cells 1722 that are organized as columns 1724 and rows 1726. Similar to the columns 1714, each column in the columns 1724 represents an employee who was assigned to the job and indicates their role, such as conductor, brakeman and/or engineer.

Each row in the rows 1726 represents one reporting element related to any mandatory rest taken by the employee(s) assigned to the job. Elements in the Mandatory Rest section 1720 may include:

- time(s) when an employee was taking a mandatory rest break; and
- the time when the mandatory rest break expired (or will expire, if this time is in the future).

The Equipment Summary section 1730 provides information as to any equipment issues or failures that may have occurred during the job. Elements in this section may include:

- a field to identify the locomotive or other equipment asset that had problems or failed (Engine number element 1732);
- a field to identify the type of issue or failure that occurred (Failure type element 1734); and/or
- fields to identify the date and time the failure was reported (collectively, element 1736).

FIG. 17B shows the webpage 1700B, which may appear if their job is identified as one where the employees may have left their home territory for a predefined period of time. This webpage is comprised of a Lodging Summary section 1740, a Transportation Summary section 1750, as well as a set of controls which include a Previous button 1702, the Next button 1704, the Save button 1706 and the Cancel button 1708.

Both the Lodging Summary section 1740 and Transportation Summary section 1750 are comprised of cells 1742 and 1752 respectively, that are organized as columns (1744 and 1754 respectively) and rows 1746 and 1756, respectively. Each column in these sets of columns represents one employee who was assigned to the job and indicates their role, such as conductor, brakeman and/or engineer. Like the webpage 1700A, however, only one employee listed in the columns 1744 and 1754 would typically review and complete this section of the End of Shift report for the employees represented by these columns.

In the Lodging Summary section 1740, each row in the rows 1746 represents one element that is related to the lodging services used by an employee. Elements in this section may include:

the name of the lodging (e.g., hotel or motel) where the employee stayed;

the primary and/or alternate phone number of the lodging and/or room where the employee stayed;

the room number where the employee stayed; and/or the amount of time before the employee is scheduled to be on duty that a wake-up call is placed to the employee.

In the Transportation Summary section 1750, each row in the rows 1756 represents one element related to transportation services to/from the job assignment. Elements in this section may include:

the type of transportation service used (e.g., taxi, bus, airplane);

whether the employee paid for the transportation service or not; and/or the amount the employee paid for the transportation service, if required.

FIG. 17C shows the declarations and certification section of the End of Shift report represented in the webpage 1700C. This webpage is comprised of a declarations section 1760, a certification section 1770, an reviewer section 1780 and a set of controls that include the Previous button 1702, the Save button 1704, the Cancel button 1708 and a Submit button 1705.

The Declarations section 1760 provides information as to an employee's declarations, which may indicate his or her intentions when certain thresholds (such as for personal miles or time-off) have been reached. This section includes cells 1762 that are organized as columns 1764 and rows 1766. As in the web pages 1700A and 1700B discussed previously, each column in the columns 1764 represents an employee who was assigned to the job and also indicates their role, such as conductor, brakeman and/or engineer. However, this information would typically be reviewed and/or completed by a single employee rather than by each employee listed in these columns.

Each row in the rows 1766 represents a declaration (or part thereof) by the employee in the End of Shift report as to their future activities. Declarations that may be included this section may include:

the intent of the employee when the threshold for their personal miles has been reached (e.g., to book off);

the intent of the employee when their time-off threshold has been reached (e.g., to indicate the amount of time-off to be taken); and/or the intent of the employee regarding an upcoming voluntary absence (such as to take, reschedule, short or extend an upcoming personal-leave day).

While the Certification and Reviewer sections 1800 and 1900 are discussed in more detail below, they may be briefly summarized as respectively providing information as to whether the employee certifies their information within the End of Shift report is correct and identifying the End of Shift report's author (i.e., the employee who reviewed and/or completed the report).

It will be appreciated that information that is provided in the various sections of the End of Shift report, which is summarized in the web pages 1700A, 1700B and 1700C discussed above, can be at least partially pre-populated by the processing entity 36 using a process that will be described below. The term 'pre-populated' refers to the automated entry of information to the End of Shift report by the entity 36. For example, the pre-population of the End of Shift report may be performed based on information in the train schedules database 20, the employee profile database 22 and the constraints database 24, as well as from certain of the external data inputs 50, among others.

When the End of Shift report is at least partially pre-populated, the amount of time required to complete the report is likely reduced, since an employee needs only to review and validate the pre-populated data within the report. Advantageously, this time savings may increase the likelihood that an employee will review and submit their End of Shift report, which may also increase the overall accuracy and efficiency of the system 10.

Although the End of Shift report can be at least partially pre-populated before being reviewed by an employee, it may be possible that certain information within the sections comprising this report may be unavailable, incorrect and/or missing entirely. As a result, information within the cells that has not been pre-populated can be entered by an employee, and information that has been pre-populated can be modified or adjusted by the employee. This will also be described in more detail below.

As described so far, each section of the End of Shift report is typically comprised of cells (e.g., the cells 1712 on the webpage 1700A) which are organized as columns and rows (e.g., the columns 1714 and the rows 1716 on the same page). Using a process that will be described below, the processing entity 36 may pre-populate these cells in order to allow an employee to review the contents of each pre-populated cell and determine whether it is correct or requires adjustment.

If a cell's contents are correct, the employee is relieved of having to enter data for that particular cell and he or she can move on to review the next cell (or section) in the End of Shift report. Otherwise, the cell may be provided with a control (such as a editable field, or a calendar or clock) that allows the employee to modify its contents in order to correct it. For example, each cell of the cells 1712 for the On-duty Time row of the rows 1716 may be provided with a control, such as a clickable button with a calendar icon. If the original (i.e., pre-populated) time listed in each of these cells was incorrect, this control could used to display a calendar/clock so that the employee could identify the correct date and/or time when each employee represented in the columns 1714 went on-duty.

It should be appreciated that an employee may also be able to type within a cell and/or use its controls (where available) so as to enter data to a cell that could not be pre-populated (i.e., an "empty" cell). In this way, portions of the End of Shift report that were not pre-populated by the processing entity 36 can be completed by an employee prior to its submission.

Furthermore, it may be possible that information may be missing from a section of the End of Shift report, or that the sections that are provided by default do not allow sufficient space to record the information required to describe what happened during a work assignment in detail. For example, the Equipment Summary section 1730 on the webpage 1700A provides information as to equipment issues and failures. Although the elements in this section may be pre-populated, it may be possible that additional equipment experienced issues and/or failures during an assigned job that does not appear in this section, yet still needs to be reported.

To handle such situations, most sections in the End of Shift report are provided with an Add New control, which is represented in the FIGS. 17A, 17B and 17C as a clickable button. If an employee uses this control, the corresponding section of the End of Shift report may be suitably adjusted to allow the employee to enter the required detail(s).

For example, when an employee uses the Add New control for the Equipment Summary section 1730, he or she may be provided with a new set of rows 1732, 1734 and 1736 so that he or she can record an issue or failure with equipment that was not included in the original End of Shift report. In this way, the employee can ensure that an End of Shift report includes all relevant details for the completed job assignment(s), regardless of whether this information was originally pre-populated in the report.

Once an employee has reviewed (and/or adjusted) the information within those section of the End of Shift report included in a particular webpage, such as the web pages 1700A, 1700B and 1700C, they may use the set of controls remaining on each page to navigate between web pages, save the current web page/End of Shift report, cancel the changes made to the current web page/End of Shift report or submit the End of Shift report. In particular, an employee may use following controls to manage and/or navigate the End of Shift report:

- the Save button 1706 saves the current state of the End of Shift report;
- the Cancel button 1708 cancels changes made to the End of Shift report, returning it to its default (or previously saved) state;
- the Previous button 1702 saves the current portion of the End of Shift report and moves to the previous webpage; and/or
- the Next button 1704 saves the current portion of the End of Shift report and moves to the next webpage.

When any of these navigation buttons are used, the current content of the sections comprising the current webpage (i.e., the pages 1700A, 1700B and/or 1700C) may be checked to see if all required information is available. For example, if an room number in one or more employees stayed at a hotel is absent from the Lodging Summary section 1740, a prompt may appear to ask the employee to fill this information in before this information is saved.

A navigation menu for the End of Shift report may also be provided along with the buttons described above to assist the employee in navigating within the report. For example, FIGS. 17A, 17B and 17C include a navigation menu 1790 that typically includes an entry associated with each of the web pages 1700A, 1700B and 1700C described above. When an employee clicks one of these entries (e.g., the entry for the page 1700A), the currently displayed webpage is replaced by the webpage associated with the entry in the menu.

It is worth noting that the set of web pages comprising an End of Shift report is dependant on the type and location of the job(s) assigned to and performed by the employees. For example, assume that a first group of employees were assigned jobs on a scheduled train that took them out of their home territory overnight, while a second group of employees were assigned jobs within their home territory. When an employee from the first group reviews the End of Shift report for their group, the webpage 1700B that provides information as to lodging and transportation is likely to be included in the set of web pages.

In contrast, when an employee from the second group reviews the End of Shift report for his or her group, the webpage 1700B is unlikely to be included since these employees did not leave their home territory and so do not have any lodging- and/or transportation-related information to be reviewed. In this way, employees review sections of the End of Shift report that are relevant to their particular job assignments, which may reduce employee time spent on such reports, as well as limit the potential for employee fraud, such as through entering fraudulent information for non-existent hotel and travel expenses to the End of Shift report.

Once all required information for the End of Shift report has been reviewed and/or entered by the employee on the web pages 1700A, 1700B and 1700C, an employee may use the aforementioned Certification and Reviewer sections 1770 and 1780 in order to prepare the report for submission.

The Certification section 1800 allows each employee whose job is covered by the End of Shift report to certify that the information within the report is correct. While other sections of this report may be filled in by a single employee for multiple employees, it is likely that this section may require each employee to indicate their agreement (or disagreement) with the report's contents. For example, each employee may be required to enter his or her personal identification code (such as their employee PIN) to indicate their agreement (or disagreement) with the End of Shift report before the report can be submitted.

The Reviewer section 1780 allows the employee who is responsible for the End of Shift report to identify himself or herself. This section includes an author/reviewer element 1782 and a timestamp element 1784 to identify the author/reviewer of the End of Shift report, as well as indicate the date and time when the End of Shift report was reviewed. In this way, the identity of the author/reviewer for the End of Shift report can be recorded, should questions regarding the report arise later.

Once the sections 1770 and 1780 are completed, an employee can click the Submit button 1705 in order to save the End of Shift report and also submit it for consideration to the processing entity 36.

Before considering the End of Shift report, the processing entity 36 may perform a brief check of its contents to ensure that all required fields and/or sections are completed and that the report is internally consistent. If this check fails, the employee may be notified (such as via a prompt) that a particular problem has been found with the End of Shift report, which may include suggestions on how to correct that problem. As such, the entity 36 can ensure that each End of Shift report submitted for its consideration is complete and ready beforehand.

It should be appreciated that the completion of certain fields (or sections, such as the sections 1730, 1740 and/or 1750) may be optional for the employee(s). For example, the Equipment Summary section 1730 need not be completed if the equipment used by the employees for their work did not suffer any issues or failures.

Figure 17D:
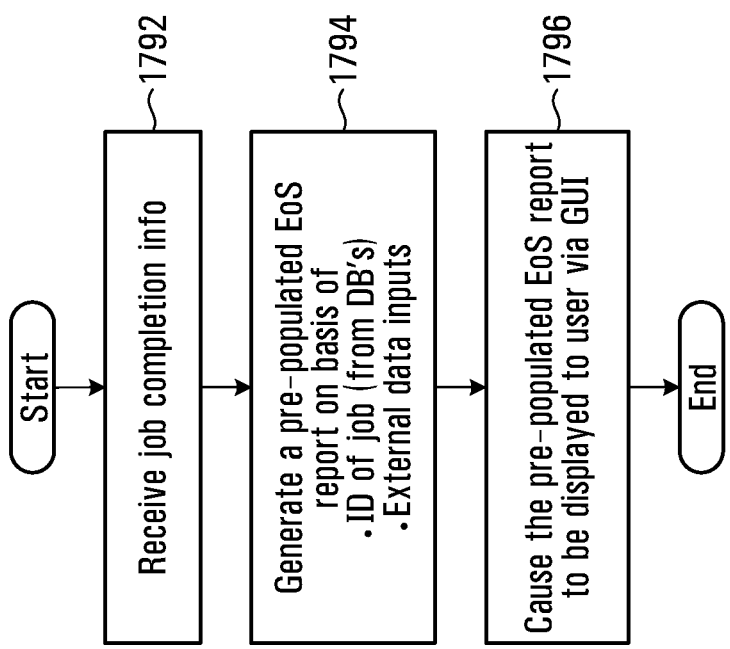
FIG. 17D shows a flow-diagram of a method according to a non-limiting example of implementation for pre-populating the End-of-Shift reporting interface according to the present invention.

As mentioned previously, the various components of the END OF SHIFT report web pages 1700A, 1700B and 1700C may be at least pre-populated by the processing entity 36 before they are presented to the employee. FIG. 17D shows a flowchart that illustrates how the processing entity 36 pre-populates the components of these web pages.

Step 1792

At step 1792, the processing entity 36 receives information that indicates that a job is complete. This information may be derived from the employee themselves performing a particular task (such as by booking off) or from the train schedule database 20, the employee profile database 22 or the constraints database 24. The information received by the entity 36 may also come from the external data inputs 50, such as from a GPS transponder located on a train that indicates its current position, which may be identified relative to the known position of stationary railway assets of the railway network, such as railway stations and/or rail yards.

Step 1794

At step 1794, the processing entity 36 generates a pre-populated End of Shift report that is based at least in part on the basis of information associated with a particular job assignment and/or information from the external data inputs 50. In the first case, the pre-population of the report is based at least in part on job-related information that may be stored in the databases 20, 22 and/or 24. For example, the train schedule database 20 contains a list of employees who comprise a crew for each scheduled train, along with their particular job assignments. When the processing entity 36 finds that a scheduled train has arrived at its destination, the entity 36 can query the database 20 to retrieve the identities of the employees staffing that train, as well as their respective roles, in order to pre-populate the End of Shift report with this information.

The pre-populated End of Shift report may also be based in part on information received from the external data inputs 50, such as external databases to which the processing entity 36 has access and/or devices that provide information to it. For example, a set of transponders located on the railway network may indicate to the processing entity 36 that a particular scheduled train (whose crew composition is likely known to the entity 36) left its origin/waypoint and/or has arrived at its destination. Based on this information, the processing entity 36 can pre-populate the End of Shift report based on certain information derived from the external data inputs 50, such as the time when the scheduled train left its origin and arrived at its current destination.

With respect to the web pages shown in FIGS. 17A, 17B and 17C, specific types of information that could be pre-populated may include:

- in the Duty Summary section 1710, the On-Duty and Off-Duty times for each employee can likely be pre-populated based on when he or she booked on/off, which may be recorded in the employee profile database 22;
- in the Mandatory Rest Summary section 1720, the mandatory rest period for each employee can likely be pre-populated based on information in the employee profile database 22 and the constraints database 24;
- the Equipment Summary section 1730 can likely be pre-populated based on an equipment database that may be available from the external data inputs 50;
- in the Lodging Summary section 1740, the hotel name, phone number and room number are likely to be pre-populated based on lodging information that may be available via the external data inputs 50, while the alternate phone number is likely to be the employee's cell phone number, which is stored in the employee profile database 22;
- the Transportation Summary section 1750 is likely to be pre-populated based on information available via the external data inputs 50; and
- the Declarations section 1760 is likely to be pre-populated based on information within the employee profile database 22 (e.g., for scheduled absences) and/or the constraints database 24 (e.g., for time-off thresholds and durations set by regulations and/or collective agreements).

Step 1796

At step 1796, the processing entity 36 causes the pre-populated End of Shift report to be displayed to the employee via an interface, non-limiting examples of which have been illustrated in the web pages 1700A, 1700B and 1700C, and were described in detail above. It will be appreciated, however, that the appearance and organization of information contained within the End of Shift report can vary from that disclosed above without departing from the spirit of the invention.

When an End of Shift report is submitted, the information contained in that report is used in order to generate claims, which may be defined as one or more paid and/or unpaid activities that are associated with the work performed by an employee. For example, an employee may be assigned to be an engineer piloting a scheduled train. This job may include certain claims that represent activities for which the employee is paid, such as the payment of an hourly or mileage-based rate for his or her piloting skills. The job may also include certain claims that represent unpaid activities that are logged for record-keeping purposes. For example, an unpaid claim associated with the scheduled train could represent the number of hours the locomotive was used, a running tally of which is can be used to scheduled preventative maintenance for the locomotive.

The claims generated from the submission and consideration of an End of Shift report by the processing entity 36 may be used to at least partially pre-populate a claims report that is subsequently displayed to the employee for his or her approval. In this way, the employee can see what paid and unpaid activities were associated with their assigned jobs so that they can ensure they are paid appropriately for their work. The approval of a claims report by one or more employees may also allow the billing of such activities to a third-party, such as a client on whose behalf the employee(s) worked.

FIG. 23 shows a claims report webpage 2300 for an employee that was at least partially pre-populated based on the prior submission of an End of Shift report to the processing entity 36. This webpage includes a header section 2310, a Report Settings section 2320, a Display Settings section 2330, a Filter Settings section 2340 and a Claim Report table section 2350. The claims report webpage 2300 also includes an Add button 2391, a Print button 2392, a Send button 2393, an Appeal button 2394 and a Submit button 2395.

Like the web pages 1700A, 1700B and 1700C for the End of Shift report, the header section 2310 of the claims report webpage 2300 includes the same header information as that on the personalized web page 1100, such as the employee's name 1102, the pin 1104, home location 1106, current location 1108 and craft 1110.

The sections 2320, 2330 and 2340 provide information regarding and controls over the state of the Claim Report table section 2350. In particular:

- the Report Summary section 2320 provides information as to certain parameters (such as a time period, timesheet or identifier of a scheduled train) used to generate the claims that appear in the Claim Report table section 2350;
- the Display Settings section 2330 provides information as to certain of the values that appear in the Claim Report table section 2350; and the Filter Settings section 2340 provides information as to whether claims are filtered in the Claim Report table section 2350, and if so, the type of filtered claims that will appear in this section.

Further information about each of these sections will be provided later in the context of an employee adjusting the displayed claims in the Claim Report table section 2350.

The Claim Report table section 2350 displays the claims for an individual employee that are associated with the parameters listed in the sections 2320, 2330 and 2340. This section is typically pre-populated by the processing entity 36 with claims that are generated at least in part based on one or more submitted End of Shift report(s) using a process that will be described later.

The Claim Report table section 2350 is comprised of a grid or table with cells that are created at the intersection of each column in a set of columns 2354 and each row in a set of rows 2356.

Each column in the columns 2354 represents an information category (or sub-category) for each claim listed in the section. Categories that represented in the columns 2354 may include:

- the full or abbreviated name of a claim;
- the starting date/time for a claim;
- the ending date/time for a claim;
- the "claimed" values (i.e., values submitted by the employee in an End of Shift report) for a claim, which may be further represented as a distance, a unit, a number or as a monetary value;
- the system-reported values (i.e., the values reported to or by the system 10) for a claim, which may be further represented as a distance, a unit, a number or as a monetary value;
- the approved values for a claim, which may be further represented as a distance, a unit, a number or as a monetary value;
- the current status of a claim (i.e., whether it is currently under review, approved, denied or in appeal);
- any remarks or comments associated with a claim, such as a manager's comments; and
- the option to appeal a certain claim (or claims) in case the employee disagrees with the claim, its details and/or compensation.

Each row in the rows 2356 represents an individual claim associated with the employee, which typically represents a certain activity the employee has performed in conjunction with his or her job assignments. The content of these rows may be pre-populated by the processing entity 36 based at least in part on a End of Shift report previously submitted by (or on behalf of) the employee. In this way, the rows 2356 represent a more comprehensive breakdown of the tasks associated with the completed job assignment(s) identified in the End of Shift report.

For example, the rows illustrated in the FIG. 23 provide a sample of claims that would normally be associated with and generated from the End of Shift report submitted by (or for) a crew member who worked on a scheduled train, such as claims for terminal detention, the distance covered by the train, and the length of the train. Although not shown here, certain navigational aids (such as scroll bars, drop-down page lists and/or navigational arrows) may be provided so that an employee can review all of his or her claims in the rows 2356. In addition, the employee is provided with a certain degree of control over the display of the claims report table and the information categories and/or claims contained therein, which will be described below.

FIG. 23 shows one embodiment of the Claim Report table section 2350 where information categories appear as columns in the table and claims appear as rows. In alternate embodiments of this section, claims could appear as columns and information categories could appear as rows.

The individual claims that constitute the rows 2356 in the table section 2350 may be adjusted by the employee via controls within the Report Settings section 2320. Controls within this section may allow an employee to view claims associated with a particular scheduled train on which the employee worked, a particular time period, and/or a particular timesheet, among other possibilities.

Furthermore, claims within the rows 2356 that were displayed by the employee using the controls in the Report Settings section 2320 may be filtered using the controls in the Filter Settings section 2340. Controls within this section may allow an employee to filter claims to view those that meet certain criteria, such as those that are related to a particular timesheet, among others.

By using the controls in the Reporting Settings section 2320 and/or Filter Settings sections 2340, the employee is provided with a degree of control over claims that appear as individual rows in the rows 2356. This provides the employee with the ability to search for and locate individual claims that he or she may be interested in viewing and/or verifying.

In a similar manner, the controls within the Display settings 2330 provide an employee the ability to adjust the information categories that are included in the columns 2354. Controls within this section may allow the employee to show or hide columns representing system-report values, claimed values, and/or approved values (among others) for each claim in the rows 2356. Along with the Reporting Settings section 2320 and the Filter Settings section 2340, the employee is provided with a certain degree of control over the appearance of and/or content displayed in the Claims Report Table section 2350.

It will be appreciated that the content of the Claims Report Table section 2350 is provided for employee review purposes only, and is therefore not editable by the employee. While an employee is provided with a certain degree of control over the appearance and/or content within this table (namely through the controls associated with the Reporting Settings section 2320, the Display Settings section 2330 and the Filter Settings section 2340), the employee cannot modify the claims and/or any information associated with these claims through this table.

For example, cells 2352 and 2362 display claimed values for two (2) separate claims in the Claim Report table within the section 2350. Likewise, the cell 2372 shows the approved values for the claim associated with the claimed value in the cell 2362, while a cell 2382 shows the status for yet another claim in the table. If the employee chooses not to view claimed values via the controls in the Display Settings section 2330 (namely by disabling the 'Display Claimed Values' control), only the cells 2372 and 2382 would appear in the table within the section 2350; the cells 2352 and 2362 would not be displayed. However, the claimed values shown in these cells would still remain within the system 10.

The employee is also provided with certain controls to print or send the contents of the Claims Report Table section 2350 via the print button 2392 and the send button 2393, respectively. The employee is also provided with an Appeal button 2394 to appeal any claim with which he or she disagrees. For example, the employee could appeal the declined claim located between the cells 2352 and 2362 if he or she felt that compensation should have been paid for this terminal detention.

It may be possible that during a review, an employee discovers that the set of pre-populated claims represented by the rows 2356 in the Claims Report table section 2350 is missing certain claims. For example, certain types of claims for non-timesheet or stand-alone activities (e.g., time off provided for the birth of a baby or for bereavement of a family death) may not be previously known to the system 10 and therefore a corresponding claim may not be pre-populated within the claim report table.

To handle such situations, the Add button 2391 is provided so that an employee can add a claim for consideration via the webpage Claims Report webpage 2300. When the Add button 2391 is clicked, an interface is displayed to allow the employee to identify the claim to be added, as well as provide details for the claim. FIG. 24 shows a non-limiting embodiment of a Claim Addition webpage 2400 that could be used for such a purpose.

The Claim Addition webpage 2400 includes a header section 2410, a Claim Type/Time section 2420, a Claim Details section 2430, an Add Claim button 2444, a Clear Values button 2442, a Cancel button 2446, a Recent Claims section 2450 and a set of claim management controls 2460.

The header section 2410 of the Claim addition webpage 2400 includes the same header information as that on the personalized web page 1100, such as the employee's name 1102, the pin 1104, home location 1106, current location 1108 and craft 1110.

The Claim Type/Time section 2420 provides controls in order that an employee can identify the type of claim to be submitted, as well as the dates and/or times that will be associated with the claim. Controls within this section may include, among others:
  controls to set the type of claim to be added;
  controls to associate a new claim with an existing timesheet;
  controls to set the date and/or time when the job or work event associated with the claim started; and/or
  controls to set the date and/or time when the job or work event associated with the claim ended.

The Claim Details section 2430 provides controls to add or modify information typically associated with the claim type identified in the Claim Type/Time section 2420. Controls within this section may include, among others:
  controls to set the claimed job type, where this is different than the indicated job type;
  controls to set the claimed craft type, where this is different than the indicated craft type;
  controls to adjust the amount of time being claimed, where this may be different than the indicated claimed time; and
  a remarks area (such as a text field or box) that can be used to enter any additional information or comments to be considered when the claim is submitted.

The controls within the Claims Details section 2430 can be pre-set based on how the controls were set in the Claims Type/Time section 2320. For example, if a certain claim type is typically associated with a certain job and/or craft type, the controls for job type and/or craft type may be set accordingly when this claim type is selected in the section 2420. However, the employee can change these settings using the controls available in the section 2430 should these be different.

Once an employee has completed the Claims Type/Time section 2420 and the Claims Details section 2430, they can add the new claim by clicking the Add Claim button 2444. Alternatively, the employee could also click the Clear Values button 2442 to restore the default values and settings in the webpage 2400, or click the Cancel button 2446 to cancel the process of adding a new claim.

When an employee clicks the Add Claim button 2444, the new claim appears in the Recent Claims section 2450 in a manner discussed below. The section 2450 is comprised of cells (examples of which could be cells 2452) that are organized in a set of columns 2454 and a set of rows 2456.

Like the Claims Report table section 2350 that was discussed previously, each column in the columns 2454 of the Recent Claims section 2450 represents an information category for claims, such as a claim's starting and/or ending date/time, the claimed job type, the claimed craft type, the duration (expressed in hours) for the time claimed, the distance for the amount claimed (where applicable), the monetary amount claimed (where applicable) and the current status of the claim (e.g., whether currently in review, approved or declined), among other possibilities.

Each row in the rows 2456 represents an individual claim that has been created by the employee and its particular details. When an employee adds a new claim by clicking the add claims button 2444, it appears as a new row in the rows 2456.

Claims appearing in the rows 2456 in the section 2450 may be based on a particular time period (e.g., display all claims created within the last three (3) months), on a set number of claims (e.g., display the last five (5) claims regardless of when they were submitted) or on some other criteria without exceeding the scope of the invention. Depending on the display settings for the recent claims section 2450, a prior claim may be removed from the table in this section when an employee adds a new claim via the add claims button 2444. However, claims removed from this section are not deleted from the employee management system 10 and may be later retrieved by the employee.

The set of claim management controls 2460 is provided to allow the employee to manage existing claims in the recent claims section 2450. This set may include controls, such as:
  a Delete Claim button 2462 that can delete an existing claim (i.e., a row from the rows 2456);
  a Modify Claim button 2464 provided to allow modification to an existing claim in the Recent Claims section 2450; and
  a Submit Claim control 2466 that submits one or more existing claims in the Recent Claims section for consideration.

These controls provide the employee with the ability to manage his or her claims in the Recent Claims section 2450, which may include some selection control (such as a clickable checkbox) to identify and select certain claims. In particular, an employee can click the Modify Claim button 2464 to modify the information for a claim before submitting it and/or click the Submit Claim button 2466 to submit claim(s) for consideration and possible remuneration.

When an employee submits one or more claims for consideration using the Submit Claim button 2466, the status of those claims are set to "In Review". The employee's manager may be subsequently alerted by the employee management system 10 (e.g., via a prompt, an email, a voicemail or similar means) that the one or more new claim(s) were submitted by the employee and require his or her review. The manager may then review each of the one or more claim(s) and choose to accept or reject it. Acceptance of a claim allows it to processed with the employee's other claims by the processing entity 36 using a process to be described later, while rejection of a claim disallows such processing. The employee who submitted the claim can monitor its status using the Status column in the columns 2454.

Because the amount of information related to a claim typically exceeds the amount of available space in the Claim Report table section 2350 and/or the Recent Claims section 2450, an employee may also be provided with means to view more detailed information about the claim. For example, cells in certain of the columns 2354 or 2454 within these sections may also act as clickable links that allows the employee to access details about a claim.

Figure 25:
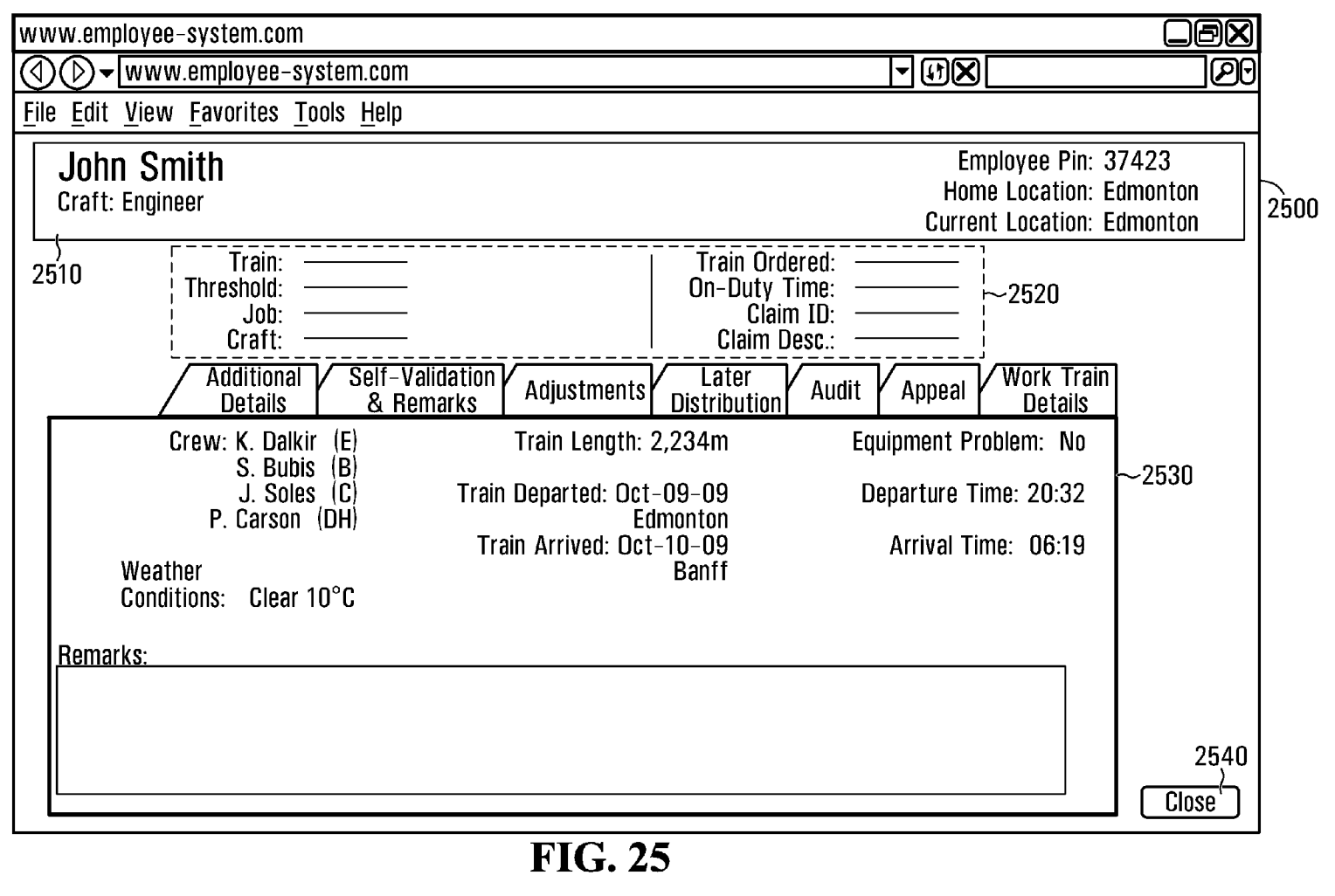

FIG. 25 shows a non-limiting embodiment of a webpage or similar interface 2500 that may provide an employee with additional information for a particular claim listed in rows 2356 and/or 2456 of the Claims Report table section 2350 or the recent claims section 2450. The webpage 2500 includes a header section 2510, a Claim Summary section 2520, a Claim Details section 2530 and a Close button 2540. It will be appreciated that when an instance of the webpage 2500 is initiated, it may replace the current webpage in the web browser (such as the Claim Report interface 2300) or may be displayed in a separate webpage.

The header section 2510 includes the same header information as is found on the personalized web page 1100, such as the employee's name 1102, the pin 1104, home location 1106, current location 1108 and craft 1110.

The Claim Summary section 2520 displays summary information related to the claim that may include, among others:
- the ID of the scheduled train that is associated with the claim;
- the timesheet associated with the claim (where applicable);
- the job title and craft type associated with the claim;
- the date/time when the scheduled train was ordered;
- the time when the employee went on-duty;
- the ID number and/or title of the claim; and/or
- a brief description of the claim.

The Claim Details section 2530 provides information about the selected claim that could not be displayed in the Claims Report table section 2350 and/or recent claims section 2450. In the non-limiting embodiment shown by FIG. 25, this information is grouped into certain categories (such as Self-Validation, Adjustments, Audit, Appeal) that are accessible via a control, such as a clickable tab, button (not shown) or drop-down list (not shown). When an employee uses a control (e.g., clicks a tab) in this section, details for this category appear in the Claim Details section 2530 as a result.

Once the employee is finished viewing the detailed information associated with the claim, he or she clicks the Close button 2540 to close the webpage 2500 and/or return to the previous page in the web browser, such as the Claims Report webpage 2300 or the Claims addition webpage 2400.

Figure 26:
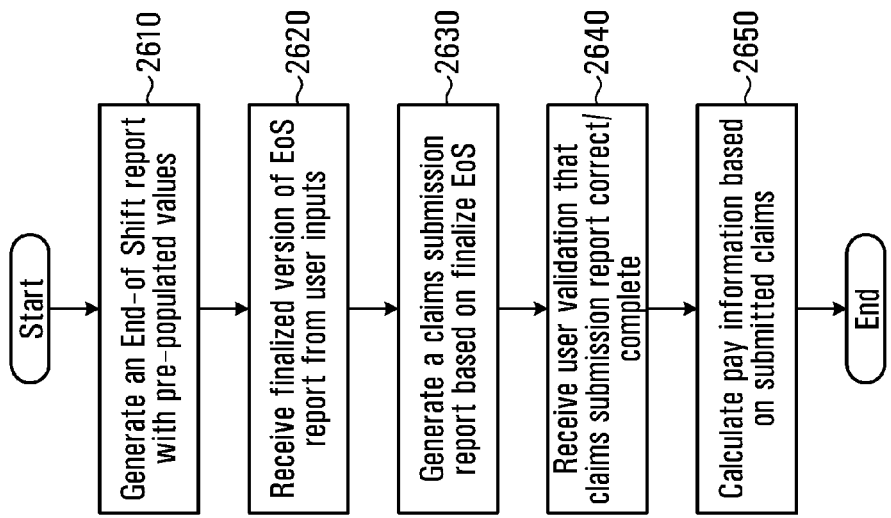
FIG. 26 shows a flow-diagram of a method according to a non-limiting example of implementation for generating and processing employee claims.

FIG. 26 shows a flowchart that illustrates how the processing entity 36 processes work that was performed by an employee into commensurate payment to the employee and/or billed items to a client or other third party entity.

Step 2610

At step 2610, an End of Shift report is generated by the processing entity 36 with pre-populated values that may be based at least in part on the train schedule database 20 and the employee profile database 22 (particularly the employee's work assignments recorded in these two databases), as well as the constraints database 24 and possibly the external data inputs 50. Since the process by which this report is generated was described previously with reference to the flowchart in FIG. 17D, no further discussion of this step is needed.

Step 2620

At step 2620, the processing entity 36 receives the finalized version of the generated End of Shift report with the employee's (or employees') input. This step is occurs once the employee preparing the End of Shift report in the web pages 1700A, 1700B and 1700C uses the Submit control 1705 and the report's contents has been checked by the processing entity 36 for obvious errors or omissions, such as a missing text field or input in a field that does not correspond to the expected input).

Step 2630

At step 2630, the processing entity 36 generates a claims submission report based on the finalized End of Shift report that was submitted by the employee, and subsequently received by the entity 36, in the previous step.

During this step, the processing entity 36 processes the information within the finalized End of Shift report, converting the activities described therein into their equivalent claim(s). It is worth noting that since the End of Shift report likely contains information for multiple employees, the entity 36 performs such a conversion process for the activities performed by each employee covered by the report.

For example, assume that a train crew includes three (3) employees who are assigned jobs as the engineer, conductor and brakeman of the scheduled train. When the finalized End of Shift report is processed by the processing entity 36, the entity 36 converts each employee's individual activities listed in this report, resulting in the generation of a set of claims that may be unique to each employee from a single End of Shift report. Advantageously, this simplifies both the End of Shift reporting process for employees and also possibly reducing the time between the submission of the End of Shift report and the generation of claims (for which the employee may be paid), thus enhancing employee satisfaction.

The result of step 2630 is the generation of a set of claims for the employee's activities that can be used in a claims submission report, and which may pre-populate the Claims Report webpage 2300. In particular, the set of claims generated for the employee may pre-populate the rows 2356 in the Claims Report Table section 2350. In this way, the employee can review the claims generated by the processing entity 36 in the table within the section 2350 and decide whether they accurately represent the activities that he or she performed, as well as decide whether the remuneration for the activity (which may be in the form of a monetary and/or a non-monetary amount) is correct, where such activities are monetarily compensated.

During the employee's review of the claims generated by the processing entity 36 at this step, it is possible that the employee may discover that one or more claims represented in the rows 2356 either do not accurately describe the activity he or she performed, and/or do not seem to be remunerated properly. In such a case, the employee can use the control provided (e.g., a clickable link) to access the previously described webpage 2500 that provides additional detailed information about a particular claim.

Should the employee not be satisfied with the information provided in this interface, he or she can appeal the claim(s) in question using the Appeal button 2394 so that they may be reviewed, corrected and/or a better explanation of them can be provided to the employee. Advantageously, such mechanisms may improve employee satisfaction by reducing the delay (and therefore uncertainty) in obtaining information associated with a particular claim.

During his or her review of the generated claims at this step, the employee may also identify certain claims that are missing from the rows 2356 in the claims report table section 2350 because they were not generated for some reason. In such a case, the employee can click the Add button 2391 to access the previously described claims addition webpage 2400 that allows the employee to create a claim to be added, as well as provide details for his or her new claim. Employee satisfaction may also be enhanced in this case, since the employee is provided with a mechanism to add claims that may be both quicker and/or easier to use than is otherwise currently available.

Step 2640

At step 2640, the processing entity 36 receives validation that the claims submission report (which contains the claims generated based on the finalized End of Shift report) is correct and complete. This validation is likely provided if employee's review of the claims generated for his or her activities does not reveal any (remaining) inconsistencies, errors or omissions and may be triggered by the employee clicking the submit button 2395.

Step 2650

At step 2650, the processing entity 36 calculates employee remuneration and/or client billing information based on the validated claims. In the first case, the entity 36 uses the remuneration values listed in the validated claims to update any systems that are used to track and calculate employee pay, such as payroll systems or databases. The processing entity 36 may also update any systems that are used to track and calculate remuneration that may have a non-monetary equivalent, such as a database that tracks an employee's time on-duty and indicates when they need to take time-off once a certain threshold limit is reached. In addition, the processing entity 36 may also update any systems that are used to log or track values for equipment, such as scheduling systems for the preventative maintenance of equipment when a piece of equipment reaches a certain threshold (e.g., number of hours of usage).

In the second case, the processing entity 36 may also use the validated claims to update any systems that are used to track and bill client charges/expenses, such as accounting or accounts receivable systems. Although the employee's remuneration is likely not directly charge/expense billed to the client, it may be used in part to calculate this charge.

Manager Interface with the System

In addition to being accessible to employees within an organization, the employee management system 10 is also accessible to managers, employees from the human resource department and/or others involved with managing or understanding how human resources within the company are allocated and/or managed. For the purposes of this description, these various groups of people will be collectively referred as managers.

Managers interested in accessing the employee management system 10 can do so via the workstations 14 and 16 in order to view information associated to individual employees, view information associated with human resource allocation, and provide rules/guidelines as to how jobs are assigned and how absences are allocated, among other possible uses offered by the system 10. The manner in which managers are able to interact with the employee management system 10 will now be described in more detail below.

In accordance with the present invention, managers are able to interact with the employee management system 10 via the employee management website that has been described above. This employee management website can be accessed over the network 11 via the workstations 14, 16. Any suitable web navigation system, such as Microsoft Internet Explorer, Mozilla Firefox and/or Google Chrome could be used in order to access the employee management website.

In a first non-limiting embodiment, managers are able to access the employee management website via the same portal web-page 1000 (shown in FIG. 10) that is used by employees. In this case, a manager would enter his username and password into the username field 1002 and the password field 1004 so as to logon to the secure portions of the website. Based on the user name and password that are entered, the employee management website will recognize that the person associated with that user name and password is a manager and has different access permission than an employee.

More specifically, based on the information entered by a user into the username field 1002 and the password field 1004, the processing entity 36 is able to verify the user's authorization to access the website, and is able to determine whether the person is a manager or an employee. For example, the network server 12 may have access to a manager profile database 1800, shown in FIG. 18, that is stored either within the memory 38 or in an external database that is accessible to the server 12.

As shown, the manager profile database 1800 includes a list of usernames and passwords associated with managers. As such, based on the username and password that is entered in the fields 1002 and 1004, the processing entity 36 can consider the usernames and passwords that are stored within the employee profile database 22 and the manager profile database 1800 in order to establish whether the person who is attempting to log on to the website is an employee or a manager. As will be described in more detail below, this will determine what kind of information will be presented to the person who is logging onto the website.

In addition, by cross-referencing the username and password entered by the manager with information contained within database 1800, the processing entity 36 is able to (1) verify that the user is an "authorized" user (meaning that they are allowed access to the website); and (2) access information associated with the manager. For example, once the processing entity 36 has determined that there is a record stored within the memory 38 for the username and password that were entered, the processing entity 36 can then access all the information associated with that user that is contained within that record.

In the non-limiting example of implementation shown, the manager profile database 1800 includes a plurality of records 1802$_{1-k}$ each associated with a respective manager. Each of the records 1802$_{1-k}$ comprises a data element indicative of a username 1804, a password 1806, a name 1808, a permission level 1810, a job title 1812, a location of residence 1814 and a list of employees who work under that manager. The list of employees may comprise each employee's name, or the list of employees may comprise one or more group names or department names that the manager is responsible for. It should be appreciated the information shown in the manager profile database 1800 of FIG. 18 is shown for the purposes of example only, and that more or less information may be included within each record 1802$_{1-k}$. For example, each record may further include an indication of the manager's residential address, contact details and qualifications, among other possibilities.

It is also possible that the aforementioned information contained in the manager profile database 1800 could also be contained or otherwise integrated within the employee profile database 22. For example, the database 22 could comprise a section that includes the data elements contained in the plurality of records 1802$_{1-k}$ described above. In this case, the processing entity 36 needs only to consult the employee profile database 22 to determine whether the user who is logging on is a manager or an employee.

Alternatively, the employee profile database 22 and the manager profile database 1800 could share certain information (such as usernames and passwords and the identity of managers), such that when a user logs on the processing entity 36 might initially consult the employee profile database 22 to confirm the username and password entered by the user in the fields 1002 and 1004. If the processing entity 36 determines from the database 22 that the user logging on is a manager, the entity 36 may then consult the manager profile database 1800 for further information relating to the manager. Otherwise, the processing entity 36 would continue to use the employee profile database 22 to obtain information about the employee 22. Such a distribution may allow the system 10 to obtain certain computational efficiencies when handling large numbers of logins, although other possibilities exist and would fall within the scope of the present invention.

Once it is determined that the person who is accessing the secure website is a manager, the processing entity 36 is able to provide the manager with a webpage that allows the manager to access relevant information of interest to him/her. In general, this will be information that is not available to either the general public or to employees.

Figure 19:
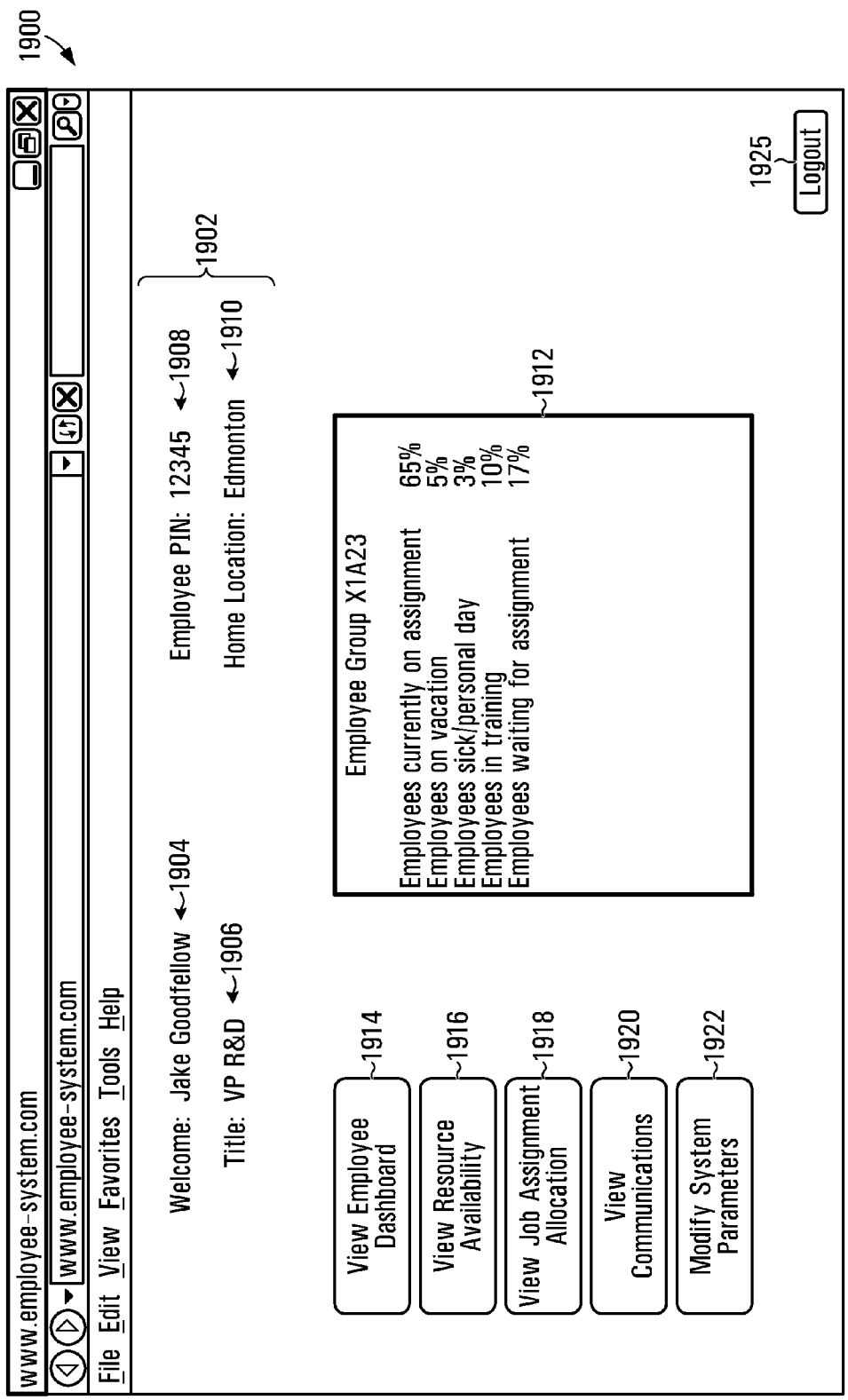
FIG. 19 is an on-screen display according to a non-limiting example of implementation illustrating a personalized manager user interface of the employee resource management system.

In accordance with a non-limiting example of implementation, once a manager has logged-on to the employee management website via the portal page 1000, the manager is presented with a personalized manager webpage 1900, such as the one shown in FIG. 19. The personalized manager webpage 1900 acts as a hub from which a manager can view information associated with his/her team of employees and access different services and functionalities offered by the employee management system 10.

In the non-limiting example shown, the personalized manager webpage 1900 provides header information 1902 that may include an identification of the manager's name 1904, the manager's job title 1906, the manager's PIN 1908 and the manager's home location 1910. It should be appreciated that other information could be included within the header information 1902 without departing from the spirit of the invention.

The personalized manager webpage 1900 may further include a display portion 1912 that is suitable for displaying information to the manager. In addition, a "view employee dashboard" button 1914, a "view resource availabilities" button 1916, a "view job assignment allocation" button 1918, a "view communications" button 1920 and a "modify system parameters" button 1922 may also be provided on the webpage 1900.

When the personalized manager webpage 1900 is first presented to the manager upon login, the display portion 1912 may be configured to display any information desired by the user. For the sake of the present example, assume the display portion 1912 will display statistics associated with the availability of that manager's employees upon login. The statistics displayed in the portion 1912 may include an indication of the percentage of the employees that are currently working, the percentage of employees who are sick, the percentage of employees on vacation, and the percentage of employees that are available to work. This information can be provided in graphical form, or in numerical form, among other possibilities.

Figure 20:
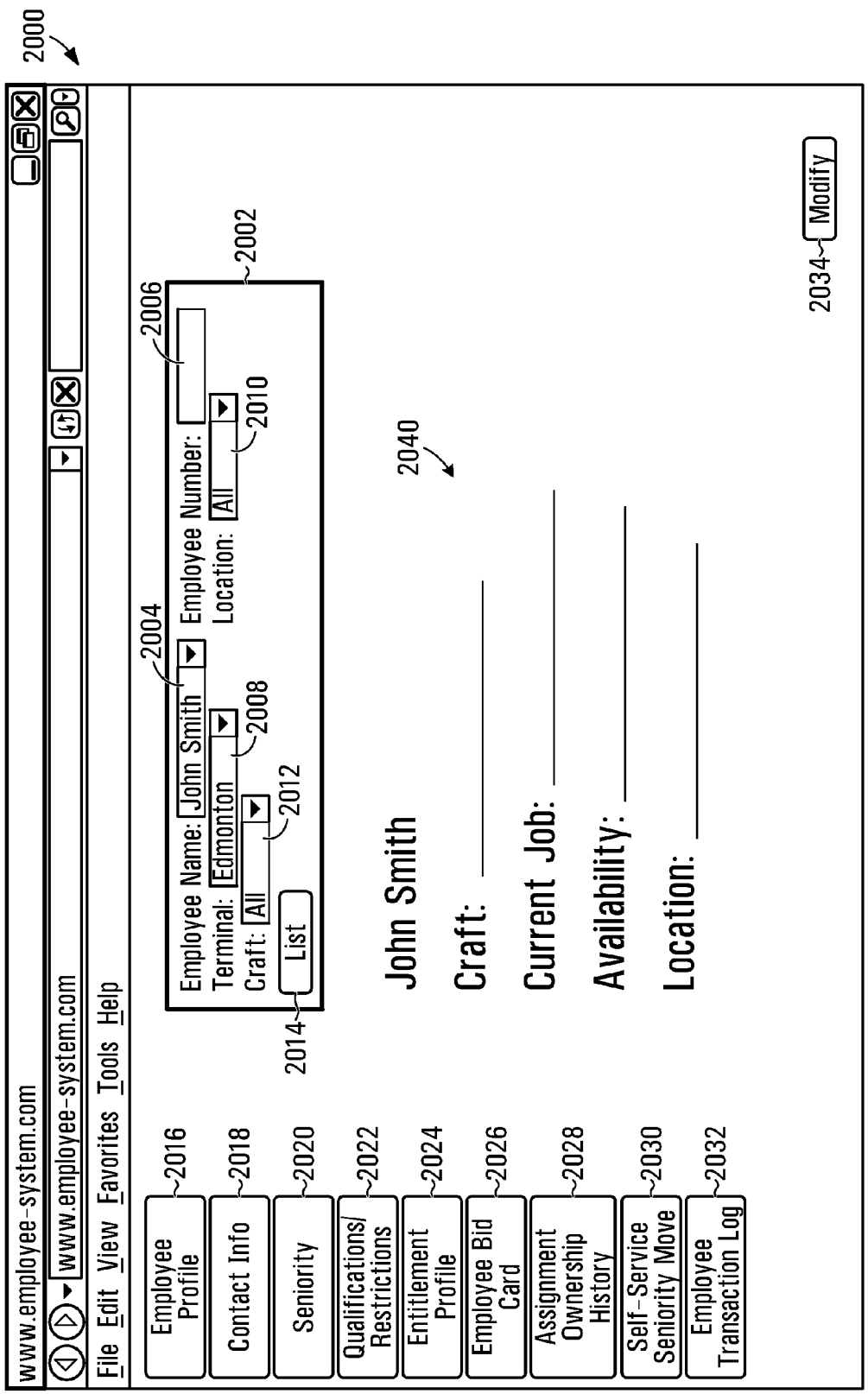
FIG. 20 is an on-screen display according to a non-limiting example of implementation illustrating an employee dashboard user interface of the employee resource management system.

The manager may use the personalized manager webpage 1900 in order to view information relating to an employee. In order to do so, the manager may click the view employee dashboard button 1914. When the manager clicks the button 1914, he or she is presented with an employee dashboard page 2000, a non-limiting example of which is shown in FIG. 20. As shown, the employee dashboard page 2000 includes a search portion 2002 that enables the manager to enter information for locating a given employee. In the non-limiting embodiment shown, the search portion 2002 includes an employee name input area 2004, an employee number input area 2006, a terminal input control 2008, a location input control 2010 and a craft input control 2012. In this non-limiting example, the controls 2008, 2010 and 2012 are shown in the form of drop-down lists. The manager may select search criteria using these input controls and then click on a list button 2014, which will locate a given employee or a list of employees based on the search criteria entered.

For the sake of example, assume that the manager entered the name "john smith" into the employee name input area 2004, and then clicked the list button 2014. The processing entity 36 then identifies an employee associated to the name "john smith" and displays information associated to the identified employee within a display area 2040 on the webpage 2000. Prior to the search being performed, it is possible that the display area 2040 is blank. In the case where multiple employees have the same name (i.e., there is more than one "John Smith" reporting to the manager), the display area 2040 may also provide the manager with some way of choosing the particular employee of interest.

In the non-limiting embodiment shown, the information that is displayed in the display area 2040 is associated with employee profile information that includes the employee's craft, current job assignment, availability for work (which could indicate whether the employee is on vacation or sick, for example) and the employee's location. This information can be retrieved from the employee profile database 22, and specifically from one of the records $300_{1-k}$ associated with the employee that was identified by the search criteria.

It should be appreciated that certain employee information that is displayed to the manager in the display area 2040 is information that is updated in substantially real-time. For example, the information regarding the employee's location may be indicative of GPS coordinates that are constantly updated depending on the employee's location. Alternatively, the employee's location may be indicative of the closest town to the employee's location, such that if an employee is on board a train, each time the train arrives, or passes through, a new town, the location information associated with the employee is updated.

The employee dashboard page 2000 may further include a plurality of controls for allowing the manager to view different information associated with a given employee. In the non-limiting embodiment shown, these controls include an employee profile button 2016, a contact info button 2018, a seniority button 2020, a qualifications/restrictions button 2022, an entitlement profile button 2024, an employee bid card button 2026, an assignment ownership history button 2028, a self-service seniority move button 2030 and an employee transaction log button 2032. Each of these buttons will be described in more detail below.

It should be appreciated that the information that is displayed to the manager by operating these control buttons can be displayed in the display area 2040, in a separate webpage or pop-up box (not shown), among other possibilities.

Firstly, by clicking the employee profile button 2016, the manager is presented with information such as that shown in the display area 2040 of FIG. 20, such as the employee's craft, current job assignment, availability and location. It should be appreciated that other information, or different information, may also be displayed. The information that is displayed is retrieved from the employee profile database 22, and is updated in substantially real-time, such that the employee profile information that is displayed to the manager is current and up-to-date.

By clicking the contact information button 2018, information relating to the employee's contact information is displayed. This information may include the employee's home address, home phone number, cell phone number, work phone number, work email address, personal email address as well, as well as any other information that could be considered contact information. The contact information may also include an indication of the employee's emergency contact references, as well as the contact information for those emergency contact references. The contact information may further provide an indication of the employee's preferences for being contacted, which could identify whether the employee prefers to be contacted by phone or by email, for example.

By clicking the seniority button 2020, information relating to the employee's seniority is displayed. This information may include an indication of the seniority roster(s) to which the employee belongs, and the employee's relative seniority, or seniority rank, within those rosters. The seniority information may also provide an indication of the dates at which the employee joined a given seniority roster, and the date on which the employee's seniority position is expected to increase. The seniority information may also indicate whether the employee's seniority status is on hold, such as in the case where the employee has taken an extended leave of absence (e.g., maternity/paternity leave) or is otherwise in a freeze period. Any other information that may pertain to the employee's seniority may also be included within the displayed seniority information.

By clicking the qualifications/restrictions button 2022, information relating to the employee's qualifications/restrictions is displayed. This information may include an identification of any qualifications that the employee may have, such as territorial qualifications, language qualifications, qualifications to operate certain machinery, health and safety qualifications, etc. This information may also provide an indication of a date or time period at which the qualification expires, as well as an indication of any requirements that need to be met in order to maintain the qualification. In certain circumstances, this information may also include an indication of activities that the employee has undertaken in order to meet the requirements necessary to maintain a qualification, such as refresher training or the number of hours spent piloting within a certain geographic territory.

The information relating to the employee's qualifications/restrictions displayed in the display area 2040 via the button 2022 may also provide an indication of any restrictions that have been applied to the employee. This restriction information may be indicative of a type of restriction that has been put on an employee (such as a restriction to an employee's ability to place a bid on a job, or a restriction on an employee's ability to accept a job assignment, among other possibilities). The restriction information may also be indicative of the reason for the restriction, which could be due to injury, sickness, or as a punitive measure. As will be described in more detail below, while viewing this information, a manager may also be able to modify the restriction or qualification information in order so as to add or remove a restriction or qualification from an employee.

By clicking the entitlement profile button 2024, information relating to the employee's entitlements are displayed. This information may include an identification of the employee's entitlements for vacation time, sick days and personal leave days, among others. This information may indicate the entitlements allocated, any entitlements carried forward and the entitlements that have been used up.

By clicking the employee bid cards button 2026, information relating to the employee's bids are displayed. This information may include an identification of any jobs, or categories of jobs, on which the employee has placed a bid. This information may be used by a manager when considering how to allocate jobs between a group of employees. It may also give the manager an idea of the types of jobs that the employee would like to be assigned, as well as those jobs that he or she has declined in the past and therefore would not want to be assigned.

By clicking the assignment ownership history button 2028, information relating to the employee's past and current job assignments is displayed. This information may include an identification of any or all past and current job assignments. This information may be provided in a list form, such that a manager can view information about the job assignments that an employee has previously held.

By clicking the self-service seniority move button 2030, information relating to any or all job assignments that the employee has "stolen" as a result of a seniority move is displayed. This information may include an identification of the employees who were the prior owners of the jobs from whom the employee took them.

By clicking the employee transaction log button 2032, the manager can view information submitted by the employee, or submitted on the employee's behalf, in an End of Shift report or in a claims submission report. Upon clicking this button, the most recent End of Shift or Claims Submission report may be displayed automatically, or alternatively, a list of past reports may be displayed, such that the manger can select which one of the End of Shift or Claims Submission reports he or she wishes to view.

Also included in the non-limiting example of the employee dashboard page 2000 shown in FIG. 20 is a modify button 2034. By clicking this button, the manager is allowed to modify, add or delete information that is displayed either in the display area 2040, or in a pop-up window that appears as a result of clicking one of the control buttons 2016 to 2032.

For example, the manager may be able to modify, add or delete information that is contained in the seniority information, the qualifications/restrictions information and the entitlement information, among other possibilities. In order to modify the information, the manager may access the information to be modified by clicking on the appropriate one of the control buttons 2016 to 2032. Once the information to be modified has been displayed, the manager would then click on the "modify" button 2034, which causes the displayed information to be presented in a manner that enables the manager to modify the information.

For the sake of example, assume that the manager would like to add a restriction to the employee "John Smith". In order to do this, the manager would first access John Smith's information by using the controls in the searching portion 2002 to display John Smith's information in the display area 2040. The manager would then click the qualifications/restrictions button 2022 to access John Smith's qualifications and restrictions. Once the qualifications and restrictions information for John Smith is displayed, the manager then clicks the modify button 2034, which will then allow the manager to add a new restriction, or modify an existing restriction associated with this employee.

The manager may then click on a save button (not shown), or simply close the pop-up window associated with the qualifications/restrictions information. By so doing, the modified information is transmitted to the processing entity 36, such that the modified information is able to be stored in one of the records $300_{1-k}$ in the employee profile database 22 associated with the employee.

In an alternative embodiment, there may be no need for the modify button 2034, as the information that is displayed to the manager from the employee dashboard page 2000 (and more specifically, the information presented in the display area 2040) may be presented in a modifiable form.

Based on the above, it should be appreciated that the employee dashboard page 2000 allows a manager to quickly and easily access information associated with different employees.

Referring back to the Personalized Manager Webpage 1900 shown in FIG. 19, a manager may also use this page in order to access and view information relating to available employee resources. In order to do so, the manager may click the view resource availabilities button 1916.

Figure 21:
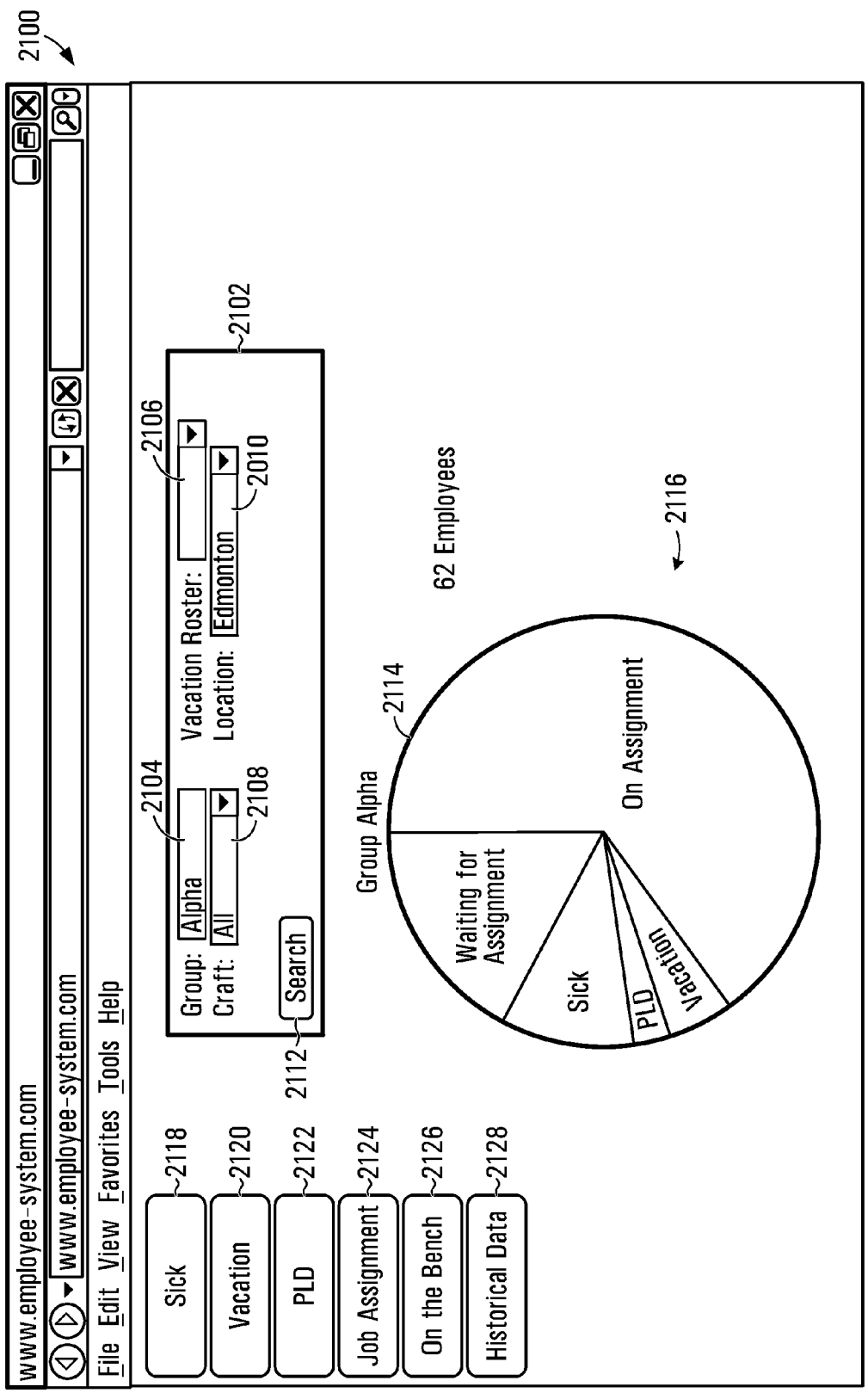
FIG. 21 is an on-screen display according to a non-limiting example of implementation illustrating a resource availabilities user interface of the employee resource management system.

By clicking the view resource availabilities button 1916, the manager is presented with a resource availabilities page 2100, a non-limiting example of which is shown in FIG. 21. As shown, the resource availabilities page 2100 includes a search portion 2102 and a display portion 2116.

The search portion 2102 provides controls that allow the manager to enter search criteria for locating a group of employees. In the non-limiting embodiment shown, the search portion 2102 includes a group name input control 2104, a vacation roster input control 2106, a craft input control 2108 and a location input control 2110. These controls are shown in the form of drop-down lists, although other possibilities exist. The manager may enter searching criteria within these input controls and then click a search button 2112, in order to locate a given group of employees based on the search criteria entered.

It should be appreciated that the group of employees can be a predefined group that is assigned to a given manager, or the group of employees can be grouped based on whether they are part of the same vacation roster, belong to the same craft, or work in the same location. Other ways of grouping employees are possible without departing from the spirit of the invention.

For the sake of example, assume that the manager entered or selected the group name "alpha" (which is the name of the group of employees assigned to that manager) in the group name input control 2104, and then clicked on the search button 2112. The processing entity 36 then identifies the employees belonging to the alpha group and generates information associated with that group of employees, which is displayed within the display area 2116. Prior to the search being performed, it is possible that the display area 2116 is blank.

The information associated with that group of employees may include a variety of information. For example, and in the non-limiting example shown, the information that is generated may be a pie graph showing the proportion of employees within the alpha group that are sick, that are waiting for an assignment, that are currently on assignment, that are on vacation or that are taking a personal leave day. As a result, a manager can get a quick overview of the availabilities of the employees within the given group from the information displayed in the display area 2116. The information displayed in this area may also provide an indication of the total number of people in the group.

In an alternative embodiment, the information that is generated and displayed in the display area may simply provide the raw numbers or calculated percentages showing the current availability situation of the employees within the alpha group rather than the pie chart. Any manner of displaying the information is included within the scope of the present invention.

Furthermore, the manager may be able to interact with the information that is displayed within the display area 2116 in order to obtain additional information. For example, the manager may be able to click on (or hover his or her cursor over) the "sick" segment of the graph in order to display a list of the names of all the sick employees in the area 2116. Or alternatively, the manager may be able to click the "on assignment" segment of the graph in order to display a list of employees and their associated job assignments in a pop-up window.

It should be appreciated that the resource availability information that is displayed to the manager in the display area 2116 is information that is updated in substantially real-time. For example, on any given day (or on any given hour) the information regarding the employee availabilities may change given that some employees may be sick or may take an unplanned personal leave day (PLD).

The resource availabilities page 2100 further includes a plurality of controls for allowing the manager to view different information associated with a given group of employees. In the non-limiting embodiment shown, the controls include a sick button 2118, a vacation button 2120, a personal leave day (PLD) button 2122, a job assignment button 2124, an on the bench button 2126 and a historical data button 2128. Each of these buttons will be described in more detail below.

It should be appreciated that the information that is displayed to the manager by operating these control buttons can be displayed in the display area 2116 or in a separate webpage or pop-up box (not shown), among other possibilities.

By clicking the sick button 2118, information regarding the sick leave taken by employees of the employee group is presented. The sick leave information may be indicative of the names of the employees within the group who are currently away on sick leave and may also provide statistical information such as whether the number of employees currently on sick leave is above or below average for a given time of year, or in comparison to other groups of employees. The sick leave information may also provide graphs indicative of historical information, such as a breakdown of the number of employees who have taken sick leave over a given time period (such as over the last six (6) months).

By clicking the vacation button 2020, information regarding vacation time taken by employees of the employee group is presented. The vacation information may be indicative of the names of the employees within the group who are currently away on vacation. The vacation information may also provide statistical information such as whether the number of employees currently on vacation is above or below average for a given time of year, or in comparison to other groups of employees. The vacation information may also provide an indication of the historical breakdown of the percentage of employees that are typically away on vacation at different times of the year, such that the manager can get an indication of when most people may be away.

By clicking the PLD button 2122, information regarding the personal leave days taken by employees of the employee group is presented. The personal leave day information will be similar to the type of information shown by clicking on the "sick" button 2118, and therefore need not be discussed further.

By clicking the job assignment button 2124, information regarding the number of employees in the employee group who are currently on a job assignment is presented. The job assignment information may be indicative of the names of the employees within the group who are on a job assignment, as well as an identification of what their respective job assignments are. The job assignment information may also provide statistical information such as whether the number of employees currently on job assignment is above or below average for a given time of year, or when compared to other groups of employees.

By clicking the on the bench button 2126, information regarding the number of employees in the employee group who are currently waiting for a job assignment is presented. This information will be similar to the type of information shown by clicking on the "job assignment" button 2124 and so need not be discussed further.

By clicking the historical data button 2128, historical information relating to the breakdown of resource availabilities is presented. For example, the manager may be able to view data such as the graph shown in the display area 2116 for any previous day or week in the past using calendar or date controls (not shown) to select the period of interest. The manager may also be able to view data regarding the number of work days lost to sick leave, vacation, PLDs, etc over a given time period.

Referring back to the Personalized Manager webpage 1900 shown in FIG. 19, a manager may also use this page in order to access and view information relating to job assignment allocation. In order to do so, the manager may click the job assignment allocation button 1918.

Figure 22:
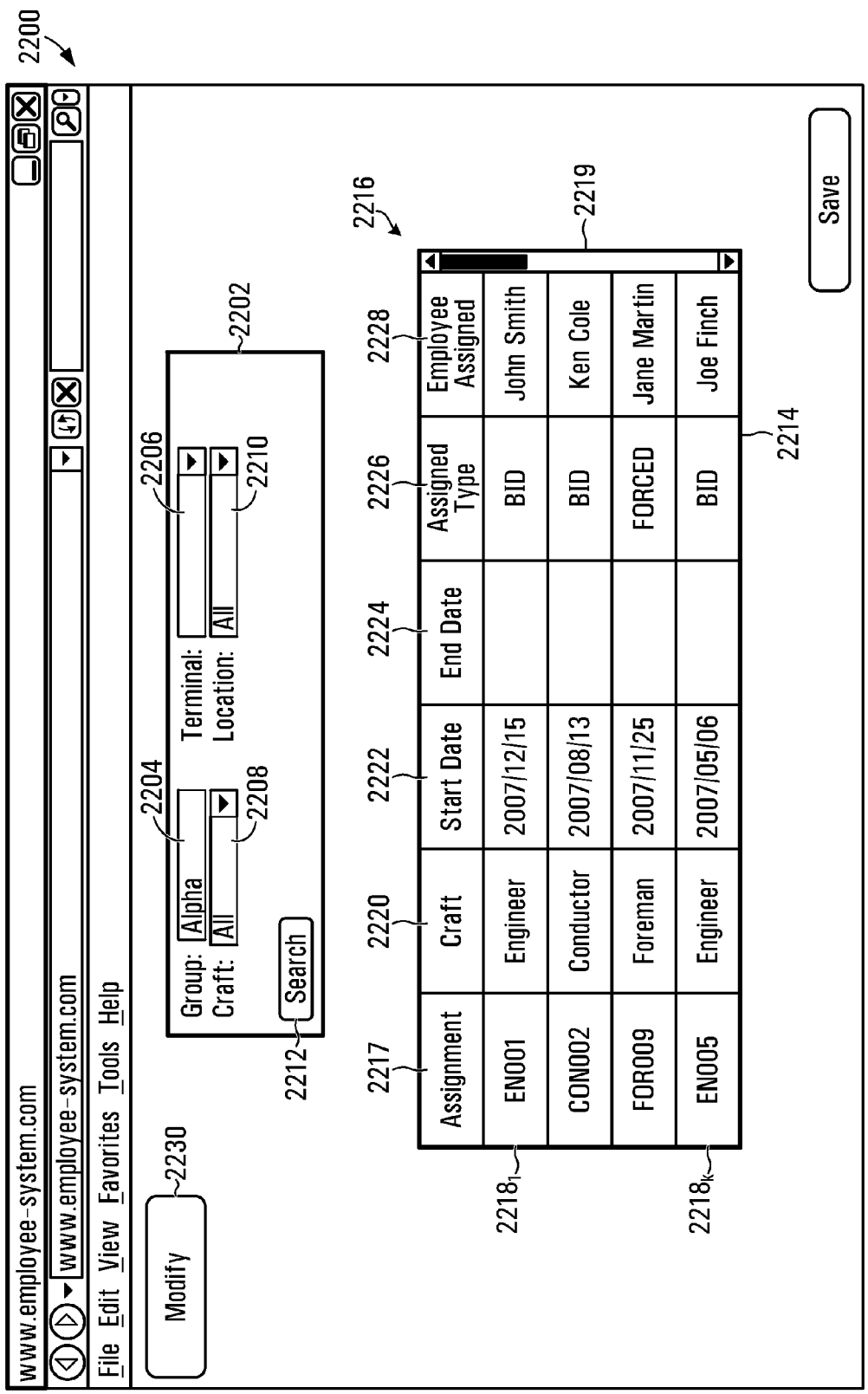
FIG. 22 is an on-screen display according to a non-limiting example of implementation illustrating a job assignment allocation user interface of the employee resource management system.

By clicking the job assignment allocation button 1918, a job assignment allocation page 2200 is presented, a non-limiting example of which is shown in FIG. 22. As shown, the job assignment allocation page 2200 includes a search portion 2202 that enables the manager to enter information for locating a group of employees and a display area 2216.

In the non-limiting embodiment shown, the search portion 2202 includes a group name input control 2204, a terminal input control 2206, a craft input control 2208 and a location input control 2210. The controls may take the form of drop-down lists, although other possibilities are available. The search portion 2202 also includes a search button 2212 that allows a search to be performed. In particular, the manager may enter searching criteria within the input control and then click on the search button 2212, in order to locate a given group of employees based on the search criteria entered.

It should be appreciated that the group of employees can be a predefined group that is assigned to a given manager, or the group of employees can be grouped based on whether they are part of the same terminal, belong to the same craft, or work in the same location. Other ways of identifying a group of employees is also possible without departing from the spirit of the invention.

Keeping with the above example, assume that a manager entered or selected the group name "alpha" (which is the name of the group of employees assigned to that manager) in the group name input control 2204, and then clicked on the search button 2212. Based on these inputs, the processing entity 36 identifies the employees belonging to the alpha group and generates a table outlining the job assignments for that group of employees. More specifically, an assignment allocation table 2214 listing job assignments to various employees is generated by the entity 36 and displayed within the display area 2216. Prior to the search being performed, it is possible that the display area 2216 is blank.

The assignment allocation table 2214 in the present embodiment includes a plurality of records $2218_{1-k}$ that are each indicative of a job that has been assigned to an employee within the group of employees. The assignment allocation table 2214 typically includes a scroll bar 2219 on one side, such that the manager can scroll through the list of records $2218_{1-k}$ so as to be able to view more records than can be shown in the space allocated for the assignment allocation table 2214 on the webpage 2200.

In the non-limiting embodiment shown, each of the assignment records $2218_{1-k}$ includes data elements indicative of an assignment code 2217, a craft 2220, a start date 2222, an end date 2224, an assigned type 2226 and the employee that has been assigned to the job 2228. It should be appreciated that other data elements, such as turn, type, guarantee and incumbency block could also be included within this table. The types of data elements that are included within each of the records $2218_{1-k}$ can be pre-selected by the manager, or alternatively, it is possible that the manager can configure the assignment allocation table 2214 to include the data elements that are of the most interest to him or her.

In the case of the assignment allocation table 2214 shown in FIG. 22, the assignment code 2217 is an alpha-numeric code that uniquely identifies the job assignment that has been assigned to the employee. In certain cases, the code 2217 may not provide a human-readable indication of the job assignment. In such cases, the assignment code 2217 may act as a link that, when used, causes a more detailed or human-readable description of the job assignment to appear, such as in a pop-up window.

The craft 2220 data element provides an indication of the type of skill set required for the job that has been assigned to the employee. The start date 2222 and end date 2224 define the time period of the job assignment, and the assigned type data element 2228 is indicative of the manner in which the job was assigned to the employee. These data elements have been described in more detail above, and as such will not be re-described herein.

The manager may use the job allocation table 2214 in order to ensure that he or she is satisfied with the way in which the jobs have been assigned to the employees within a given employee group. In the case where the manager is unsatisfied with the assignment of jobs, the manager is able to interact with the user interface in order to modify the way the job assignments have been.

In accordance with a non-limiting example, the job assignment allocation page 2200 includes a modify button 2230. By clicking the modify button 2230, the job allocation table 2214 (or the data elements within the job allocation table 2214) is displayed in a format wherein the manager can modify the manner in which the jobs have been assigned.

For example, by clicking the modify button 2230, the job allocation table 2214 may be displayed in a manner whereby the user can highlight, or otherwise select, one or more of the records $2218_{1-k}$. A menu may then be available to the manager which gives him or her options as to how a job assignment associated with a given record can be modified. The menu may automatically appear upon clicking the modify button 2230, or the menu may appear when the manager performs an action, such as left-clicking a mouse over the one or more highlighted records $2218_{1-k}$.

The menu may provide the manager with the following options for modifying the records $2218_{1-k}$ in the job assignment allocation table 2214:

1. an option to remove the job assignment from an employee. For example, if the manager feels that a job that has been assigned to a given employee is inappropriate, the manager may select a "remove" option, that would remove that job from that employee. In such a situation, the job assignment will be removed from the employee, and a record associated with that employee in the employee profile database 22 will likely be updated to indicate a "removed" status. When this happens, the employee may be automatically assigned a new job, or the employee may be advised (such as via an email or a call placed via the IVR system 26) to place bids on one or more new jobs (or job categories) in order to be assigned a new job.
2. an option to replace a first job assignment with a second, different job assignment. For example, if the manager feels that a given employee may be better suited to perform a job than the job already assigned to him/her, the manager may select a "replace" option that would allow the employee's current job to be replaced with another. In an embodiment, a pop-up window or similar interface may appear to allow the manager to provide an indication of a replacement job that should be assigned to the given employee, which may be identified by a job code, or by a job name, among other possibilities. When the manager chooses to replace a currently-assigned job for a given employee with a manager-selected job, a record associated with that employee in the employee profile database 22 will likely be updated to identify the newly assigned, manager-selected job.

3. an option to switch jobs between two employees. For example, if the manager feels that a particular job may be better suited to a second, different employee than the employee to whom the job has already been assigned, then the manager may select a "switch job" option for switching the jobs between employees. In one embodiment, a pop-up window or similar interface may appear for identifying the two employees whose jobs should be switched. When the manager chooses to switch jobs between two employees, the records associated with those two employees in the employee profile database 22 will likely be updated to identify the switch in job assignments.

4. an option to modify a job assignment. For example, if the manager feels that a job assignment that has been assigned to a given employee could be modified so as to better suit him or her, the manager may select a "modify" option that enables the job to be modified. Examples of such modifications may involve changing the start date or end date of the record, among other possibilities. In such a situation, a record associated with that employee in the employee profile database 22 will likely be updated to include the information relating to the "modified" job assignment.

In an alternative, non-limiting embodiment, the job assignment allocation page 2200 may not include a modify button 2230, since the job allocation table 2214 may be displayed in a format that allows the manager to make modifications. Furthermore, in an alternative example, the manager may not need a menu of options in order to make modifications and changes to the job assignments, since the manager may be able to make these changes by simply entering the modifications as he/she sees fit. For example, in order to remove a job assignment associated with an employee, the manager may simply delete the assignment code 2217 data element associated with that record. Similarly, in order to modify the start date 2222 and end date 2224 elements, the manager may simply enter new dates within these fields.

Furthermore, the manager may be able to cut and paste different job assignment codes within the assignment code data element 2217 of one or more records in order to replace a job assignment for an employee or switch job assignments between two different employees. As such, it should be clear that there are multiple different ways that a manager could interact with the job assignment allocation table 2214 in order to make modifications to jobs that have been assigned to different employees.

Referring back to the Personalized Manager Webpage 1900 shown in FIG. 19, a manager may also use this page in order to access and view communications or alerts from employees, other managers or the system. To do so, the manager may click the view communications button 1920.

By clicking the "view communications" button 1920, the manager may either be re-directed to his/her work email or another webpage (not shown) may appear that is capable of displaying communications to/from the manager. For example, the displayed communications may include advisories from the employee management system 10, which could be indicative of such things as new functionalities or a shut-down period for the system 10. Alternatively, the communications from the system 10 may be indicative of absence requests that need manager consideration. For example, when an absence request from an employee cannot be automatically rejected or approved by the system 10, it may be forwarded to the employee's manager for consideration. These absence requests can be viewed by the manager by clicking the view communications button 1920.

By clicking the view communications button 1920, the manager may also be able to view email-type communications from employees and other managers. In this manner, the employee management system 10 may include certain email-type functionality for allowing internal communication between managers and employees or between two (or more) managers.

The Personalized Manager Webpage 1900 shown in FIG. 19 further includes an modify system parameters button 1922. By clicking this button, the manager may be provided with the ability to edit and/or add information in one or more of the databases that has been previously described above. More specifically, the modify system parameters button 1922 provides a user interface for allowing the manager to edit information contained in the train schedule database 20, the employee profile database 22 and/or the constraints database.

As has been previously described above, the manager may be able to edit information contained in the employee profile database 22 (such as an employee's qualification, restrictions and seniority information, among other possibilities) via the employee dashboard webpage 2000. The manager may also be able to edit information in the employee profile database 22 via the job assignment allocation webpage 2200, whereby a manager makes changes to the manner in which jobs have been assigned to one or more employees.

By clicking the modify system parameters button 1922, a webpage for allowing the manager to access additional information within the employee profile database 22, as well as information within the train schedule database 20 and/or within the constraints database 24, may be presented. For example, there may be an option to access information within the train schedule database 20, which may be presented to the manager in the form of a table with a plurality of records corresponding to different train trips. Such a table may be presented to the user in a modifiable form, such that the manager can enter new information or delete or change old information.

Clicking the button 1922 may also be provide the manager with an option to access information with the constraints database 24. For example, the manager may be presented with a webpage that lists all the existing constraints that are applicable to employees on their team(s). This webpage may also provide the manager with the ability to add a new constraint, such as a modifiable constraint in the modifiable constraints section 506. For example, the manager may be able to click an "add constraint" button that causes an input field to be presented that allows the manager to enter information for adding a new modifiable constraint. A non-limiting example of such a constraint may be where the manager adds a constraint that restricts the number of his/her employees who can take vacation time simultaneously or restricts the times during the year when employees can take vacation. Other examples of constraints that could be added by a manager via this webpage may include those that adjust or restrict the qualifications required for a specific job, or affect the type of restrictions that could disqualify an employee from bidding on a job among other possibilities.

Similarly, the manager may also add a time limit during which an added constraint is valid. For example, if a major project is scheduled for the months of June and July, the manager may add constraints that affect the allowability of absence periods for his/her employees for these months. However, by putting an expiration date of August 1 on this constraint, the manager will also ensure that absence periods after this project will not be otherwise unduly affected.

There are many different types of interfaces that could be used for enabling the manager to make additions and/or modifications to the information contained in the train schedule database 20, the employee profile database 22 and the constraints database 24, which are all included within the scope of the present invention.

The manner in which managers are able to interact with the employee management system 10 have been described in detail above. Although the term "manager" has been used to refer to this group as if it were homogeneous, it should be appreciated that not all users within this group may have the same information requirements, and therefore one manager's level of access may be different from another.

As a result, there likely are different permission levels associated with different managers, and different information will be displayed and accessible to a manager via the personalized manager webpage 1900. For example, a lower-level manager may not have access to information relating an employee's past job assignments, or the ability to make additions or modifications to the constraint database 24.

As such, in accordance with the present invention, it is possible that managers having different permission levels are able to access and view different information.

Although the present invention has been described in considerable detail with reference to certain preferred embodiments thereof, variations and refinements are possible without departing from the spirit of the invention. Therefore, the scope of the invention should be limited only by the appended claims and their equivalents.

The invention claimed is:

1. A method for managing the application of penalties to employees of a company, said method comprising:
   a) executing software encoded on a machine readable storage medium by a CPU to:
      i) implement a job assignment monitoring function, the job assignment monitoring function monitoring events occurring in the course of a job assignment procedure during which a server arrangement communicates with a remote client over a data network to present an employee at the remote client with a job proposal;
      ii) detecting among the monitored events a penalty triggering event;
      iii) in response to the detecting, determining a penalty to be applied to the employee on the basis of the penalty triggering event;
   b) recording in an employee record stored in database, data derived from the determining to register the penalty applied to the employee.

2. A method as defined in claim 1, wherein the data derived from the determining is recorded in the employee record after a predetermined grace period has elapsed from the occurrence of the penalty triggering event.

3. A method as defined in claim 2, including detecting among the monitored events a penalty negating event occurring subsequent the penalty triggering event, the occurrence of the penalty negating event precluding registering the penalty in the employee record.

4. A method as defined in claim 1, including generating a notification to the employee via the remote client to notify the employee that a penalty triggering event has occurred.

5. A method as defined in claim 4, wherein the notification provides particulars of the penalty to which the employee is exposed.

6. A method as defined in claim 5, wherein the notification conveys information about an action the employee can perform to negate the penalty.

7. A method as defined in claim 6, wherein the notification indicates a grace period in which the action has to be performed to negate the penalty.

8. A method as defined in claim 1, wherein the penalty triggering event is selected from the group consisting of failure by the employee to accept the job proposal and notification to the employee via the remote client withdrawing the job proposal from the employee.

9. A method as defined in claim 8, wherein the failure of the employee to accept the job proposal includes a notification sent by the employee from the remote client to the server arrangement that the employee refuses the job proposal.

10. A method as defined in claim 3, wherein the job proposal is a first job proposal, the penalty negating event including a notification sent by the employee from the remote client to the server arrangement indicating that the employee accepts a second job proposal, distinct from the first job proposal.

11. A method for managing the application of penalties to employees of a company, said method comprising:
   a) executing software encoded on a machine readable storage medium by a CPU to:
      i) implement a job assignment monitoring function, the job assignment monitoring function monitoring events occurring in the course of a job assignment procedure during which a server arrangement communicates with a remote client over a data network;
      ii) detecting among the monitored events:
         (1) a first event relating to a notification sent from the server arrangement to the employee via the remote client to inform the employee of a job proposal;
         (2) a second event indicative of a failure of the employee to accept the job proposal, wherein the job proposal is a first job proposal;
      iii) in response to the detecting, determining:
         (1) a penalty to be applied to the employee;
         (2) a grace period during which the penalty can be avoided if the employee accepts a second job proposal distinct from the first job proposal;
   b) in the event the penalty is not avoided, recording in an employee record stored in database data to make the penalty effective.

12. A method as defined in claim 11, wherein the penalty includes vacation time reduction for the employee.

13. A method as defined in claim 12, wherein the data recorded in the employee record indicates a length of time by which the vacation time of the employee is reduced.

14. A method as defined in claim 11, wherein the method includes sending to the employee via the remote client a notification to inform the employee about the possible penalty and the grace period available to the employee to accept the second job proposal to avoid the penalty.

15. A method for managing the application of penalties to employees of a company, said method comprising:

a. executing software encoded on a machine readable storage medium by a CPU to:
  i. implement a job assignment monitoring function, the job assignment monitoring function monitoring events occurring in the course of a job assignment procedure during which a server arrangement communicates with a remote client over a data network;
  ii. detecting among the monitored events:
    1. a first event indicative of notification to the employee that a job proposal previously made available to the employee is withdrawn from the employee, wherein the job proposal is a first job proposal;
    2. a second event indicative of a failure of the employee to perform an action that could lead to a second job proposal being made available, distinct from the first job proposal within a predetermined time interval from the first event;
b. in response to detection of the second event recording in an employee record stored in database data to indicate that the employee is subjected to a penalty.

16. A computer readable storage medium encoded with non-transitory software for execution by a CPU for detecting penalty occurring events in the course of a job assignment procedure during which employees of a business organization are presented with job assignments, wherein the job assignment procedure is governed by rules allowing the employees of the business organization to accept or refuse job assignments, the job assignment procedure including generating at a server arrangement a message to a remote client over a data network to present an employee of the business organization at the remote client with a job assignment, the software being configured for:
  (a) monitoring interactions between the remote client and the server arrangement to detect a penalty triggering event including a failure of the employee to comply with one or more of the rules governing the job assignment procedure;
  (b) in response to a detection of a penalty triggering event, determining a penalty to be applied to the employee; and
  (c) recording in an employee record stored in a database data to register the penalty applied to the employee of the business organization.

17. A computer readable storage medium as defined in claim 16, wherein the software is configured for sending a notification to the employee of the business organization via the remote client to notify the employee of the business organization that a penalty has been applied to the employee of the business organization.

18. A computer readable storage medium as defined in claim 17, wherein the notification provides particulars of the penalty applied to the employee of the business organization.

19. A computer readable storage medium as defined in claim 17, wherein the notification provides information about a grace period that was offered to the employee to negate the penalty and that was not met.

20. A computer readable storage medium as defined in claim 17, wherein the notification provides information about a notice previously sent to the employee notifying the employee of the business organization that a penalty would be applied against the employee of the business organization.

21. A computer readable storage medium as defined in claim 16, wherein the employee record stores information about non-wage compensation the employee of the business organization is entitled to, the data registering the penalty applied to the employee of the business organization indicating a reduction of the non-wage compensation.

22. A computer readable storage medium as defined in claim 21, wherein the non-wage compensation includes vacation time, the data registering the penalty applied to the employee of the business organization indicating a loss of vacation time.

23. A computer readable storage medium as defined in claim 21, wherein the non-wage compensation includes vacation time, the data registering the penalty applied to the employee of the business organization indicating that the employee of the business organization is barred from taking vacation during a certain period of the year.

24. A computer readable storage medium as defined in claim 16, wherein the employee record stores information about a wage of the employee of the business organization, the data registering the penalty applied to the employee of the business organization indicating a reduction of the wage of the employee of the business organization.

25. A computer readable storage medium as defined in claim 16, wherein the employee record stores information about a seniority rank of the employee of the business organization, the data registering the penalty applied to the employee of the business organization indicating a reduction of the seniority rank of the employee.

26. A computer readable storage medium encoded with non-transitory software for execution by a CPU for detecting penalty occurring events in the course of a job assignment procedure during which employees of a business organization are presented with job assignments, wherein the job assignment procedure is governed by rules allowing the employees of the business organization to accept or refuse job assignments, the job assignment procedure including generating at a server arrangement a message to a remote client over a data network to present an employee of the business organization at the remote client with a job assignment, the software being configured for:
  (a) monitoring interactions between the remote client and the server arrangement to detect a penalty triggering event including a failure to of the employee to comply with one or more of the rules governing the job assignment procedure;
  (b) determining in response to the detecting conditions the employee of the business organization must satisfy to avoid application of a penalty;
  (c) sending a notification to the employee of the business organization via the remote client to indicate to the employee of the business organization that a penalty triggering event has occurred, the notification providing information about the conditions the employee of the business organization must satisfy to avoid application of the penalty; and
  (d) recording in an employee record stored in a database data indicating that a penalty triggering event has occurred.

27. A computer readable storage medium as defined in claim 26, wherein the software is configured for determining in response to the detecting particulars of the penalty to which the employee of the business organization is exposed.

28. A computer readable storage medium as defined in claim 27, wherein the notification provides the particulars of the penalty to which the employee of the business organization is exposed.

29. A computer readable storage medium as defined in claim 26, wherein the software is configured to recognize a message sent from the remote client to the server arrangement indicating that the employee of the business organization refuses the job assignment, as a penalty triggering event.

30. A computer readable storage medium as defined in claim 26, wherein the software is configured to recognize an absence of acknowledgement of receipt to the message presenting the employee of the business organization with the job assignment, as a penalty triggering event.

31. A computer readable storage medium as defined in claim 26, wherein the software is configured to recognize an absence of acceptance by the employee of the business organization of the job assignment presented to the employee of the business organization, as a penalty triggering event.

32. A computer readable storage medium as defined in claim 26, wherein the software is configured to recognize a withdrawal of the job assignment presented to the employee of the business organization as a result of a failure of the employee to acknowledge receipt of the message presenting the job assignment, as a penalty triggering event.

33. A computer readable storage medium as defined in claim 26, wherein the software is configured to recognize a withdrawal of the job assignment presented to the employee of the business organization as a result of a failure of the employee to accept the job assignment, as a penalty triggering event.

34. A computer readable storage medium as defined in claim 26, wherein the software is configured to recognize a failure of the employee of the business organization to search for a new job assignment when the job assignment presented in the message is taken by another employee of the business organization, as a penalty triggering event.

* * * * *